United States Patent
Jeong et al.

(10) Patent No.: US 10,834,408 B2
(45) Date of Patent: Nov. 10, 2020

(54) IMAGE ENCODING/DECODING METHOD AND APPARATUS USING INTRA-SCREEN PREDICTION

(71) Applicant: Industry-University Cooperation Foundation Hanyang University, Seoul (KR)

(72) Inventors: Je Chang Jeong, Seoul (KR); Ki Baek Kim, Seoul (KR)

(73) Assignee: Industry-University Cooperation Foundation Hanyang University, Seoul (KR)

(*) Notice: Subject to any disclaimer, the term of this patent is extended or adjusted under 35 U.S.C. 154(b) by 0 days.

(21) Appl. No.: 16/098,325

(22) PCT Filed: May 2, 2017

(86) PCT No.: PCT/KR2017/004696
§ 371 (c)(1),
(2) Date: Nov. 1, 2018

(87) PCT Pub. No.: WO2017/192011
PCT Pub. Date: Nov. 9, 2017

(65) Prior Publication Data
US 2019/0149828 A1  May 16, 2019

(30) Foreign Application Priority Data
May 2, 2016 (KR) .................. 10-2016-0054279

(51) Int. Cl.
*H04N 19/159* (2014.01)
*H04N 19/176* (2014.01)
(Continued)

(52) U.S. Cl.
CPC ......... *H04N 19/159* (2014.11); *H04N 19/105* (2014.11); *H04N 19/11* (2014.11);
(Continued)

(58) Field of Classification Search
CPC .... H04N 19/176; H04N 19/593; H04N 19/61; H04N 19/11; H04N 19/105;
(Continued)

(56) References Cited

U.S. PATENT DOCUMENTS

2007/0053433 A1  3/2007 Song
2007/0053443 A1  3/2007 Song
(Continued)

FOREIGN PATENT DOCUMENTS

EP  1761064 A2  3/2007
EP  2624567 A2  8/2013
(Continued)

OTHER PUBLICATIONS

International Search Report for PCT/KR2017/004696 dated Aug. 10, 2017 [PCT/ISA/210].
(Continued)

*Primary Examiner* — Farhan Mahmud
(74) *Attorney, Agent, or Firm* — Sughrue Mion, PLLC

(57) ABSTRACT

Disclosed is a decoding method which uses an intra-screen prediction. A decoding method which uses an intra prediction performed in a decoding apparatus comprises the steps of: receiving a bit stream; obtaining decoding information from the received bit stream; generating a prediction block for a current block to be decoded using the obtained decoding information; and restoring the current block by adding a residual block obtained from the bit stream and the prediction block. Accordingly, a compression ratio of an image can be improved.

10 Claims, 33 Drawing Sheets

(51) Int. Cl.
*H04N 19/11* (2014.01)
*H04N 19/174* (2014.01)
*H04N 19/105* (2014.01)
*H04N 19/44* (2014.01)
*H04N 19/96* (2014.01)

(52) U.S. Cl.
CPC ......... *H04N 19/174* (2014.11); *H04N 19/176* (2014.11); *H04N 19/44* (2014.11); *H04N 19/96* (2014.11)

(58) Field of Classification Search
CPC .... H04N 19/159; H04N 19/44; H04N 19/119; H04N 19/46; H04N 19/96
See application file for complete search history.

(56) References Cited

U.S. PATENT DOCUMENTS

| | | |
|---|---|---|
| 2007/0206872 A1 | 9/2007 | Song |
| 2012/0014444 A1 | 1/2012 | Min et al. |
| 2013/0177079 A1 | 7/2013 | Kim et al. |
| 2014/0334551 A1 | 11/2014 | Kim et al. |
| 2014/0362906 A1 | 12/2014 | Kim et al. |
| 2015/0156500 A1 | 6/2015 | Min et al. |
| 2015/0208084 A1 | 7/2015 | Zhu et al. |
| 2018/0139453 A1* | 5/2018 | Park .................... H04N 19/159 |

FOREIGN PATENT DOCUMENTS

| | | |
|---|---|---|
| EP | 2806635 A1 | 11/2014 |
| JP | 2007-74726 A | 3/2007 |
| JP | 2009-528762 A | 8/2009 |
| JP | 2015-507904 A | 3/2015 |
| KR | 10-1246294 B1 | 3/2013 |
| KR | 10-2014-0003715 A | 1/2014 |
| KR | 10-2014-0136905 A | 12/2014 |
| KR | 10-2014-0140007 A | 12/2014 |
| KR | 10-2015-0042268 A | 4/2015 |
| KR | 10-2015-0081240 A | 7/2015 |
| KR | 10-1602873 B1 | 3/2016 |
| KR | 10-2017-0023921 A | 3/2017 |
| KR | 10-2017-0025994 A | 3/2017 |
| WO | 2007/100221 A1 | 9/2007 |
| WO | 2012/008790 A2 | 1/2012 |

OTHER PUBLICATIONS

Communication dated Nov. 19, 2019, from the Japanese Patent Office in Application No. 2018-557891.
Communication dated Nov. 7, 2019, from the European Patent Office in European Application No. 17792913.0.
Jianle Chen et al., "Algorithm Description of Joint Exploration Test Model 2", Joint Video Exploration Team (JVET) of ITU-T SG 16 WP 3 and ISO/IEC JTC 1/SC 29WG 11, 2nd Meeting: San Diego, USA, Feb. 20-26, 2016, JVET-B1001 v3 (7 pages total).

* cited by examiner

| last_sig_coeff_x_prefix |
| last_sig_coeff_y_prefix |
| last_sig_coeff_x_suffix |
| last_sig_coeff_y_suffix |
| coded_sub_block_flag |
| sig_coeff_flag |
| coeff_abs_level_greater1_flag |
| coeff_abs_level_greater2_flag |
| coeff_sign_flag |
| coeff_abs_level_remaining |

IMAGE ENCODING/DECODING METHOD AND APPARATUS USING INTRA-SCREEN PREDICTION

CROSS REFERENCE TO RELATED APPLICATIONS

This application is a National Stage of International Application No. PCT/KR2017/004696, filed on May 2, 2017, which claims priority from Korean Patent Application No. 10-2016-0054279, filed on May 2, 2016.

TECHNICAL FIELD

The present invention relates to an image encoding/decoding method and apparatus using intra-screen prediction, and more specifically, to a method and apparatus which perform intra prediction by referring to an area already encoded in a current block, using a reference pixel close to a pixel to be encoded, and using block sizes obtained by binary partitioning, thereby improving the accuracy of prediction.

BACKGROUND ART

High efficiency video coding (HEVC/H.265) is the next generation video coding technology. ISO/IEC Moving Picture Expert Group (MPEG), which developed H.264/MPEG-4 AVC, and Video Coding Experts Group of ITU-T formed a team in January 2010 as the joint collaborative team on video coding (JCT-VC) to work on standardization of HEVC/H.265, which has been approved as the next generation final standard.

HEVC generates a prediction block based on spatial correlation or temporal correlation of a current block to be coded on the basis of block-unit prediction and derives a residual block obtained by a difference between the current block and the prediction block.

In this case, the process of generating a prediction block using spatial correlation is called intra prediction or intra-prediction. In an existing intra-prediction method, since a reference pixel is padded and used as it is, when a distance to a pixel to be encoded is increased, a prediction value becomes inaccurate and encoding efficiency becomes poor.

In addition, since in an existing encoding method, a block form is fixed and a partitioning method is based on a quadtree partitioning scheme, an encoding efficiency is reduced in a complex picture or a picture having horizontally or vertically similar forms.

Therefore, there is a need for a method for improving an encoding efficiency by using a more accurate intra prediction value and using a more flexible block form.

DISCLOSURE

Technical Problem

In order to solve the above-described problems, an objective of the present invention is to provide an encoding method using intra prediction.

In order to solve the above-described problems, another objective of the present invention is to provide an encoding apparatus using intra prediction.

Technical Solution

To achieve the above objective, one aspect of the present invention provides an encoding method using intra prediction.

The decoding method which uses intra prediction performed in a decoding apparatus may comprises receiving a bit stream, obtaining decoding information from the received bit stream, generating a prediction block for a current block to be decoded using the obtained decoding information and restoring the current block by adding a residual block obtained from the bit stream to the prediction block.

In in the generating of the prediction block, the prediction block for the current block may be generated by generating a prediction value for each pixel of the current block using at least one main reference block selected from restored pixels belonging to a block adjacent to the current block or belonging to at least one sub-block of the current block.

The main reference pixel may be a pixel located in an intra prediction direction among the restored pixels.

The generating of the prediction block may includes when two or more main reference pixels are located in the intra prediction direction, the generating of the prediction block for the current block using two main reference pixels nearest to the current pixel, which are located ahead of and behind in the intra prediction direction with respect to the current pixel to be predicted in the current block.

In the generating of the prediction block for the current block using the two main reference pixels nearest to the current pixel, the prediction block may be generated by using an average of the two main reference pixels or the sum of values obtained by applying a weight to each of the two main reference pixels as a prediction value of the current pixel.

The at least one sub-block may be obtained by partitioning the current block using one of a quadtree scheme and a binary tree scheme, or is obtained by partitioning the current block using the quadtree scheme and the binary tree scheme together.

The at least one sub-block may consist of pixel lines located horizontally at even-numbered or odd-numbered positions in the current block.

The at least one sub-block may consist of pixel lines located vertically at even-numbered or odd-numbered positions in the current block.

In the at least one sub-block, coordinates (x, y) of each pixel in the current block may consist of an even x-coordinate and an even y-coordinate, consist of an x-coordinate and a y-coordinate, either one being an even coordinate and the other being an odd coordinate, or consist of an odd x-coordinate and an odd y-coordinate.

The generating of the prediction block may include the steps of correcting the main reference pixel using a difference between two pixels at positions corresponding to positions between the main reference pixel among the restored pixels and the current pixel to be predicted in the current block with respect to the intra prediction direction and generating the prediction block using the corrected main reference pixel.

In the correcting of the main reference pixel, the main reference pixel may be corrected by adding the difference value to the main reference pixel or adding a value obtained by applying a weight to the difference value to the main reference pixel.

In the correcting of the main reference pixel, the main reference pixel may be corrected only % en a pixel within a predetermined range among the current pixels is predicted.

In the correcting of the main reference pixel, when two or more difference values are derived, the main reference pixel may be corrected using an average of the two or more difference values or values derived by applying a weight to each of the two or more difference values.

To achieve the above objective, another aspect of the present invention provides an encoding apparatus using intra prediction.

The decoding apparatus using intra prediction may comprise at least one processor and a memory in which commands for instructing the at least one processor to perform at least one operation are stored.

The at least one operation may include receiving a bit stream, obtaining decoding information from the received bit stream, generating a prediction block for a current block to be decoded using the obtained decoding information and restoring the current block by adding a residual block obtained from the bit stream to the prediction block.

In the generating of the prediction block, the prediction block for the current block may be generated by generating a prediction value for each pixel of the current block using at least one main reference block selected from restored pixels belonging to a block adjacent to the current block or belonging to at least one sub-block of the current block.

The main reference pixel may be a pixel located in an intra prediction direction among the restored pixels.

The generating of the prediction block may include, when two or more main reference pixels are located in the intra prediction direction, the generating of the prediction block for the current block using two main reference pixels nearest to the current pixel, which are located ahead of and behind in the intra prediction direction with respect to the current pixel to be predicted in the current block.

In the generating of the prediction block for the current block using the two main reference pixels nearest to the current pixel, the prediction block may be generated by using an average of the two main reference pixels or the sum of values obtained by applying a weight to each of the two main reference pixels as a prediction value of the current pixel.

The at least one sub-block may be obtained by partitioning the current block using one of a quadtree scheme and a binary tree scheme, or is obtained by partitioning the current block using the quadtree scheme and the binary tree scheme together.

The generating of the prediction block may include the steps of correcting the main reference pixel using a difference between two pixels at positions corresponding to positions between the main reference pixel among the restored pixels and the current pixel to be predicted in the current block with respect to the intra prediction direction and generating the prediction block using the corrected main reference pixel.

In the correcting of the main reference pixel, the main reference pixel may be corrected by adding the difference value to the main reference pixel or adding a value obtained by applying a weight to the difference value to the main reference pixel.

In the correcting of the main reference pixel, the main reference pixel may be corrected only when a pixel within a predetermined range among the current pixels is predicted.

Advantageous Effects

When an encoding method and apparatus using intra prediction according to the present invention as described above are used, encoding and decoding efficiency may be improved.

In addition, an image compression rate may be further improved.

MODES OF THE INVENTION

Figure 1:
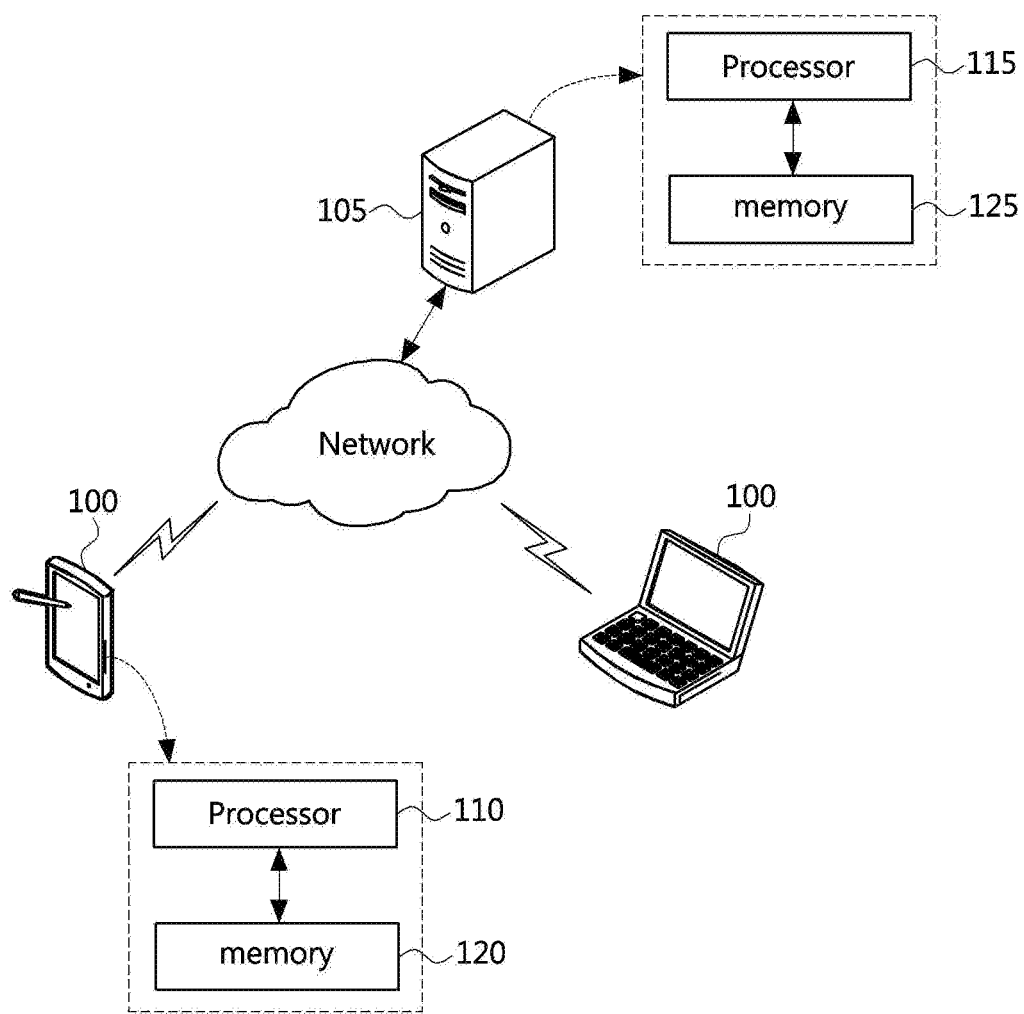
FIG. 1 is a conceptual diagram of an image encoding and decoding system according to one embodiment of the present invention.

Example embodiments of the present invention are disclosed herein. However, specific structural and functional details disclosed herein are merely representative for purposes of describing example embodiments of the present invention, however, example embodiments of the present invention may be embodied in many alternate forms and should not be construed as limited to example embodiments of the present invention set forth herein.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between", "adjacent" versus "directly adjacent", etc.).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises". "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It should also be noted that in some alternative implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved.

FIG. 1 is a conceptual diagram illustrating an image encoding/decoding system according to one embodiment of the present invention.

Referring to FIG. 1, an image encoding apparatus 105 and an image decoding apparatus 100 may be user terminals, such as personal computers (PCs), notebook computers, personal digital assistants (PDAs), portable multimedia players (PMPs), PlayStation portables (PSPs), wireless communication terminals, smartphones, TVs, or server terminals, such as application servers and service servers, or may include a communication device, such as a communication modem, for communicating with various devices or wire/wireless communication networks and various devices each including a memory 120 and 125 for storing a variety of programs and data for inter- or intra-prediction in order to encode or decode an image, a processor 110 and 115 for operation and control by executing the programs, and the like. An image encoded into a bit stream by the image encoding apparatus 105 may be transmitted in real-time or non-real-time to the image decoding apparatus 100 through a wireless/wire communication network, such as the Internet, a short range wireless communication network, a wireless local area network (LAN), a Wibro network, a mobile communication network or the like, or through various communication interfaces, such as a cable, a universal serial bus (USB), and the like, and the encoded image may be decoded in the image decoding apparatus 100 and restored and reproduced as an image. In addition, the image encoded into a bit stream by the image encoding apparatus 105 may be transmitted to the image decoding apparatus 100 from the image encoding apparatus 105 through a computer-readable recording medium.

Figure 2:
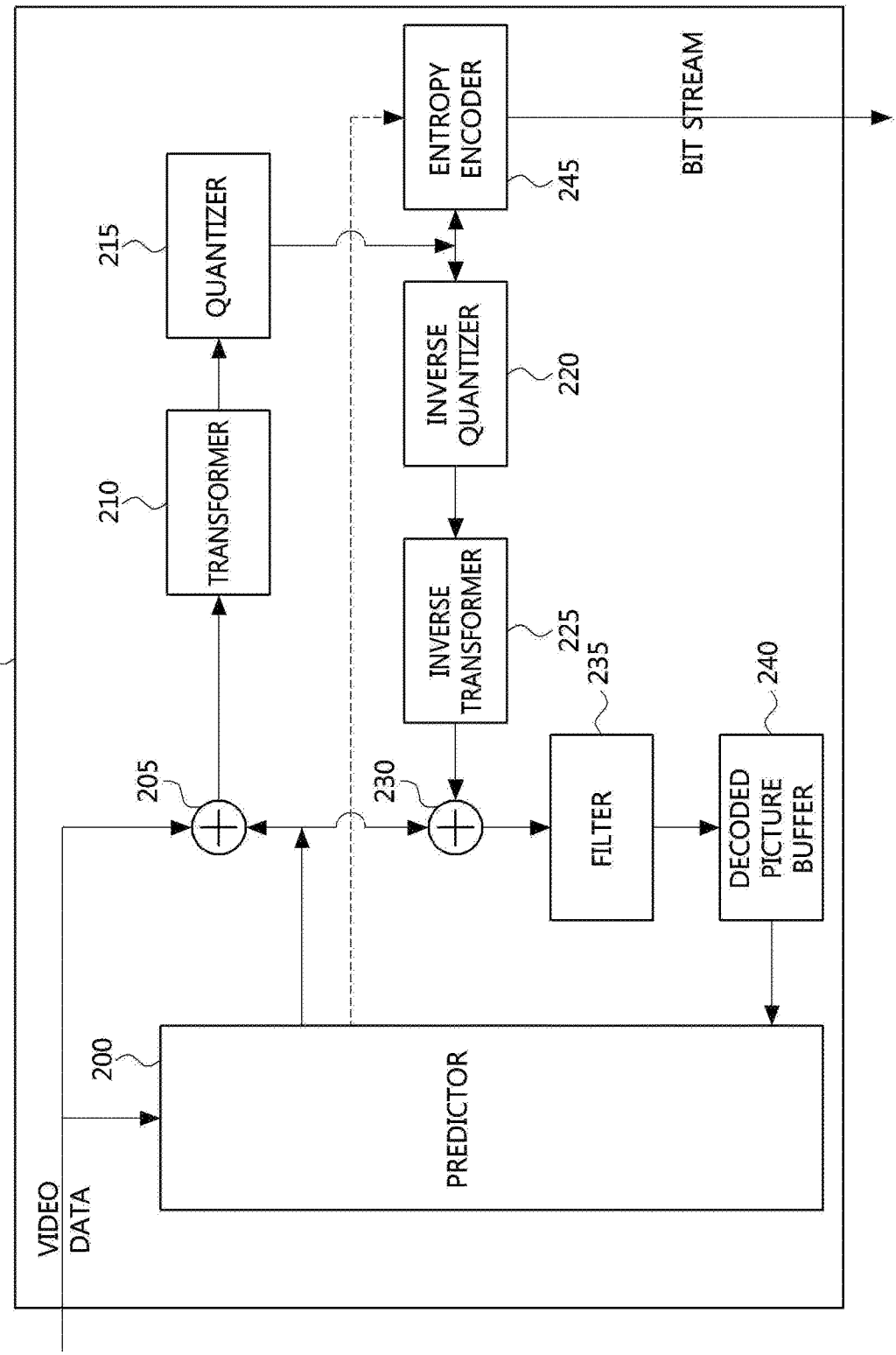
FIG. 2 is a block diagram illustrating an image encoding apparatus according to one embodiment of the present invention.

FIG. 2 is a block diagram illustrating an image encoding apparatus according to one embodiment of the present invention.

As shown in FIG. 2, the image encoding apparatus 20 according to the present embodiment may include a predictor 200, a subtractor 205, a transformer 210, a quantizer 215, an inverse quantizer 220, an inverse transformer 225, an adder 230, a filter 235, a decoded picture buffer 240, and an entropy encoder 245.

The predictor 200 may perform prediction on a current block to be encoded in the image by intra prediction or inter-picture prediction. According to a predetermined optimal prediction mode of the intra prediction or the inter-picture prediction, a prediction block is generated, and at this time, the prediction mode may include intra prediction mode, motion-related information, and the like.

The subtractor 205 may subtract pixel values of the prediction block from pixel values of the current block to be encoded and obtain pixel difference values to generate a residual image block.

The transformer 210 may transform the residue block received from the subtractor 205 and generate a transform block. That is, a residual signal belonging to a space domain may be transformed into a residual transformed signal belonging to a frequency domain. In this case, as a transform method, the Hadamard transform, discrete cosine transform (DCT)-based transform, discrete sine transform (DST)-based transform, or the like may be used, but the transform method is not limited thereto, and various improved or modified schemes thereof may be used.

The quantizer 215 may generate a quantized transform block by quantizing the transform block. That is, the residual transformed signal obtained from the transformer may be quantized into a quantized residual transformed signal. In this case, as a quantization method, the dead zone uniform threshold quantization (DZUTQ), the quantization weighted matrix, or improved schemes thereof may be used.

The entropy encoder 245 may output a bit stream by encoding the quantized residual block. In this case, as an encoding method, context-adaptive variable length coding, context-adaptive binary arithmetic coding, or the like may be used. In addition, a bit stream including additional information necessary for an encoding process may be generated and output, and at this time, the additional information may include information about block partitioning, information on a prediction mode, transformation information, a quantization coefficient, and the like.

The inverse quantizer 220 and the inverse transformer 225 may reconstruct a residual block by applying inverse-quantization and inverse-transform to the pixel signal, respectively. The reconstructed residual block may be added to the prediction block in the adder 230 to form a reconstructed block, and the reconstructed block may be stored in the decoded picture buffer 240 and accumulated in units of blocks or pictures, and then be transmitted to the predictor 200 and used as a reference in the next block or next picture.

The filter 235 may apply a deblocking filter to the restored image block to remove a blocking phenomenon if necessary, and may perform filtering by further applying a loop filter to improve the video quality.

Figure 3:
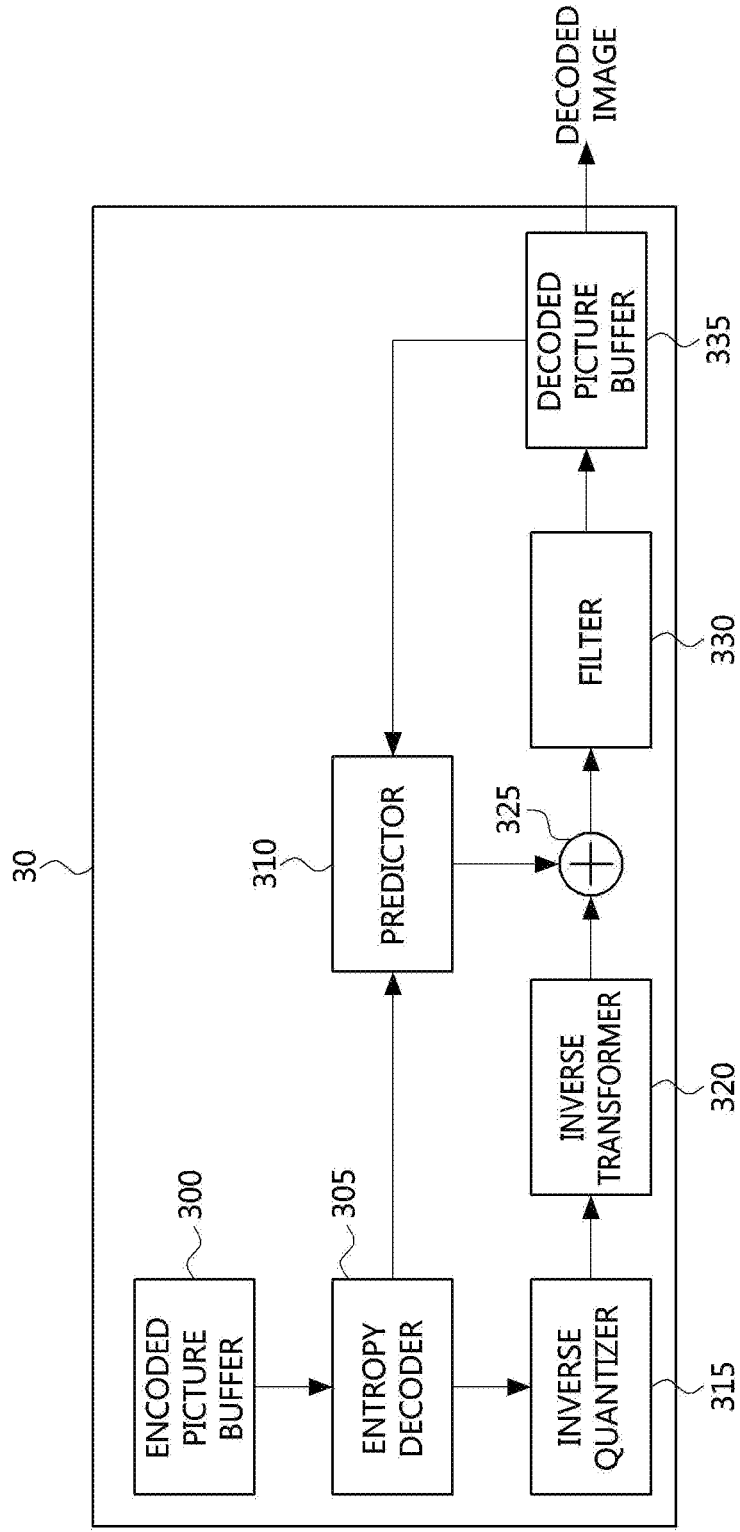
FIG. 3 is a configuration diagram illustrating an image decoding apparatus (30) according to one embodiment of the present invention.

FIG. 3 is a configuration diagram illustrating an image decoding apparatus 30 according to one embodiment of the present invention.

Referring to FIG. 3, the image decoding apparatus 30 may include an encoded picture buffer 300, an entropy decoder 305, a predictor 310, an inverse quantizer 315, an inverse transformer 320, an adder-subtractor 325, a filter 330, and a decoded picture buffer 335.

In addition, the predictor 310 may include an intra prediction module and an inter-picture prediction module.

When an image bit stream transmitted from an image encoding apparatus 20 is received, the image bit stream may be stored in the decoded picture buffer 300.

The entropy decoder 305 may restore a quantized transform block from the bit stream. In addition, additional information necessary for a decoding process may be restored from the bit stream and the additional information may be transmitted to the predictor 310, the inverse quantizer 315, the inverse transformer 320, and the like.

The predictor 310 may generate a prediction block for a current block on the basis of pieces of data received from the entropy decoder 305. The prediction block may be generated based on a reference image stored in the decoded picture buffer 335 and the restored prediction block information, and the prediction block information may include prediction mode information, prediction block acquisition information (in the present example, the size and shape of a block and block split information), and the like.

The inverse quantizer 315 may inverse quantize quantized transformation coefficients provided in a bit stream and decoded by the entropy decoder 305.

The inverse transformer 320 may generate a residual block by applying an inverse transform scheme to the quantized transformation coefficients.

In this case, the inverse quantizer 315 and the inverse transformer 320 may inversely perform the processes performed by the transformer 210 and the quantizer 215 of the image encoding apparatus 20 described above, and may be implemented by various methods. For example, the same process and inverse transform shared with the transformer 210 and the quantizer 215 may be used, or inverse transform and inverse quantization may be performed using information about a transformation and quantization process (e.g., transformation size, transformation shape, quantization type, etc.) from the image encoding apparatus 20.

The residual block which has undergone the inverse quantization and inverse transform may be added to the prediction block generated by the predictor 310 to form a restored image block. Such addition may be performed by the adder-subtractor 325.

Then, the filter 300 may apply a deblocking filter on the restored image block to remove a blocking phenomenon if necessary, and may use other loop filters before or after the decoding process to improve a video quality.

The restored and filtered image block may be stored in the decoded picture buffer 335.

Then, a block setter of the present invention will be described in detail.

The image encoding apparatus 20 and the image decoding apparatus 30 each may further include a block setter although not illustrated. The block setter may be set in association with each component of the image encoding and decoding apparatuses, and the size and shape of the block may be determined through the process. In this case, the block to be set may be defined differently according to the component. In the case of the predictor 200, the block to be set may be a prediction block and in the case of the transformer 210, the block may be a transform block. That is, a block unit may be defined according to the component, and in the present invention, the description will be given with focus on a coding block, a prediction block, and a transform block, but there is no limitation thereto such that a block unit according to other components may be further defined. The size and shape of the block may be defined by a width and height of the block.

The block setter may define the size and shape (in the present example, information related to a maximum value and a minimum value and the like) of the block unit. In addition, the block setter may define block partitioning settings (in the present example, partitioning scheme, split depth, and the like) for the block unit. A block having at least one size and shape (in the present example, a square of an individual width/height or a rectangular form having at least one width-height ratio) obtainable from the block unit may be defined through the above-described process. The defined settings as described above may be determined in units of, for example, a sequence, a picture, a slice, a tile, or the like, may be included in a bit stream, and may be parsed by the decoder to be restored as related information. This process may be performed before the start of the encoding and decoding process. In addition, each image unit may have one setting or two or more settings, which may be determined according to one or a combination of two or more pieces of information, such as a slice type (I/P/B), a coding mode (intra/inter), a color component (Y/Cb/Cr), a temporal layer (temporal ID), and the like. When two or more settings are applied, related information may be implicitly determined, or related information may be explicitly generated.

Block information for determining an optimal block unit (in the present example, the size and shape of a block) among blocks having at least one size and shape obtainable from the block unit may be generated according to the above-described definitions. Related information (in the present example, split flag, split index, and the like) may be generated according to the definition in accordance with the block partitioning setting (in the present example, partitioning scheme, split depth, and the like). The block split information may be determined in units of a block and included in a bit stream, and may be parsed by the decoder and restored as related information. The block split information may be determined before the start of operations of components in the process of encoding and decoding. When there is only one block obtainable based on the above-described definition and a state of a current block unit (in the present example, a size and shape of a block before or during splitting), block split information may be implicitly determined (in the present example, a size and shape of a block after splitting) and when there are two or more blocks obtainable, block split information may be explicitly generated. For example, one of the implicit and explicit methods may be determined by considering information, such as a maximum block size, a minimum block size, a depth, a size of a current block, and the like in a corresponding block unit.

In addition, the same splitting setting or a different splitting setting may be applied according to the block unit. For example, in the coding block and the prediction block, the same partitioning scheme (in the present example, partitioning based on a tree structure is performed, specifically, a quadtree scheme) may be used, and the same allowable split depth may be used. Alternatively, in the prediction block and the transform block, different partitioning schemes (in the present example, partitioning based on index selection is performed on the prediction block and partitioning based on a tree structure, specifically, a quadtree scheme, is performed on the transform block) may be used, or different hierarchical partitioning schemes (in the present example, partitioning based on index selection is performed on the prediction block within a single layer and partitioning based on a tree structure is performed on the transform block in multiple layers with a split depth of 1 or greater) may be used. Alternatively, different partitioning schemes (in the present example, partitioning based on a tree structure is performed in which a quadtree scheme and a binary tree scheme are used for the coding block and a quadtree scheme is used for the transform block) may be used in the coding block and the transform block, and the same allowable split depth may be used.

The split depth in the block partitioning setting may indicate the number of times of spatially splitting a block unit with respect to an initial block (in the present example, a depth of the initial block is 0), and as the depth increases, the block unit may be split into smaller blocks. The depth-related setting may be altered according to the partitioning scheme. For example, in the partitioning schemes based on a tree structure, a quadtree scheme and a binary tree scheme may use one common depth or may use individual depths.

A size and shape of an initial block (in the present example, a block before splitting) of a sub-block unit may be determined according to a splitting result of an upper block unit, which may affect the generation of splitting-related information (in the present example, block information after splitting). A coding block may be an upper unit of a prediction block and a transform block, and a prediction block may be or may not be an upper unit of a transform block. This may be determined according to an encoding setting. For example, when the coding mode is intra mode, a prediction block may be an upper unit of a transform block, and when the coding mode is inter mode, a prediction block may be a unit independent of a transform block.

In addition, one or more block units may be combined to share one partitioning scheme. For example, when a coding block and a prediction block are combined into one unit, one optimal block (in the present example, one block size and shape) obtained through splitting may be obtainable, which may be a basic unit (in the present example, a unit on which additional splitting is not performed) for encoding and prediction. Alternatively, when a coding block and a transform block are combined into one unit, one optimal block may be obtainable, which may be a basic unit for encoding and transformation. Alternatively, when a coding block, a prediction block, and a transform block are combined into one unit, one optimal block may be obtainable, which may be a basic unit for encoding, prediction, and transformation, be optimal block may be determined according to one or a combination of two or more pieces of information, such as a slice type, a coding mode, a color component, and the like.

Although the present invention is described with a focus on a case in which each block unit is individual, it is possible to apply the present invention to other block units and it is also possible to apply a modification of the present invention to an integrated case of two or more block units.

Figure 4:
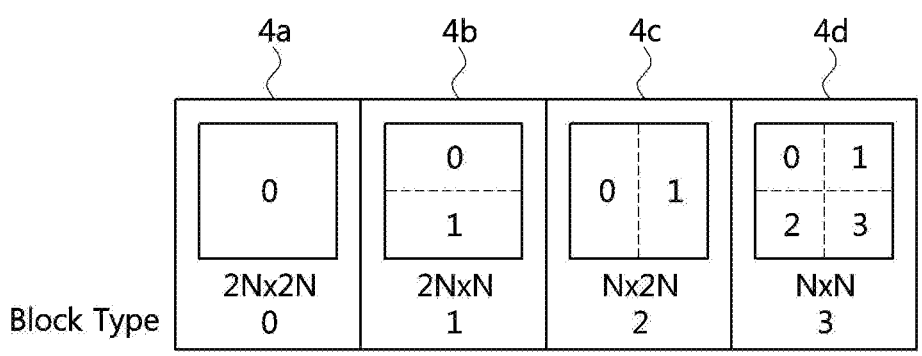
FIG. 4 is an exemplary diagram for describing block partitioning according to one embodiment of the preset invention.

FIG. 4 is an exemplary diagram for describing block partitioning according to one embodiment of the preset invention.

Referring to FIG. 4, as a method of partitioning a coding block, a split form according to a tree structure will be described.

In the present invention, splitting according to a quadtree scheme and splitting according to a binary tree scheme will be described as examples of splitting according to a tree structure, but the present invention is not limited thereto and improved and modified partitioning methods thereof may be used.

First, in the case of high efficiency video coding (HEVC) in which a quadtree scheme is used to obtain a coding block, obtainable coding blocks may be block 4a (not split) and block 4d (split into 2 smaller parts in each of the horizontal and vertical directions). Meanwhile, coding blocks obtainable when a binary scheme is used may be block types 4a and 4b (horizontally split into 2 smaller parts), and block 4c (vertically split into 2 smaller parts), and obtainable coding blocks when the two schemes are used together may be block types 4a, 4b, 4c, and 4d. In the case of a quadtree scheme, one split flag in association with partitioning is supported. When a corresponding flag is 0, the coding block may have block type 4a, and when a corresponding flag is 1, the coding block may have block type 4d. In the case of the binary tree scheme, one or more split flags are supported, wherein one of them may indicate whether a block is split, another flag may indicate whether a block is horizontally/vertically split, and still another flag may indicate whether horizontal/vertical splits are combined.

L1 (horizontal split) and L2 (vertical split) may be lines defining boundaries between blocks when binary tree partitioning is performed, and L3 and L4 may be lines defining boundaries between blocks when quadtree partitioning is performed. According to the partitioning scheme and settings, L3 and L4 may be boundary lines, like L1 and L2, in the binary tree partitioning, such as a horizontal partitioning and a vertical partitioning. Under a setting in which overlapping between boundary lines L3 and L4 is allowed, quadtree partitioning may be performed with boundaries L3 and L4. In another example, under a setting in which boundary lines L3 and L4 are not allowed to overlap, obtainable coding blocks may be blocks 4a, 4b, and 4c, and under the setting in which the boundary lines L3 and L4 are allowed to overlap, obtainable coding blocks may be blocks 4a, 4b, 4c, and 4d.

Therefore, when the coding blocks before splitting are square-shaped (M×M) as in blocks 4a to 4d, split blocks, such as M×M/2, M/2×M, M/2×M/2, and the like, may be obtained.

When a coding block before splitting is a rectangular block (M×N), split blocks, such as M×N/2, M/2×N, M/2×N/2, and the like, may be obtained. According to a width-height ratio and depth of the coding block, coding blocks with width-height ratios, such as M×N/4, M×N/8, M/4×N, M/8×N, M/2×N/4, M/4×N/2, and the like, may be obtained.

In addition, in the above example, an additional split block (e.g., a form with a width-height ratio different from the above example) may be obtained through the quadtree scheme, the binary tree scheme, and modified methods thereof.

Although the split form with a size of M×M is described in the example according to FIG. 4, obtainable coding blocks may vary depending on a maximum size of a coding block, a minimum size of a coding block, an allowable depth, a partitioning scheme, a coding mode, a slice type, and the like. Even when a block of a maximum coding unit is in an M×M square form, obtainable coding blocks may be in an M×N rectangular form, such as 2M×M and M×2M (in the above example), according to the partitioning scheme used.

Figure 5:
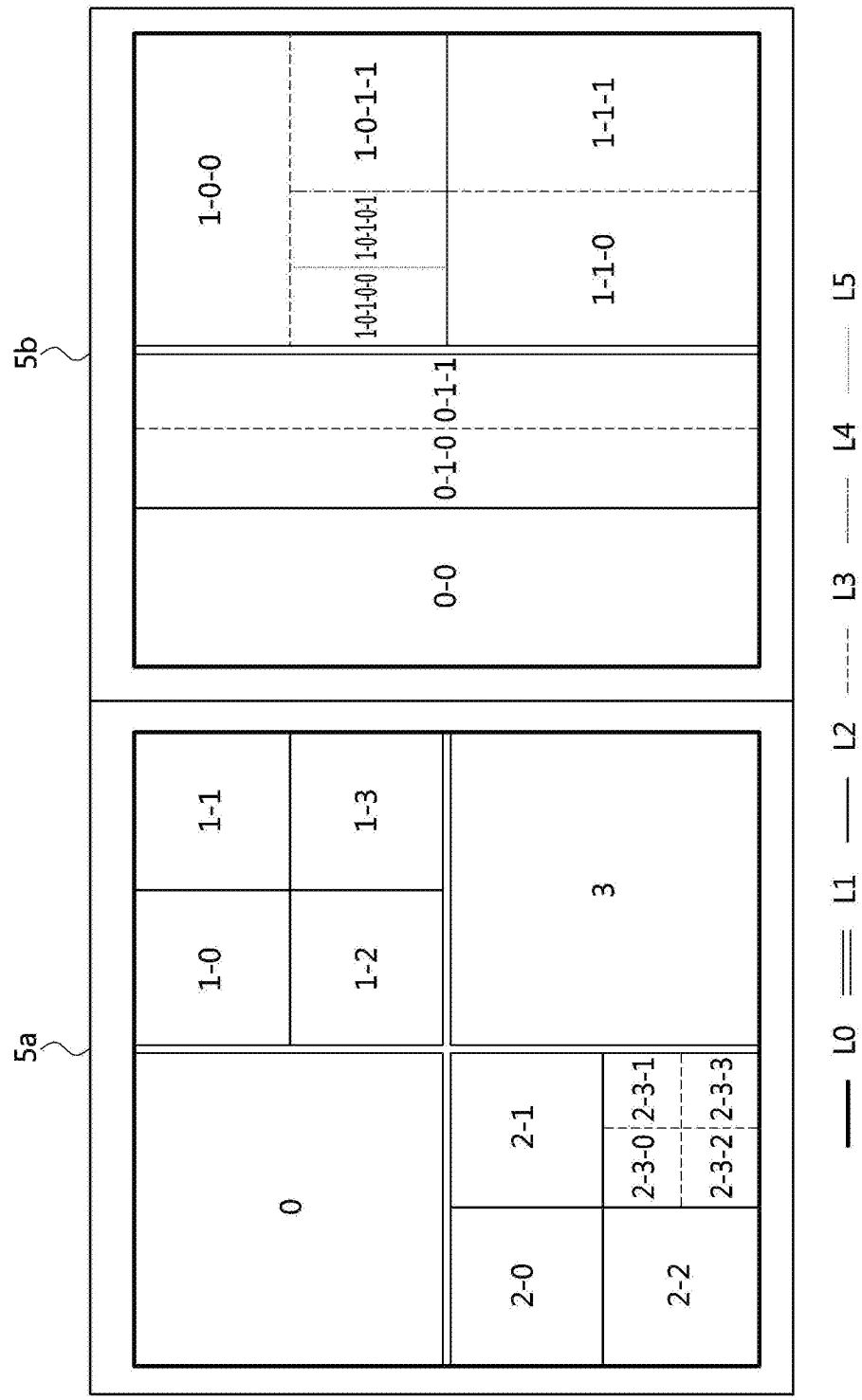
FIG. 5 is an exemplary diagram for describing quadtree type partitioning and binary tree type partitioning according to one embodiment of the present invention.

FIG. 5 is an exemplary diagram for describing quadtree type partitioning and binary tree type partitioning according to one embodiment of the present invention.

Referring to FIG. 5, a bold solid line L0 represents a maximum coding block, blocks split by lines L1 to L5, other than the bold solid line, may represent split coding blocks, and figures inside the blocks represent positions of split sub-blocks (in the present example, in accordance with a raster scan order), the number of "-" represents a split depth of a corresponding block, and the number of boundary lines between blocks represents the number of splits. For example, in the case of quad-split partitioning (in the present example, a quadtree scheme), an order of UL(0)-UR(1)-DL(2)-DR(3) may be provided, and in the case of binary-split partitioning (in the present example, a binary tree scheme), an order of L or U (0)-R or D (1) may be provided, which may be defined in each depth.

Meanwhile, obtainable coding blocks may be limited according to various factors.

In one example, it is assumed that a maximum coding block in FIG. 5a is a 64×64 block, a minimum coding block is a 16×16 block, and quadtree partitioning is used. In this case, blocks 2-0, 2-1, and 2-2 (in the present example, a size of 16×16) have the same size as the minimum coding block, and thus they may not be split into smaller blocks as blocks 2-3-0, 2-3-1, 2-3-2, and 2-3-3 (in the present example, a size of 8×8). In this case, a block obtainable from blocks 2-0, 2-1, 2-2, and 2-3 is a 16×16 block, that is, there is only one set of candidates, so that block split information is not generated.

In one example, it is assumed that a maximum coding block of 5*b* is a 64×64 block, a minimum coding block is 8 in width or height, and an allowable depth is 3. In this case, since block 1-0-1-1 (in the present example, a size of 16×16 and a depth of 3) satisfies requirements for a minimum coding block, it may be split into smaller blocks. However, since the depth of the block 1-0-1-1 is identical to the allowable depth, the block may not be split into blocks of a greater depth (in the present example, blocks 1-0-1-0-0 and 1-0-1-0-1). In this case, a block obtainable from the blocks 1-0-1-0 and 1-0-1-1 is a 16×8 block, that is, only one set of candidates is available, so that block split information is not generated.

As described above, the quadtree type partitioning or the binary tree type partitioning may be supported according to the encoding settings. Alternatively, a combination of the quadtree type partitioning and the binary tree type partitioning may be supported. For example, one or a combination of the above schemes may be supported according to a size, depth, or the like of a block. When a block falls within a first block range from Min_Q to Max_Q, the quadtree scheme may be supported, and when a block falls within a second block range from Min_B to Max_B, the binary tree scheme may be supported. When one or more partitioning schemes are supported, one or more of settings, such as a maximum size of a coding block, a minimum size of a coding block, an allowable depth, and the like, may be provided according to the available method. The above ranges may or may not be set to overlap each other. Alternatively, one range may be set to include another range. The settings for the ranges may be determined according to an individual or a combination of factors, such as a slice type, a coding mode, a color component, and the like.

In one example, a block partitioning setting may be determined according to a slice type. In the case of an I-slice, a supported block partitioning setting of a quadtree scheme may support splitting within a range between 128×128 and 32×32 and a block partitioning setting of a binary tree scheme may support splitting within a range between 32×32 and 8×8. In the case of a P/B-slice, a supported block partitioning setting of a quadtree scheme may support splitting within a range between 128×128 and 32×32 and a block partitioning setting of a binary tree scheme may support splitting within a range between 64×64 and 8×8.

In one example, the block partitioning setting may be determined according to a coding mode. In the case of intra mode, a supported block partitioning setting of a binary tree scheme may support splitting within a range between 64×64 and 8×8 and an allowable depth of 2. In the case of inter mode, a supported block partitioning setting of a binary tree scheme may support splitting within a range between 32×32 and 8×8 and an allowable depth of 3.

In one example, the block partitioning setting may be determined according to a color component. In the case of a luminance component, for the quadtree scheme, partitioning within a range between 256×256 and 64×64 may be supported, and for the binary tree scheme, partitioning within a range between 64×64 and 16×16 may be supported. In the case of a chrominance component, for the quadtree scheme, the same settings as those for the brightness component (in the present example, a setting in which lengths of each block are proportional to each other according to a chrominance format) may be supported, and for the binary tree scheme, partitioning within a range between 64×64 and 4×4 (in the present example, assuming that a range for the same luminance component is between 128×128 and 8×8 in 4-2:0 format) may be supported.

Figure 6:
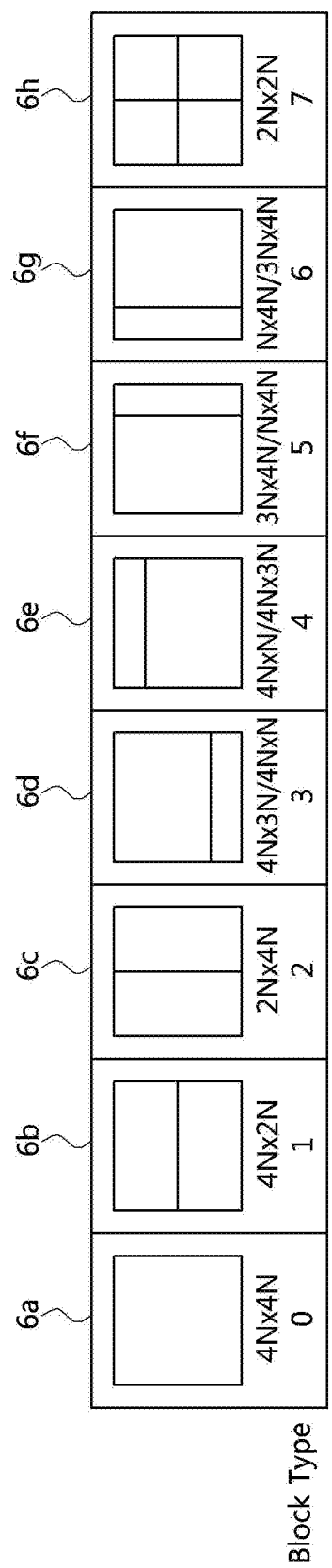
FIG. 6 is an exemplary diagram illustrating a form of a prediction block obtained by partitioning a coding block according to one embodiment of the present invention.

FIG. 6 is an exemplary diagram illustrating a form of a prediction block obtained by partitioning a coding block according to one embodiment of the present invention.

As a method of partitioning into a prediction block, a block split form having one or more sets of candidates may be supported in a single layer (in the present example, one depth of 0), and block partitioning may be supported with additional support for a depth. When partitioning into prediction blocks in a single layer is supported, index information may be generated through various binarization processes on two or more block split forms to represent information on block split forms, and when partitioning into prediction blocks in multiple layers is supported, information about a split flag is generated according to the partitioning scheme (in the present example, quadtree scheme, binary tree scheme, or the like) to represent information about the block split forms. In partitioning into prediction blocks according to the present invention, a description will be given of a method of representing information about block split forms by generating index information on two or more block forms in a single layer.

FIG. 6 illustrates examples of a block split form obtainable from a single layer. Although a coding block is a square block in FIG. 6, a rectangular coding block may also be applied by changing a width-height ratio thereof to the same ratio shown in FIG. 6.

It may be possible to set some in a set of candidates in FIG. 6 as a set of prediction block candidates according to encoding settings. In the case of HEVC, when the coding mode is intra prediction, block types 6*a* and 6*h* may be included in a set of prediction block form candidates. In the case of inter-picture prediction, block types 6*a*, 6*b*, 6*c*, and 6*d* may be included in a set of candidates. In a setting that includes a set of unequal split candidates, block types 6*a* to 6*h* may be included in the set of candidates.

Figure 7:
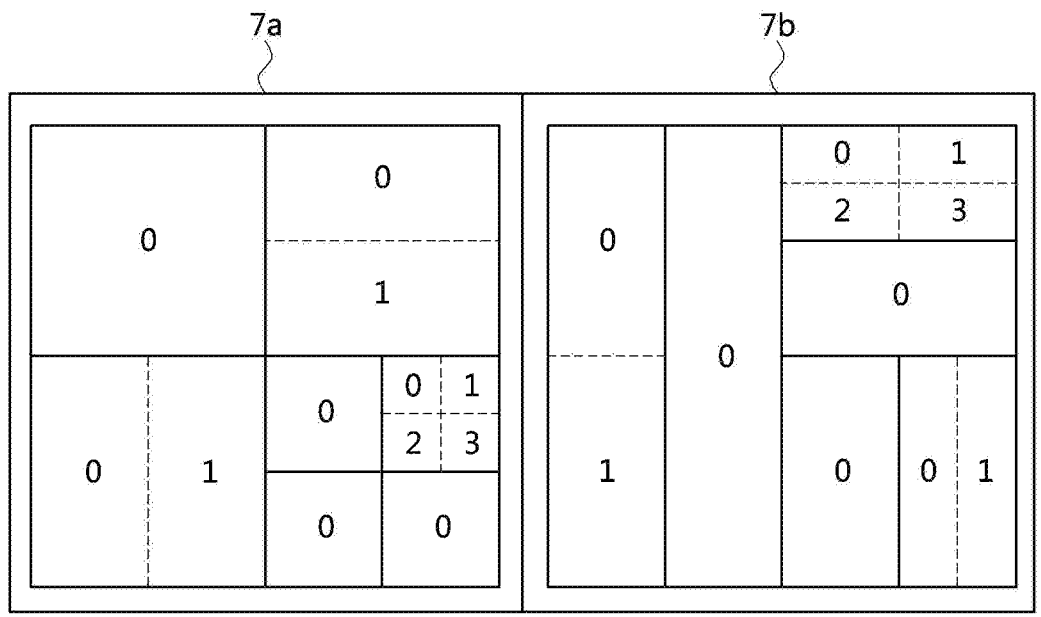
FIG. 7 is an exemplary diagram illustrating an example in which a prediction block is partitioned from a coding block according to one embodiment of the present invention.

FIG. 7 is an exemplary diagram illustrating an example in which a prediction block is partitioned from a coding block according to one embodiment of the present invention.

Referring to FIG. 7, a solid line represent a coding block, and a block defined by a solid line and a dotted line represents a prediction block. The numbers in the blocks represent positions of the prediction blocks (in the present example, in accordance with a raster scan order) split from each coding block.

Reference numeral 7*a* represents an example in which a square coding block is obtained through quadtree partitioning and a prediction block is obtained from a coding block, and reference numeral 7*b* represents an example in which a rectangular coding block is obtained through a binary tree partitioning and a prediction block is obtained from the coding block. Alternatively, in 7*a*, a quadtree scheme or a binary tree scheme may be used to obtain a prediction block partitioned from the coding block, and in 7*b*, a quadtree scheme or a binary tree scheme may be used to partition the coding block into the prediction blocks.

Assuming that supported prediction block forms are block types 6*a*, 6*b*, 6*c*, and 6*h* of FIG. 6, prediction blocks to be obtained from a square coding block may be M×M, M×M/2, M/2×M, and M/2×M/2 blocks, and prediction blocks to be obtained from a rectangular coding block may be M×N, M×N/2, M/2×N, and M/2×N/2 blocks. The prediction block obtained from the square coding block may have a width-height ratio or height-width ratio of 1:1 or 1:2, whereas the prediction blocks obtained from a rectangular coding block may have a ratio of 1:1 to 1:k according to the width-height ratio or height-width ratio of the coding block. In this case, k may be determined according to a maximum size of a coding block, a minimum size of a coding block, an allowable depth, a form of a prediction block, a prediction block partitioning scheme, and the like.

A split form or partitioning scheme of a prediction block may be set differently according to a partitioning scheme of a coding block. Alternatively, a split form or partitioning scheme of a prediction block may be set differently according to whether a coding block prior to partitioning of a prediction block is square shaped or rectangular shaped. Alternatively, a split form or a partitioning scheme of a prediction block may be set differently according to a coding mode. Alternatively, a split form or partitioning scheme of a prediction block may be set differently according to a size or depth of a coding block.

In one example, when a coding block is partitioned by a quadtree scheme or a coding block is square shaped, some in a set of candidates including block types 6a to 6h of FIG. 6 and other additional split forms may be included in split forms of the prediction block. Alternatively, split forms of block types 6a, 6b, and 6c of FIG. 6 may be included by partitioning a coding block using a quadtree scheme.

In one example, when a coding block is partitioned using a binary tree scheme or a coding block is square shaped, block type 6a may be included in a split form (M×N) of a prediction block. Alternatively, a spilt form (M×N) of block type 6a may be included by partitioning a prediction block using a binary tree scheme. This may imply that further partitioning is not supported in a prediction block unit. This may imply that partitioning in a prediction unit is not separately supported since a coding block of a rectangular form, in addition to a coding block of a square form, can be obtained in the process of obtaining a coding block. In the present example, a coding block and a prediction block are combined to share one partitioning scheme, and information about a split form of a prediction block may not be generated.

In one example, when a coding block is a rectangular block, the coding mode is intra mode, and a square prediction block is supported as a prediction block in intra prediction, a prediction block may be partitioned with respect to a width or height of the coding block which is shorter than the other. When the coding block is a 2M×M block and a coding mode is intra mode, the prediction block may be split into two M×M blocks. In this case, information on splitting may not be generated.

In one example, when a coding block is a rectangular block, a coding mode is intra mode, and a square block and a rectangular block are supported as intra prediction blocks, some in a set of candidates including block types 6a to 6h and other additional split forms may be included in split forms of a prediction block. Alternatively, split forms of block types 6a and 6h of FIG. 6 may be included by partitioning a prediction block using a quadtree scheme.

In one example, when a coding block is a square block, a coding mode is intra mode, and a square block and a rectangular block are supported as intra-prediction blocks, some in a set of candidates including block types 6a to 6h of FIG. 6 and other additional split forms may be included in split forms of a prediction block. Alternatively, split forms of block types 6a, 6b, and 6c of FIG. 6 may be included by partitioning a prediction block using a binary tree scheme.

In one example, when a coding block is within a first block range (Min1 to Max1), some (candidate set 1) in a set of candidates including block types 6a to 6h of FIG. 6 and other additional block forms may be included in split forms of a prediction block. When the coding block is within a second block range (Min2 to Max2), some (candidate set 2) in a set of candidates including block types 6a to 6h of FIG. 6 and other additional block forms may be included in split forms of a prediction block.

A maximum size of a prediction block may be the same as or smaller than a maximum size of a coding block and a minimum size of a prediction block may be the same as or smaller than a minimum size of a coding block. Accordingly, split forms of the prediction block may be limitedly supported.

In one example, assuming that a maximum size of a coding block is 64×64, a current coding block is a 64×64 block, a maximum size of a prediction block is 32×32, and sets of supportable prediction block candidates are M×N (with respect to a coding block), M×N/2, M/2×N, and M/2×N/2, prediction block candidates may be 64×64, 64×32, 32×64, and 32×32 blocks. Among these candidates, a 32×32 block may be a supportable candidate and split information may be implicitly determined as 32×32 without generating information on prediction block candidates.

In one example, when a minimum size of a coding block is 8×8, a current coding block is a 16×8 block, a minimum size of a prediction block is 8×8, and sets of supportable prediction block candidates are M×N (with respect to a coding block), M×N/2, M/2×N, and M/2×N/2, the prediction block candidates may be 16×8, 16×4, 8×8, and 8×4 blocks. Since some of the prediction block candidates are smaller than the minimum size of a prediction block, 16×8 and 8×8 blocks, excluding the smaller blocks, may be included in the set of prediction block candidates, and index information may be generated through binarization using the candidates.

Figure 8:
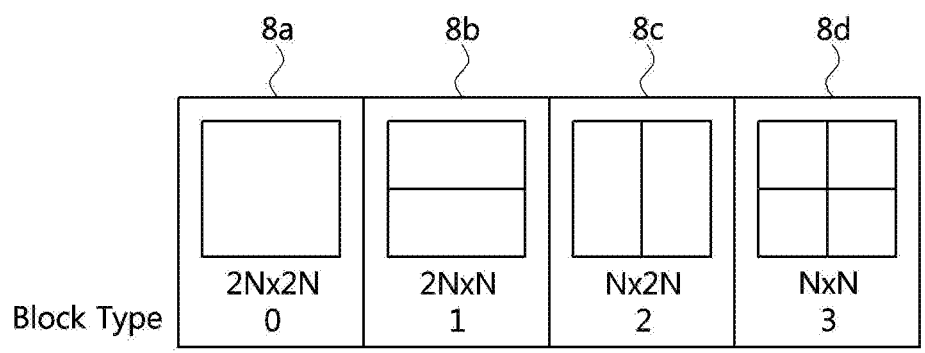
FIG. 8 is an exemplary diagram for describing a split form of a transform block according to one embodiment of the present invention.

FIG. 8 is a diagram for describing a split form of a transform block according to one embodiment of the present invention.

A transform block is a basic unit of transformation and may have one or more block forms through partitioning of a coding block. Alternatively, a transform block may have one or more block forms through partitioning of a prediction block.

In the case of HEVC, a transform block may be partitioned from a coding block using a quadtree scheme, and one or more square transform blocks may be obtained according to a minimum size of a transform block, an allowable depth, and the like.

In the case in which a rectangular transform block is constructed in addition to a square transform block, a supportable size of a transform block and a shape of a transform block may be determined according to settings of an encoder.

Referring to FIG. 8, in the case of HEVC in which a quadtree scheme is used as a method of obtaining a transform block, obtainable transform blocks may be block types 8a and 8d (in the present example, with reference to one depth). Transform blocks obtainable when a binary tree scheme is used may be block types 8a, 8b, and 8c, and transform blocks obtainable when the two schemes are used together may be block types 8a, 8b, 8c, and 8d. In the case of a quadtree scheme, a split flag associated with partitioning is supported, and when a corresponding flag is 1, block type 8a is exhibited, and when the corresponding flag is 0, block type 8d is exhibited. In the case of a binary tree scheme, one or more split flags are supported, wherein one flag of them may indicate whether a block is split, another flag may indicate whether a block is horizontally/vertically split, and still another flag may indicate whether horizontal/vertical splits are combined.

When a coding block prior to partitioning is a square block (M×M) as in the above example, transform blocks, such as M×M/2, M/2×M, and M/2×M/2 blocks, may be obtained.

When a coding block prior to partitioning is a rectangular block (M×N), transform blocks, such as M×N/2, M/2×N, and M/2×N/2 blocks, may be obtained. According to a width-height ratio and depth of the coding block, transform blocks having a width-height ratio, such as M×N/4, M×N/8, M/4×N, M/8×N, M/2×N/4, and M/4×N/2, may be obtained.

Here, additional transform blocks (for example, a block with a width/height ratio different from that in the above example) may be obtained through a quadtree scheme, a binary tree scheme, and other schemes modified therefrom.

Transform blocks in various sizes and forms may be obtained according to a maximum size of a transform block, a minimum size of a transform block, an allowable depth, and a partitioning method in accordance with settings of an encoder. In this case, a depth may be checked with reference to a coding block (in the present example, a depth in the coding block is 0), and when the depth is increased, a coding block is partitioned into smaller transform units and may be partitioned up to the minimum transform units.

Figure 9:
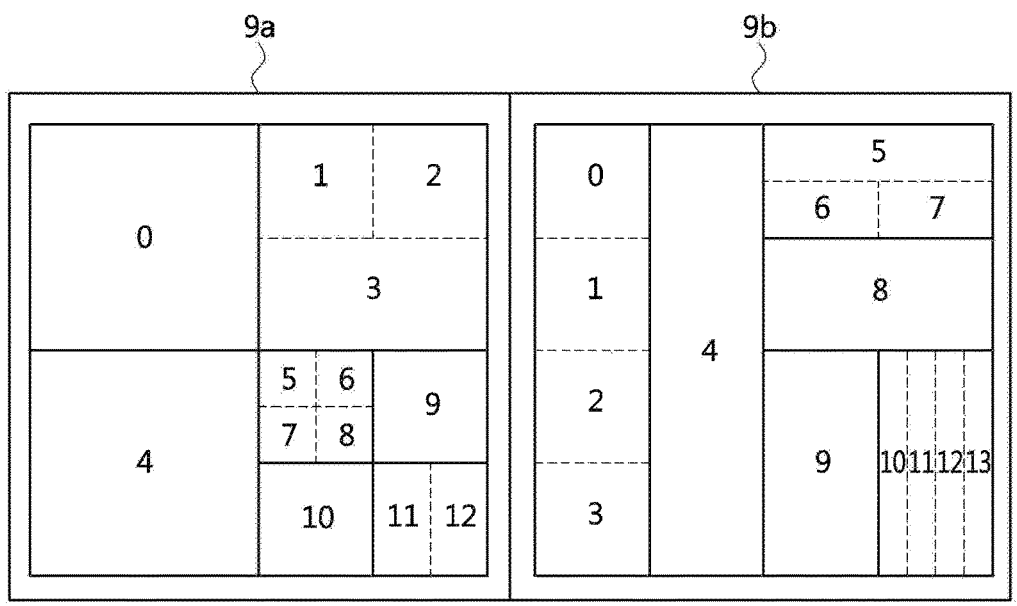
FIG. 9 is an exemplary diagram for describing a method in which a transform block is partitioned from a coding block according to one embodiment of the present invention.

FIG. 9 is a diagram for describing a method in which a transform block is partitioned from a coding block according to one embodiment of the present invention.

Referring to FIG. 9, reference numerals 9a and 9b denote transform blocks split from a coding block by solid lines or dotted lines, and a number is assigned to each block to indicate each transform block.

In the case of transform block 9a, a coding block is partitioned using a quadtree scheme, and in the case of transform block 9b, a coding block is partitioned using a binary tree scheme. Assuming that the transform blocks 9a and 9b have forms obtained by using a quadtree scheme together with a binary tree scheme, block types 8a, 8b, 8c, and 8d of FIG. 8 may be assumed to be obtainable transform blocks. In addition, in the present example, it is assumed that the coding block has a split form shown in FIG. 7 and FIG. 9 and FIG. 7 illustrate examples of partitioning of a transform unit and partitioning of a prediction unit.

In transform block 9a, block 4 is a square coding block partitioned by a quadtree scheme and indicates a transform block in the same form as block type 8a of FIG. 8 which is not split at a depth of 0, and a block formed by a combination of blocks 1, 2, and 3 is a square coding block partitioned using a quadtree scheme, blocks 1 and 2 indicate transform blocks in the same form as block type 8c of FIG. 8 which is split at a depth of 1, and block 3 indicates a transform block in the same form as block type 8b of FIG. 8 which is split at a depth of 0. When block 4 (transform block) is compared with blocks 0 and 1 (prediction blocks) located at the same positions in 7a of FIG. 7 as block 4, unlike 7a in which blocks 0 and 1 are split, block 4 in 8a is not split, so that there is no influence between the prediction block and the transform block. However, when blocks 1 to 3 (transform blocks) are compared with blocks 0 and 1 (prediction blocks) at the same positions in 7a of FIG. 7 as block 1 to 3, it can be seen that split forms of prediction blocks of 7a affect split forms of blocks 1 to 3. That is, whether partitioning of a transform block and partitioning of a prediction block are performed independently of each other, or dependent on each other may be determined according to settings of an encoder.

A split form of a transform block may be set differently according to a partitioning scheme of a coding block. Alternatively, a split form of a transform block may be set differently according to whether a coding block prior to partitioning of a transform block is square shaped or rectangular shaped. Alternatively, a split form of a transform block may be set differently according to a coding mode. Alternatively, a split form of a transform block may be set differently according to a size or depth of a transform block.

In one example, when a coding block is partitioned using a quadtree scheme or when a coding block is a square block and a square block is supported as a transform block, split forms of a transform block in a quadtree scheme, as shown in block types 8a and 8d of FIG. 8, may be included. When a block is split into two or more blocks as shown in block type 8d, further partitioning using a quadtree scheme may be feasible according to a depth.

In one example, when a coding block is partitioned using a quadtree scheme, or when a coding block is a square block and a rectangular form and a square form are supported as transform blocks, split forms of transform blocks in a binary tree scheme, as shown in block types 8a, 8b, and 8c of FIG. 8, may be included. When a coding block is split into two or more blocks, block types such as 8a, 8b, and 8c of FIG. 8, may be included. When the coding block is split into two or more blocks as shown in block types 8b and 8c, further binary tree-type partitioning may be possible according to a depth.

In one example, when a coding block is partitioned using a binary tree scheme, or when the coding block is a square block and a square block is supported as a transform block, split forms of transform blocks in a binary tree scheme, as shown in block types 8b and 8c of FIG. 8, may be included. That is, the transform block may be partitioned with respect to a width or height of a block that is shorter than the other. For example, in a case of a 2N×N coding block, in block type 8c, two N×N transform blocks are obtainable, whereas in block type 8b, two 2N×N/2 transform blocks are obtained, which does not satisfy a condition that supports a square transform block, and thus such split forms may be excluded from transform block partition candidates. In this case, a transform block split flag of a binary tree scheme may be omitted because block type 8c is the only candidate. In another example, in a case of an N×4N coding block, it is difficult to obtain square transform blocks through a block type 8b or 8c. In this case, the coding block is partitioned into two N×2N transform blocks through block type 8b at a depth of 0 and each of the two N×2N transform blocks is split into two N×N transform blocks at an each depth of 1, so that the coding block can be partitioned into a total of 4 N×N transform blocks. In this case, a transform block split flag may also be omitted because block type 8b is an only split flag candidate at each depth.

In one example, when a coding block is partitioned using a binary tree scheme, or when a coding block is a square block, block type 8a of FIG. 8 may be included in a split form (M×N) of a transform block. This may imply that further partitioning in a transform block unit is not supported. This implies that a transform block split flag may be omitted.

Quadtree type partitioning or binary tree type partitioning may be supported according to an encoding setting. Alternatively, a combination of the quadtree type partitioning and the binary tree type partitioning may be supported. For example, one or a combination of the above schemes may be supported according to a size, depth, or the like of a block. When a block falls within a first block range from Min_Q to Max_Q, the quadtree scheme may be supported, and when a block falls within a second block range from Min_B to Max_B, the binary tree scheme may be supported. When one or more partitioning schemes are supported, one or more of settings, such as a maximum size of a transform block, a minimum size of a transform block, an allowable depth, and the like, may be provided according to the available method. The above ranges may or may not be set to overlap each other. Alternatively, one range may be set to include another range. The settings for the ranges may be determined according to the individual or combined factors, such as a slice type, a coding mode, a color component, and the like.

In one example, a block splitting setting may be determined according to a slice type. In the case of an I-slice, a supported block splitting setting of a quadtree scheme may support splitting within a range between 64×64 and 16×16 and a block splitting setting of a binary tree scheme may support splitting within a range between 16×16 and 4×4. In the case of a P-slice, a supported block splitting setting of a quadtree scheme may support splitting within a range between 64×64 and 16×16 and a block splitting setting of a binary tree scheme may support splitting within a range between 32×32 and 4×4.

In one example, the block splitting setting may be determined according to a coding mode. In the case of an intra mode, a supported block splitting setting of a binary tree scheme may support splitting within a range between 16×16 and 4×4 and an allowable depth of 3. In the case of inter mode, a supported block splitting setting of a binary tree scheme may support splitting within a range between 32×32 and 4×4 and an allowable depth of 4.

In one example, the block splitting setting may be determined according to a color component. In the case of a luminance component, for the quadtree scheme, partitioning within a range between 64×64 and 8×8 may be supported, and for the binary tree scheme, partitioning within a range between 32×32 and 8×8 may be supported. In the case of a chrominance component, for the quadtree scheme, the same settings as those for the brightness component (in the present example, a setting in which lengths of each block are proportional to each other according to a chrominance format) may be supported, and for the binary tree scheme, partitioning within a range between 8×8 and 4×4 may be supported.

In addition, a square transform block or a rectangular transform block may be supported according to an encoding setting. Alternatively, a combination of the square transform block and a rectangular transform block may be supported. For example, one or a combination of the above forms of transform blocks may be supported according to a size, depth, or the like of a block. When a block falls within a first block range from Min_S to Max_S, the square form may be supported, and when a block falls within a second block range from Min_R to Max_R, the rectangular form may be supported. When one or more partitioning schemes are supported, one or more of settings, such as a maximum size of a transform block, a minimum size of a transform block, an allowable depth, and the like, may be provided according to the available method. The above ranges may or may not be set to overlap each other. The settings for the ranges may be determined according to the individual or combined factors, such as a slice type, a coding mode, a color component, and the like.

A maximum size of a transform block may be the same as or smaller than a maximum size of a coding block and a minimum size of a transform block may be the same as or smaller than a minimum size of a coding block. Accordingly, split forms of the transform block may be limitedly supported.

In one example, assuming that a maximum size of a coding block is 64×64, a current coding block is a 64×64 block, a maximum size of a transform block is 32×32, and supportable transform block candidates are 32×32, 32×16, 16×32, and 16×16 blocks, and sets of candidates are block types 8a, 8b, 8c, and 8d of FIG. 8 in which a binary tree scheme and a quadtree scheme are used together as supported transform block partitioning methods, block types 8a, 8b, and 8c may be excluded from splitting candidates at a depth of 0. In the case of block type 8a which is not split, no transform block is supported. In the case of block types 8b and 8c, sets of transform block partition candidates supported when 64×32 and 32×64 blocks obtained by splitting are further partitioned may be 64×32(a), 32×32(b), 64×16(c), and 32×16(d)(in the case of a 64×32 block). In this case, 64×32 and 64×16 blocks may still not be supported at a depth of 1. On the other hand, sets of transform block partition candidates supported when block type 8d of FIG. 8 is split at a depth of 1 may be 32×32(a), 32×16(b), 16×32(c), and 16×16(d), and all sets of transform block candidates may be supported at a depth of 1.

In one example, assuming that a current coding block is a 16×8 block, a minimum size of a transform block is 4×4, and supportable transform block candidates are 16×16, 164, 8×16, 8×8, 8×4, 48, and 4×4 blocks, an allowable depth is 2, and sets of candidates are block types 8a, 8b, 8c, and 8d of FIG. 8 in which a binary tree scheme and a quadtree scheme are used together as supported transform block partitioning methods, sets of transform block partition candidates supported at a depth of 0 may be 16×8(a), 16×4(b), 8×8(c), and 8×4(d). In this case, a 16×4 block is not a supported transform block, and hence 16×8, 8×8, and 8×4 blocks, excluding a 16×4 block, may be included in a set of transform block candidates, and split information may be generated through binarization using the candidates.

Hereinafter, a transformer of the present invention will be described in detail.

The transformer may use various schemes, such as the Hadamard transform, DCT-based transform, DST-based transform, and the like, as a transform method. At least one of the above-mentioned schemes may be supported and at least one detailed transform scheme of each transform scheme may be supported. In this case, the at least one detailed transform scheme may be a transform scheme in which a part of a base vector in each transform scheme is differently configured. For example, a DCT-based transform and DST-based transform may be supported as transform schemes, and in the case of a DCT-based transform, detailed transform schemes, such as DCT-I, DCT-II, DCT-III, DCT-V, and DCT-VI, may be supported.

One (one transform scheme && one detailed transform scheme) of the above-mentioned transform schemes may be set as a basic transform scheme and an additional transform scheme (two or more transform schemes two or more detailed transform schemes) may be supported. Whether an additional transform scheme is supported may be determined on a unit-by-unit basis, such as a sequence, a picture, a slice, a tile, or the like, and related information may be generated on such a unit-by-unit basis.

Transformation may be performed in horizontal and vertical directions. For example, a one-dimensional transform may be performed in a horizontal direction using a base vector of transformation and a one-dimensional transform may be performed in a vertical direction, thereby performing a two-dimensional transform in total, so that a pixel value of a spatial axis may be transformed into a frequency axis.

In addition, transforms in horizontal and vertical directions may be adaptively applied. For example, in intra prediction, when a prediction mode is a horizontal mode, DCT-I may be used in a horizontal direction and DST-I may be used in a vertical direction. In the case of a vertical mode, DST-II may be used in a horizontal direction and DCT-I may be used in a vertical direction. In the case of a diagonal down left mode, DCT-I may be used in a horizontal direction and DCT-II may be used in a vertical direction. In the case of a diagonal down right mode, DST-I may be used in a horizontal direction and DST-II may be used in a vertical direction.

According to an encoding setting, a rectangular transform may be further supported in addition to a square transform. Various cases when square and rectangular transforms are supported have been described with reference to the transform block partitioning process.

The square transform among the above transform shapes may be set as a basic transform shape, and an additional transform shape (in the present example, a rectangular shape) may be supported. Whether an additional transform shape is supported may be determined on a unit-by-unit basis, such as a sequence, a picture, a slice, a tile, or the like, and related information may be generated on such a unit-by-unit basis.

Support for a transform block form may be determined according to encoding information. Here, the encoding information may be a slice type, a coding mode, a size and shape of a block, a block partitioning scheme, and the like. One transform shape may be supported according to at least one piece of encoding information and two or more transform shapes may be supported according to at least one piece of encoding information. The former may be an implicit case and the latter may be an explicit case. In the explicit case, adaptive selection information indicating an optimal set of candidates among two or more sets of candidates may be generated and included in a bit stream.

In one example, support for a rectangular transform may be determined according to a slice type. In the case of an I-slice, a supported transform shape may be a square shape, and in the case of a P/B slice, a square or rectangular transform may be supported.

In one example, support for a rectangular transform may be determined according to a coding mode. In the case of intra mode, a supported transform shape may be a square shape, and in the case of inter mode, a supported transform shape may be a rectangular or square shape.

In one example, support for a rectangular transform may be determined according to a size and shape of a block. A transform shape supported in a block of a certain size or greater may be a square shape, and a transform shape supported in a block of a size smaller than the certain size may be a rectangular shape or a square shape.

In one example, support for a rectangular transform may be determined according to a block partitioning scheme. In a case where a block in which a transform is performed is a block obtained through a quadtree partitioning scheme, a supported transform shape may be a square shape, and in a case of a block obtained through a binary tree partitioning scheme, a supported transform shape may be a square shape or a rectangular shape.

The above examples are directed to transform shape support in accordance with one piece of encoding information, and two or more pieces of information may be combined to be involved in setting of additional transform shape support. The above examples are merely examples of additional transform shape support in accordance with various encoding settings, and the additional transform shape support is not limited to the above examples, such that various modified examples are possible.

A transform process may be omitted depending on the encoding settings or a feature of an image. For example, the transform process may be omitted according to a quantization parameter (in the present example, QP=0 in a lossless compression environment). In another example, the transform process may be omitted when compression performance through a transform is not achieved due to a feature of an image. In this case, a transform to be omitted may be all units, or a transform on one of horizontal and vertical units may be omitted. Whether the omission is supported may be determined according to a size and shape of a block.

For example, in a setting in which joint omission of a vertical transform and a horizontal transform takes place, when a transform omission flag is 1, transforms in horizontal and vertical directions may not be performed, and when the transform omission flag is 0, transforms in horizontal and vertical directions may be performed. In a setting in which omission of a horizontal transform and omission of a vertical transform are independently performed, when a first transform omission flag is 1, a transform in a horizontal direction is not performed, and when the first transform omission flag is 0, the transform in a horizontal direction is performed. When a second transform omission flag is 1, a transform in a vertical direction is not performed, and when the second transform omission flag is 0, the transform in a vertical direction is performed.

When a size of a block falls within a range A, transform omission may be supported, and when the size falls within a range B, the transform omission may not be supported. For example, when a width of a block is greater than M or a height of the block is greater than N, the above-described transform omission flag may not be supported, and when a width of a block is smaller than m or a height of the block is smaller than n, the above-described transform omission flag may not be supported. M (m) and N (n) may be identical to or different from each other. The transform-related settings may be determined on a unit-by-unit basis, such as a sequence, a picture, a slice, or the like.

When an additional transform scheme is supported, the transform scheme setting may be determined according to the encoding information. In this case, the encoding information may be a slice type, a coding mode, a size and shape of a block, a prediction mode, or the like.

In one example, support for a transform scheme may be determined according to a slice type. In the case of an I-slice, transform schemes supported may be DCT-I, DCT-II, DST-I, and DST-II, in the case of a P-slice, transform schemes supported may be DCT-I, DST-I, and DST-II, and in the case of a B-slice, transform schemes supported may be DCT-I, DCT-II, and DST-I.

In one example, support for a transform scheme may be determined according to a coding mode. In the case of intra mode, transform schemes supported may be DCT-I, DCT-I, DCT-III, DST-I, and DST-II, and in the case of inter mode, transform schemes supported may be DCT-I, DCT-II, and DST-II.

In one example, support for a transform scheme may be determined according to a size and shape of a block. A transform scheme supported in a block of a certain size or greater may be DCT-I, transform schemes supported in a block of a size smaller than a certain size may be DCT-I and DST-I, and transform schemes supported in a block having a size greater than or equal to a certain size and smaller than a certain size may be DCT-I, DCT-II, and DST-I. In addition, transform schemes supported in a square block may be DCT-I and DCT-II and transform schemes supported in a rectangular block may be DCT-I and DST-I.

In one example, support for a transform scheme may be determined according to a prediction mode. Transform schemes supported in prediction mode A may be DCT-I and DCT-II, transform schemes supported in prediction mode B may be DCT-I and DST-I, and a transform scheme supported in prediction mode C may be DCT-I. In this case, the prediction modes A and B are directional modes and the prediction mode C may be a non-directional mode.

The above examples are directed to transform scheme support in accordance with one piece of encoding information, and two or more pieces of information may be combined to be involved in setting of additional transform scheme support. The transform scheme support may not be limited to the above examples, and modifications of the examples may be possible.

Hereinafter, an intra prediction of the present invention will be described in detail.

A reference pixel preparation process is required prior to generating a prediction block of intra prediction. Pixels of encoding-completed neighbor blocks (in the present example, left, lower left, above left, above, and above right blocks) may be targets of the process, and pixels of neighbor blocks adjacent to a current block may be used as reference pixels for generating a prediction block. When any one of neighbor blocks is not available, pixel positions of the unavailable block may be filled with one or more pixels from an available neighbor block. In this case, an unavailable block may occur when the block is located outside a boundary of an image (a picture, a slice, a tile, or the like) or when there is a condition restricting the use according to a coding mode (intra/inter modes). In this case, a position of an available neighbor block may be determined according to encoding settings. For example, an available pixel spatially close to a pixel to be filled may be used or an available pixel (may be related to a prediction mode) considered as being highly correlated with a pixel to be filled may be used. This may be determined according to a position of a sub-block of a current block, which will be described with reference to an example described below. Reference pixels used in prediction of a current block may be managed using one temporary memory, which may be a memory only used in the predicting process of the current block.

Filtering may be applied to the reference pixels formed as described above. Filtering is performed for the purpose of reducing a prediction error due to a quantization error by applying a low pass filter to at least one reference pixel including the quantization error. Settings for filter information (one or more filter coefficients and one or more filter lengths) applied, the number and positions of reference pixels to which filtering is applied, whether filtering information is generated, and the like may be adaptively determined according to a size and shape of a prediction block or a transform block, an intra prediction mode, a position of a sub-block in a current block, etc.

According to a prediction mode, prediction may be performed by interpolating reference pixels in decimal units, as well as reference pixels in integer units. At this time, pixels used in interpolation may be pixels at both sides adjacent to a position to be interpolated, and additional pixels may be used. According to the number of pixels used in interpolation, a 4-tap filter, a 6-tap filter, and the like may be applied, and filter information (one or more filter lengths and one or more filter coefficients) may be adaptively determined according to a size and shape of a block.

Figure 10:
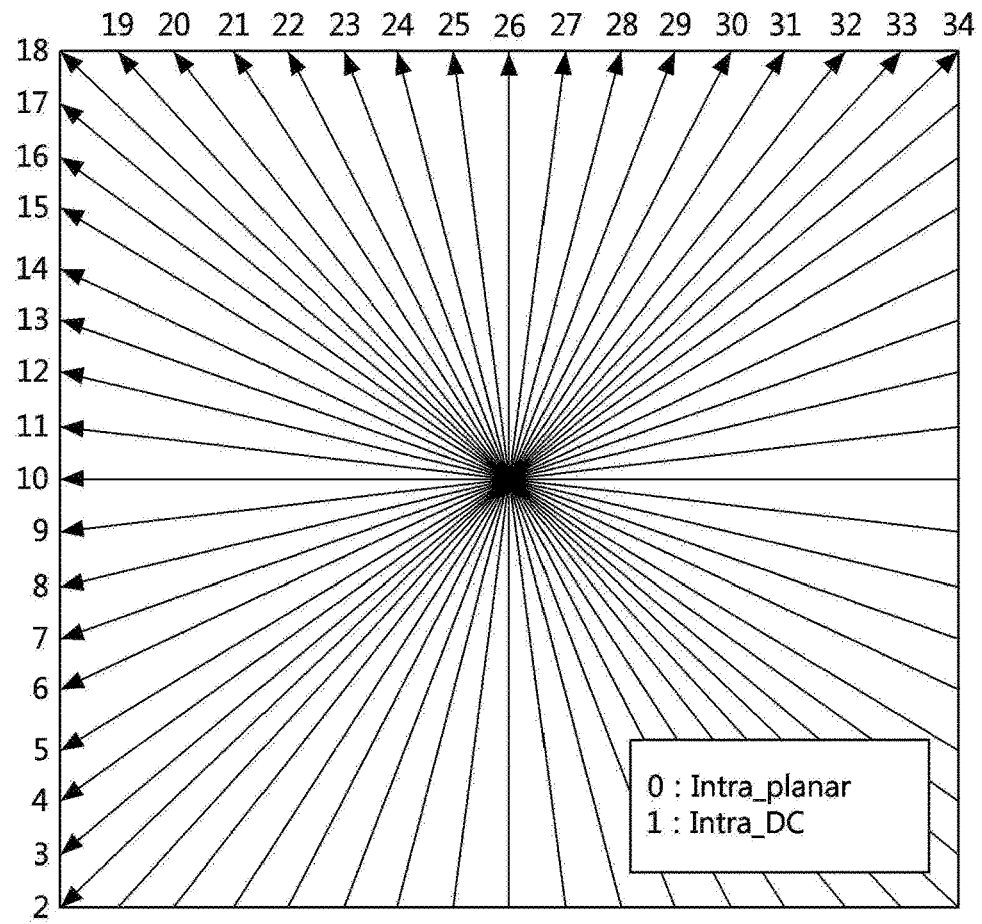
FIG. 10 is an exemplary diagram for describing an intra prediction mode performed in HEVC.

FIG. 10 is an exemplary diagram for describing an intra prediction mode performed in HEVC.

Referring to FIG. 10, in HEVC, a total of 35 modes (33 directional modes and 2 non-direction modes) are included to support intra prediction. A supported intra prediction mode may vary according to a size of a block. For example, 67 prediction modes may be supported for a 64×64 block, 35 prediction modes may be supported for a 32×32 block, and 19 prediction modes may be supported for a 16×16 block.

Also, according to a shape of a block, the supported intra prediction mode may be variable or definition of an intra-picture mode (in the present example, a mode spacing having directivity) may be changed.

Figure 11:
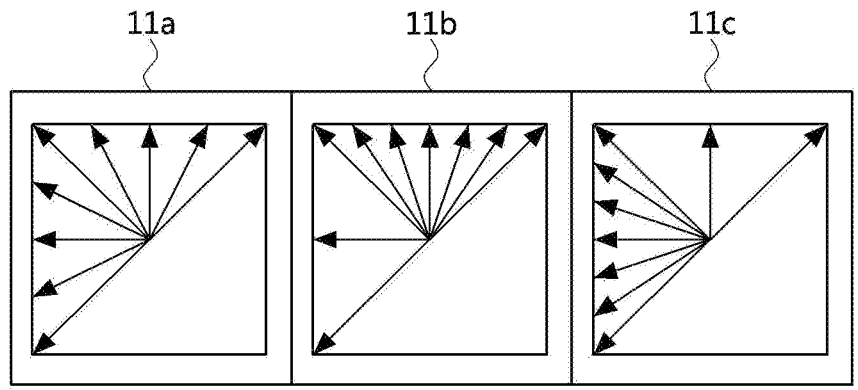
FIG. 11 is an exemplary diagram for describing an intra prediction mode according to one embodiment of the present invention.

FIG. 11 is an exemplary diagram for describing an intra prediction mode according to one embodiment of the present invention.

Referring to FIG. 11, in a case where a shape of a prediction block is a square (2N×2N), an intra prediction mode as shown in 11a of FIG. 11 may be supported, in a case where the prediction block shape is a horizontal rectangle (2N×N), an intra prediction mode as shown in 11b may be supported, and in a case where the prediction block shape is a vertical rectangle (N×2N), an intra prediction mode as shown in 11c may be supported. In the above examples, narrow mode spacing may be applied in a direction (a width or height direction) in which the prediction block is longest and wide mode spacing may be applied in a direction in which it is shortest. Factors, such as a size of a prediction block, the number of prediction modes in accordance with a shape, a prediction mode spacing, and the like, may be fixed, or various modifications thereof including variable cases of the above examples are possible.

Figure 12:
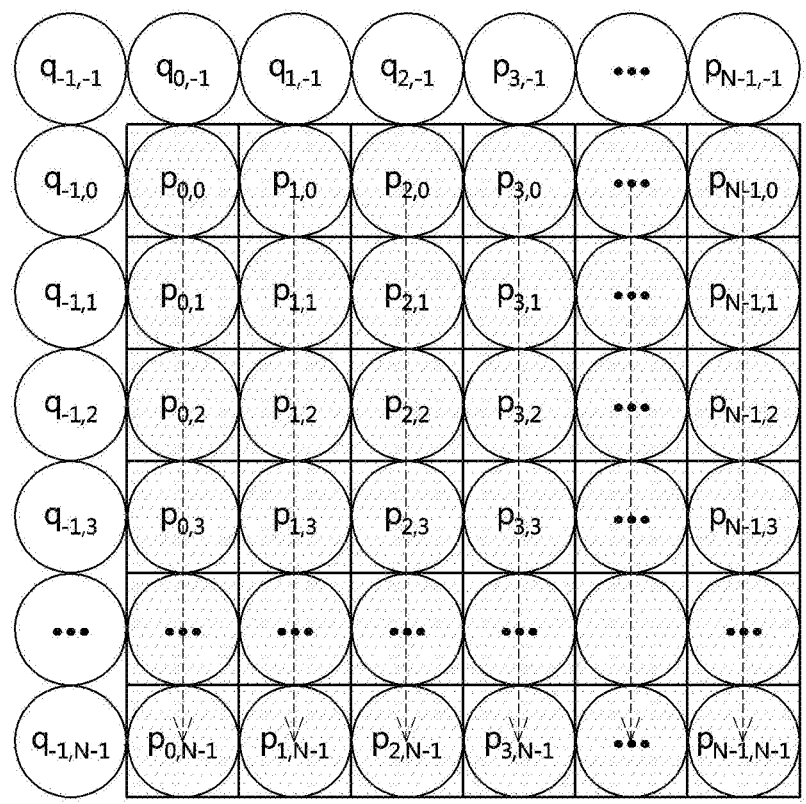
FIG. 12 is an exemplary diagram for describing reference pixels applicable to a horizontal or vertical mode according to one embodiment of the present invention.

FIG. 12 is an exemplary diagram for describing reference pixels applicable to a horizontal or vertical mode according to one embodiment of the present invention.

Intra prediction associated with a horizontal mode and a vertical mode of directional modes will be described with reference to FIG. 12. Reference letter p depicts a pixel predicted from a reference pixel, and reference letter q depicts a reference pixel of a neighbor block used in prediction. Reference pixels may be obtained from an encoding-completed block and may be pixels (in a case of a current block with a size of M×N<$p_{0,0}$~$p_{M-1,N-1}$>, $q_{-1,0}$ to $q_{-1,2N-1}$ and $q_{-1,-1}$ to $q_{2M-1,-1}$) belonging to the left, upper left, lower left, above, and above right blocks.

Figure 13:
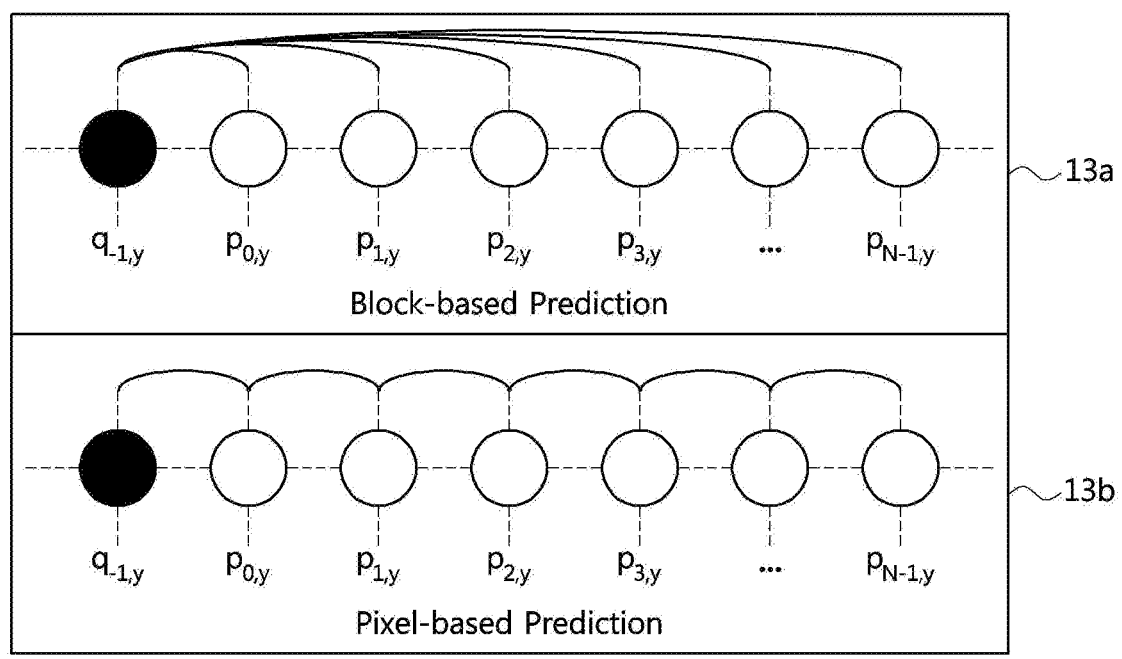
FIG. 13 is an exemplary diagram for comparison between general block-based prediction and pixel-based prediction.

FIG. 13 is an exemplary diagram for comparison between general block-based prediction and pixel-based prediction.

In the case of an intra prediction mode having directivity, a pixel value of p may be predicted by extrapolating a reference pixel q. In the case of an intra prediction mode having directivity, two methods may be used to generate a prediction block, wherein one of the methods may be a block-based prediction method or a pixel-based prediction method.

Referring to FIG. 13, reference numeral 13a denotes a block-based intra prediction method, in which reference pixel q belonging to a block adjacent to a current block may be used to predict all pixels in the current block.

On the other hand, reference numeral 13b denotes a pixel-based intra prediction method, in which reference pixel q is used only to predict adjacent pixels and each pixel may be predicted from an encoding-completed pixel adjacent to the pixel.

[Equation 1]

$$d_{x,y} = p_{x,y} - q_{-1,y} \qquad (1)$$

$$d_{x,y} = p_{x,y} - q_{x,-1} \qquad (2)$$

In Equation 1, d represents a difference value between an input pixel in the block-based prediction method and a predicted pixel and equations (1) and (2), respectively, indicate a case in which a prediction mode is a horizontal mode and a case in which a prediction mode is a vertical mode (in the following Equations, the same order applied). A prediction value may be generated only using reference pixels in integer units including in the above mode, or in a mode having different directivity, reference pixels in decimal units between the reference pixels in integer units may be obtained to generate a prediction value. In the present invention, for convenience of description, a case in which reference pixels in integer units are used is taken as an example. This may be altered according to a different prediction mode in which reference pixels in decimal units are applied.

[Equation 2]

$$d'_{x,y} = p_{x,y} - p_{x-1,y} \quad (3)$$

$$d'_{x,y} = p_{x,y} - p_{x,y-1} \quad (4)$$

In the above equations, d' represents a difference value between an input pixel and a predicted pixel in a pixel-based prediction method, and equations (3) and (4), respectively, indicate a case in which a prediction mode is a horizontal mode and a case in which a prediction mode is a vertical mode. In pixel-by-pixel prediction, since prediction is made using the nearest pixel located ahead in the prediction direction, a difference value between each of pixels at the first row and the first column and a reference pixel and a difference between each of the other pixels and a previous pixel may be obtained in each prediction mode. For example, in the case of a horizontal mode, $d_{x,y}$ may be a difference between $p_{x,y}$ and $p_{x-1,y}$, and in the case of a vertical mode, $d_{x,y}$ may be a difference between $p_{x,y}$ and $p_{x,y-1}$.

[Equation 3]

$$d'_{x,y} = d_{x,y} - d_{x-1,y} \quad (5)$$

$$d'_{x,y} = d_{x,y} - d_{x,y-1} \quad (6)$$

Referring to Equation 3, pixel-based differences may be expressed as equations (5) and (6) using difference values obtained through block-based prediction. That is, this indicates that a difference value through pixel-based prediction may be obtained using a difference value obtained through block-based prediction. In each prediction mode, except that a difference between pixels in the first row and the first column is the same as a block-based difference value and a pixel-based difference value, difference values through pixel-based prediction may be obtained using equations (5) and (6).

A residual block, which is a set of the difference values, may be constructed and may be restored through transform, quantization, and inverse processes thereof. A lossless or lossy residual block may be obtained according to a quantization parameter, and the restored residual block may be added to a block or a pixel-based prediction block so that a pixel may be restored.

[Equation 4]

$$p'_{x,y} = q_{-1,y} + d^*_{x,y} \quad (7)$$

$$p'_{x,y} = q_{x,-1} + d^*_{x,y} \quad (8)$$

Equation 4 represents a restoration process through block-based prediction, $p'_{x,y}$ represents a restored pixel, $d^*_{x,y}$ represents a restored difference value, and a lossless or loss value may be obtained according to a quantization parameter.

[Equation 5]

$$p'_{x,y} = p_{x-1,y} + d'^*_{x,y} \quad (9)$$

$$p'_{x,y} = p_{x,y-1} + d'^*_{x,y} \quad (10)$$

FIG. 5 represents a restoration process through pixel-based prediction, $p'_{x,y}$ represents a restored pixel, $d'^*_{x,y}$ represents a restored difference value, and a lossless or loss value may be obtained according to a quantization parameter.

[Equation 6]

$$p'_{x,y} = q_{-1,y} + \sum_{k=0}^{x} d^*_{k,y} \quad (11)$$

$$p'_{x,y} = q_{x,-1} + \sum_{k=0}^{y} d^*_{x,k} \quad (12)$$

Equation 6 is an equation derived by applying expressions in accordance with equations (5) and (6) of Equation 3 to Equation 5.

In the case of pixel-based prediction, it is possible to perform basic prediction and encoding and then perform additional prediction as postprocessing or to apply pixel-based prediction to the basic prediction and encoding. In the present invention, in the case of block-based prediction, an example in lossy compression will be given, and in the case of pixel-based prediction, an example in lossless compression will be given. A basic description will be given with reference to block-based prediction. In the case of intra prediction, prediction and the order of encoding may be differently applied according to a prediction block and a size and shape of a transform block. In the following examples, a description will be given on the assumption that a coding block is available in a square and a prediction block and a transform block are available in a square and rectangles. However, the examples are not limited to the above conditions such that a shape of a coding block is applicable to a rectangle, and modifications of the examples may be applicable to other conditions. Hereinafter, an intra prediction method according to one embodiment of the present invention will be described.

Figure 14:
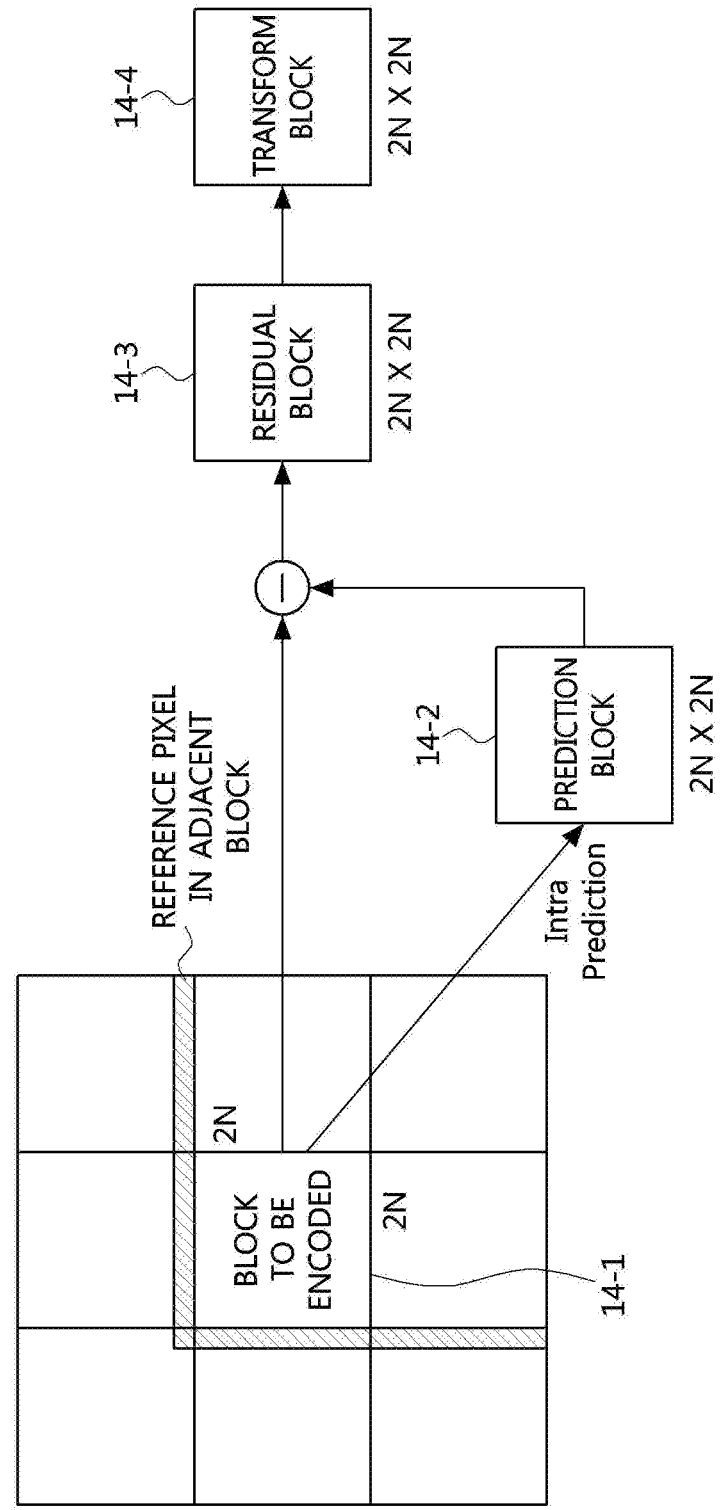
FIG. 14 is an exemplary diagram for describing a general intra prediction method.

FIG. 14 is an exemplary diagram for describing a general intra prediction method.

Referring to FIG. 14, intra prediction of a current block 2N×2N may be performed using reference pixels belonging to a neighbor block and adjacent to the current block to be encoded and a prediction block 14-2 may be generated. After a residual block 2N×2N 14-3 is obtained by a difference between the current block 2N×2N 14-2 to be encoded and the prediction block 2N×2N 14-2, a transform block 2N×2N may be obtained by transforming the residual block 2N×2N 14-3, and quantization may be performed on the transform block to develop an encoding process. At a decoder side, the residual block 14-3 may be restored through inverse quantization and inverse transform, and the current block 14-1 may be restored by combining the restored residual block and the prediction block 14-2.

Figure 15:
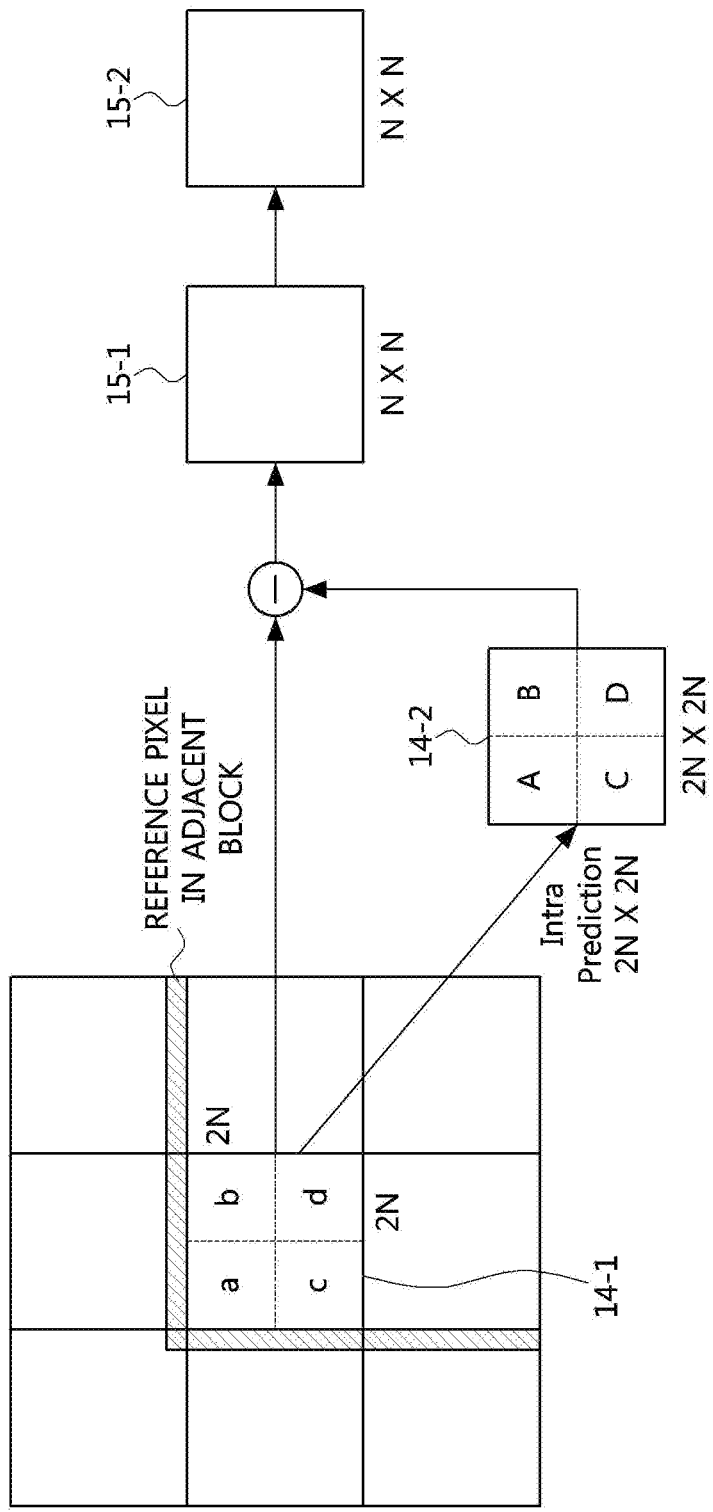
FIG. 15 is an exemplary diagram for describing a process in which transformation and quantization are independently performed on a residual block after intra prediction according to one embodiment of the present invention.

FIG. 15 is an exemplary diagram for describing a process in which transformation and quantization are independently performed on a residual block after intra prediction according to one embodiment of the present invention.

Referring to FIG. 15, a current block may be of 2N×2N form and a transform block may be of N×N form. In this case, when an encoding process is developed in accordance with a size of the transform block, prediction on each of sub-blocks a, b, c, and d (having a size of the transform block) of a current block 14-1 may be independently performed using reference pixels in a neighbor block, and for a prediction block 14-2 consisting of partitions A, B, C, and D obtained as a result of the prediction, encoding on a residual block of a and A and independent encoding on a residual block of b and B, a residual block of c and C, and a residual block of d and D may be performed. As such, through the independent encoding, parallel processing of encoding may be possible. However, the independent encoding may provide reduced prediction accuracy.

Figure 16:
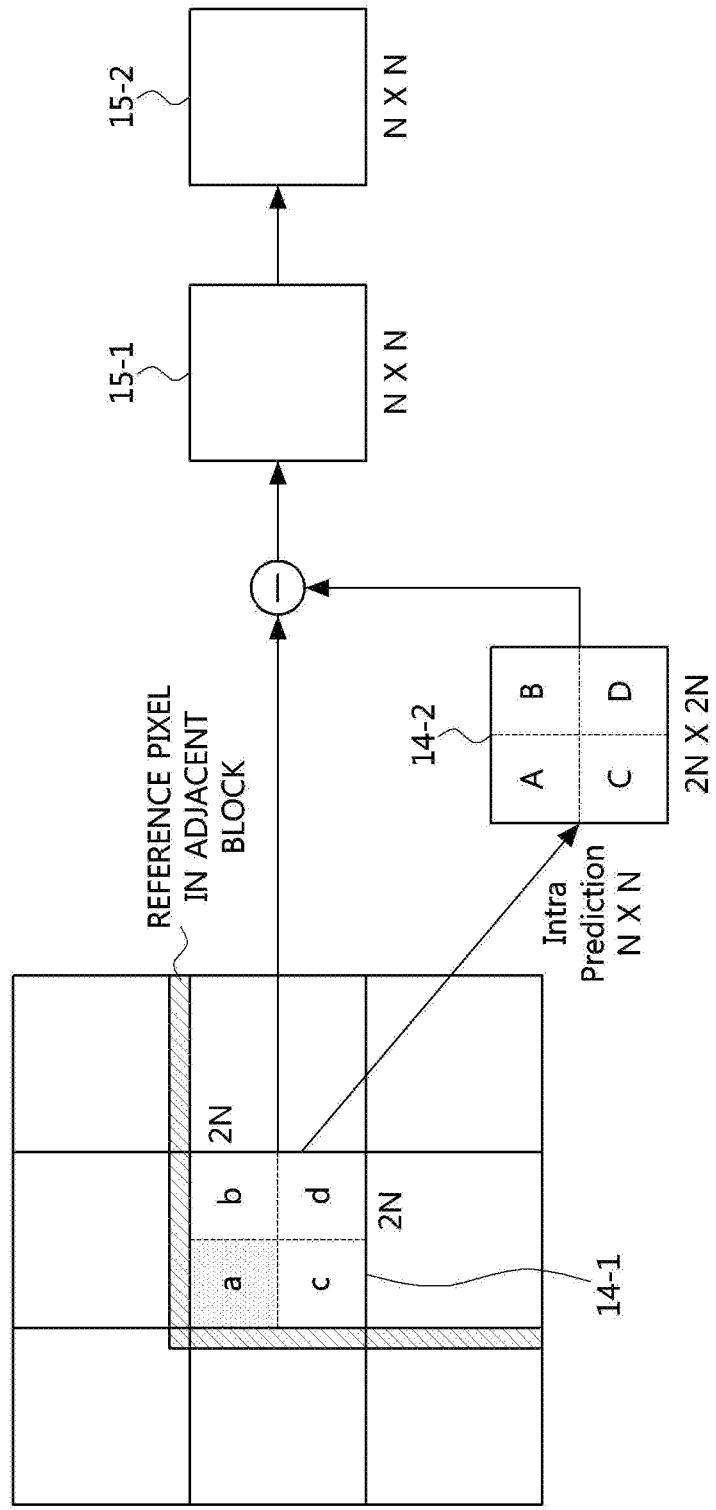
FIG. 16 is an exemplary diagram for describing dependent intra prediction with reference to an encoding-completed sub-block of a current block according to one embodiment of the present invention.

FIG. 16 is an exemplary diagram for describing dependent intra prediction with reference to an encoding-completed sub-block of a current block according to one embodiment of the present invention.

Referring to FIG. 16, similarly to FIG. 15, a current block may have a block form of 2N×2N, and a transform block may have a form of N×N. First, intra prediction on a sub-block a in a current block is performed using reference pixels belonging to a neighbor block and adjacent to the current block, and as a result, a prediction block A may be first generated. Then, a residual block of a and A may be obtained, and a restored block of the sub-block a may be generated through transform, quantization, inverse quantization, and inverse transform processes and may be used for intra prediction on the next sub-block b.

That is, in the intra prediction on the sub-block b, prediction is performed using reference pixels belonging to a neighbor block and adjacent to the current block is used, as well as additional reference pixels that are pixels adjacent to the sub-block b in the restored sub-block a, for which encoding is completed, thereby obtaining a prediction block B. In a similar manner, for sub-blocks c and d, prediction and encoding may be performed using previously encoded sub-blocks.

As such, when pixels of an encoding-completed sub-block are referred to, the prediction process is performed in a dependent manner, and thus there may be limitations in parallel processing, but prediction accuracy may be improved.

Figure 17:
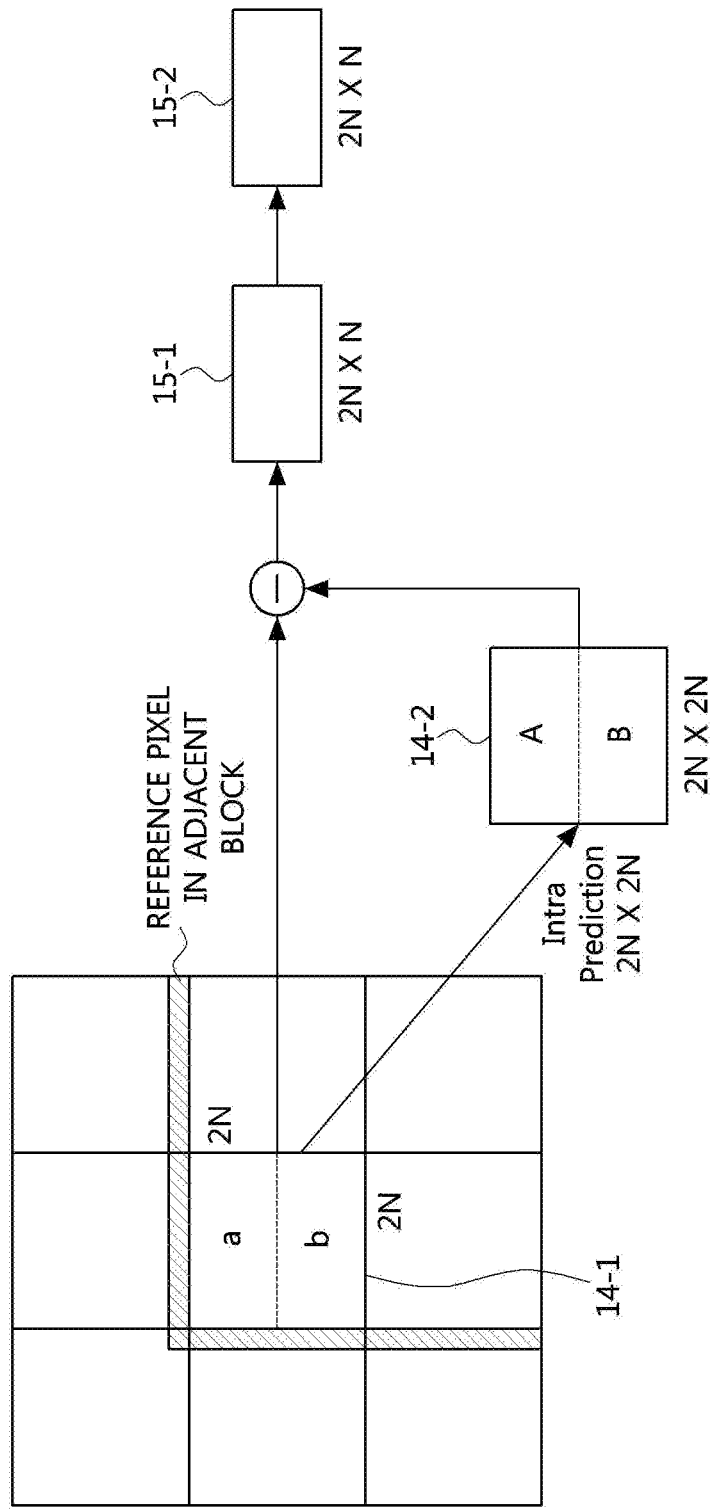
FIG. 17 is an exemplary diagram for describing a process of independent transform and quantization of residual blocks of a current block, to which binary partitioning is applied, according to one embodiment of the present invention.

FIG. 17 is an exemplary diagram for describing a process of independent transform and quantization of residual blocks of a current block, to which binary partitioning is applied, according to one embodiment of the present invention.

Referring to FIG. 17, a current block is a 2N×2N block and a transform block may have a form of 2N×N due to binary partitioning.

Here, in the case in which independent intra prediction on sub-blocks a and b is performed, prediction and encoding of the sub-blocks a and b may be independently performed using reference pixels belonging to a neighbor block and adjacent to a current block.

Therefore, in the present example, the form of the transform block may be different from that of FIG. 15, but the prediction process may be performed by the same method as in FIG. 15.

Figure 18:
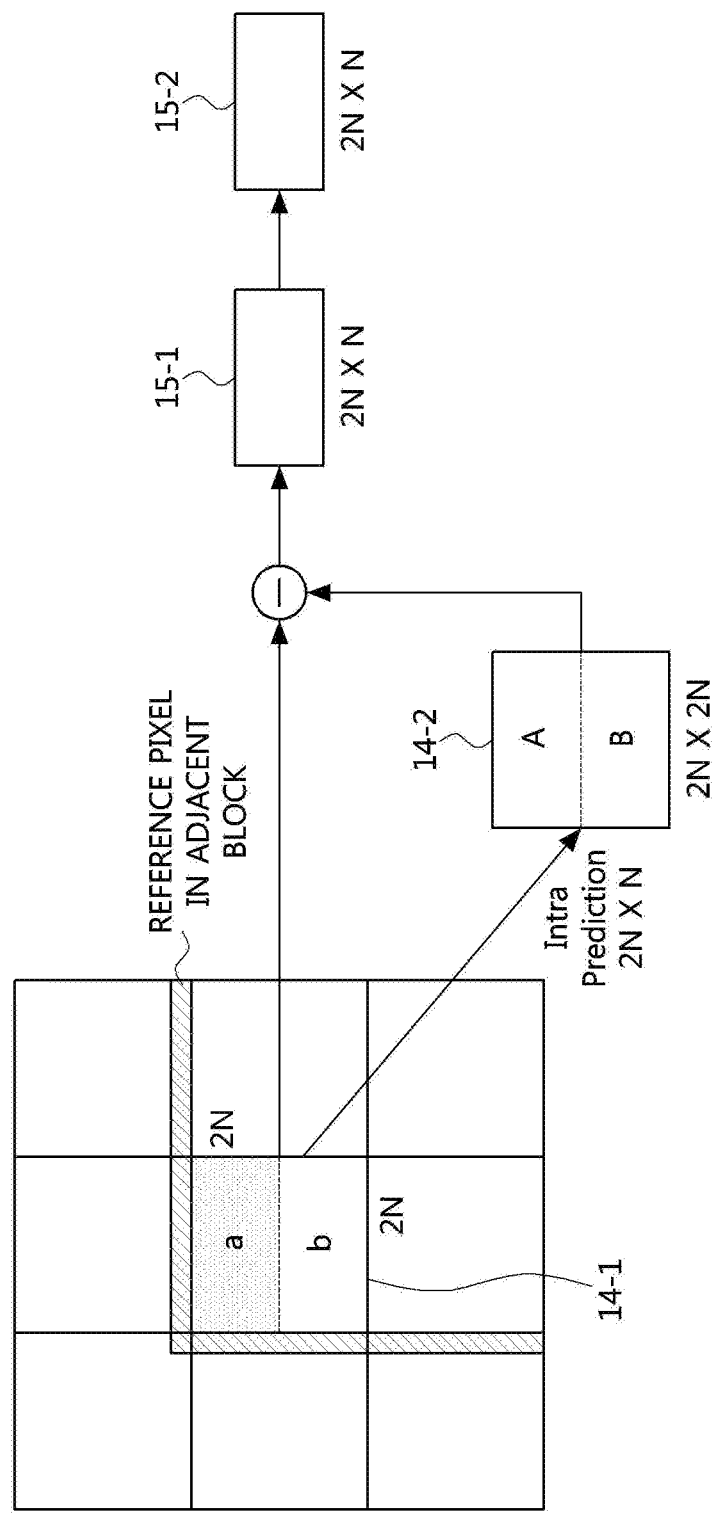
FIG. 18 is an exemplary diagram for describing dependent intra prediction with reference to an encoding-completed sub-block of a current block, to which binary partitioning is applied, according to one embodiment of the present invention.

FIG. 18 is an exemplary diagram for describing dependent intra prediction with reference to an encoding-completed sub-block of a current block, to which binary partitioning is applied, according to one embodiment of the present invention.

Referring to FIG. 18, like in FIG. 17, a current block may have a block form of 2N×2N and a transform block may have a form of 2N×N due to binary partitioning.

Similarly to the prediction process of FIG. 16, in FIG. 18, encoding of a sub-block a is performed using pixels belonging to a block adjacent to a current block as main reference pixels, and in prediction of a sub-block b, intra prediction may be performed by referring to pixels belonging to the encoding-completed sub-block a. That is, in the same way as in FIG. 16, reference pixels of the encoding-completed sub-block are also used to perform prediction, and due to the dependency of prediction, sequential prediction and encoding may be performed.

Hereinafter, examples of a method of using reference pixels of an encoding-completed sub-block will be described, wherein as a method of representing pixels, it is defined that d[x][y] denotes a different pixel obtained by subtracting a prediction value for a current pixel from arbitrary pixel coordinates (x,y), r[x][y] denotes a difference pixel restored after undergoing transform, quantization, and inverse processes thereof, and p'[x][y] denotes a current pixel restored after undergoing prediction and encoding.

Figure 19:
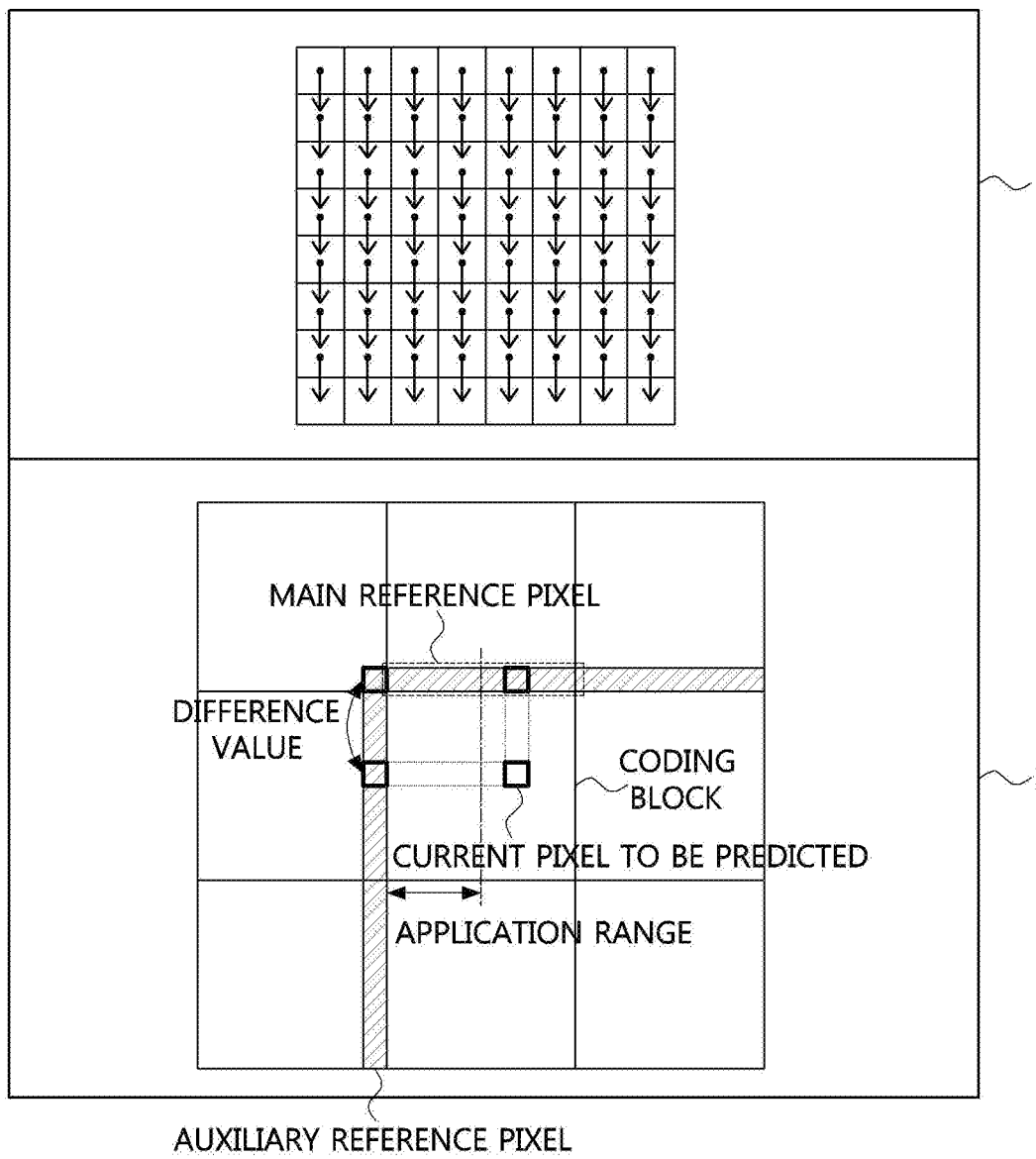
FIG. 19 is an exemplary diagram for describing an intra prediction method employing pixel-based intra prediction according to one embodiment of the present invention.

FIG. 19 is an exemplary diagram for describing general pixel-based intra prediction and block-based intra predicting in a vertical mode.

First, reference numeral 19a represents pixel-based intra prediction, in which prediction and encoding of a current pixel are performed from an adjacent reference pixel restored after the completion of encoding, and prediction and encoding of a pixel neighboring in a prediction direction may be sequentially performed by referring to the current pixel restored after the completion of encoding.

A derivation process of a predicted pixel based on pixel coordinates [x] [y] of a current block 2M×2N may be expressed by Equation 7 below.

[Equation 7]

$$s[x][y] = \begin{cases} q[x][-1], & (0 \le x < 2M,\ y = 0) \\ p'[x][y-1], & (0 \le x < 2M,\ 0 < y < 2N) \end{cases}$$

In addition, the predicted pixel may be expressed as a restored difference pixel r as shown in Equation 8 below.

[Equation 8]

$$s[x][y] = \begin{cases} q[x][-1], & (0 \le x < 2M,\ y = 0) \\ q[x][y-1] + \sum_{z=0}^{y} r[x][z], & (0 \le x < 2M,\ 0 < y < 2N) \end{cases}$$

Then, reference numeral 19b represents block-based intra prediction in which a current block may be predicted using reference pixels belonging to a block adjacent to the current block. Specifically, a prediction block of the current block may be generated by padding the reference pixels in a vertical direction. This may be expressed as Equation 9 below.

[Equation 9]

$$s[x][y] = q[x][-1]\ (0 \le x < 2M, 0 \le y < 2N)$$

Figure 20:
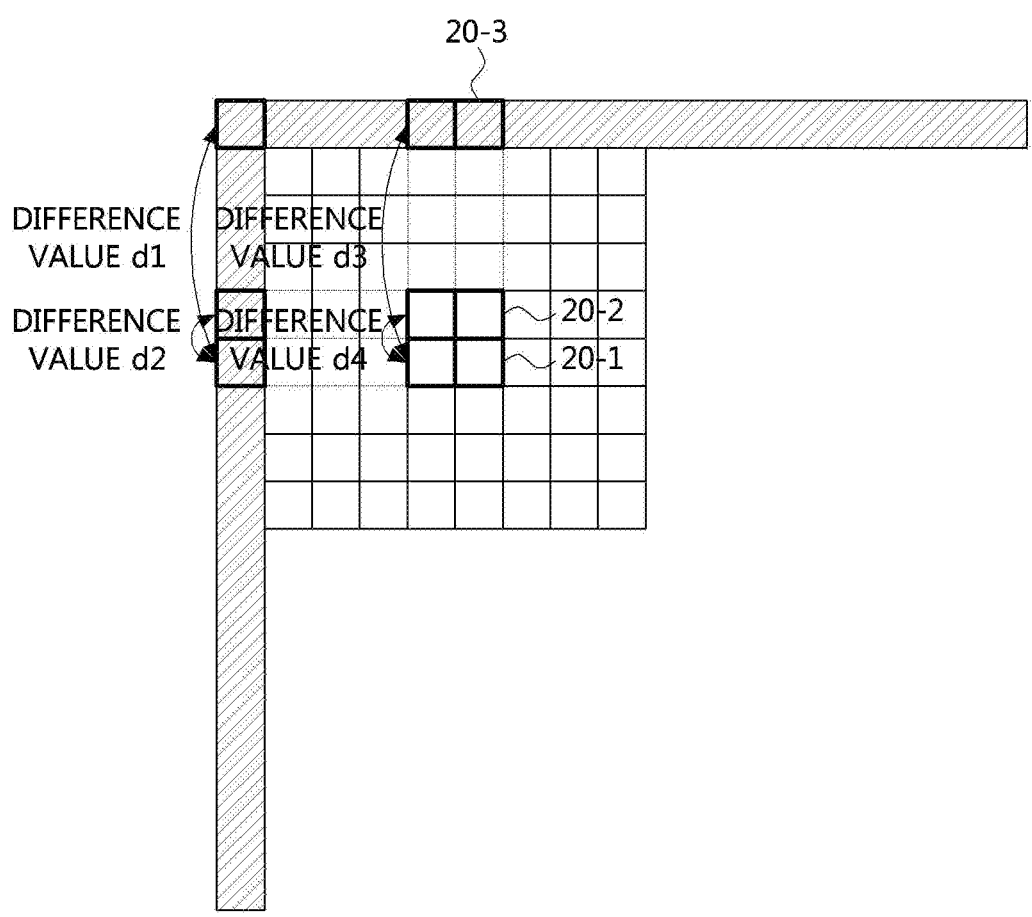
FIG. 20 is an exemplary diagram illustrating a block-based intra prediction method using a slope or difference value of reference pixels according to one embodiment of the present invention.

FIG. 20 is an exemplary diagram illustrating a block-based intra prediction method using a slope or difference value of reference pixels according to one embodiment of the present invention.

Referring to FIG. 20, unlike 19a and 19b, a method of predicting a current pixel by combining parts of block-based prediction may be described. When an arbitrary pixel 20-1 in a current block is predicted, in the case of pixel-based prediction, prediction is performed using the current pixel 20-1 and a restored pixel 20-2 adjacent to the current pixel as reference pixels. In this case, when the pixels are padded intact and used as prediction values, the prediction may be inaccurate. Therefore, a difference value between the current pixel 20-1 and the restored pixel 20-2 adjacent to the current pixel is predicted by referring to the current pixel and the adjacent pixel so that the restored pixel 20-2 adjacent to the current pixel can be corrected.

For example, a difference value d2 or d4 between two pixels at positions corresponding to positions of the current pixel 20-1 and the restored pixel 20-2 adjacent to the current pixel with respect to an intra prediction mode direction (in the case of a vertical mode) may be added to the restored pixel 20-2 adjacent to the current pixel 20-1, thereby predicting the current pixel 20-1. In this case, whether to use the difference value d2 or the difference value d4 may be determined according to how close a prediction result obtained using the difference value is to the current pixel 20-1, and a weight may be applied to the difference value d2 or d4.

Here, the difference value d3 or d4 used in predicting a current pixel may be generally used in pixel-based prediction since pixels from which the difference values d3 and d4 are derived should be restored. However, in the present invention, the difference value is applied to block-based prediction by considering the fact that, when a prediction block unit (a transform block in HEVC) is different from a current block, a sub-block of the current block, which may serve as a prediction block unit, can be first encoded and restored. For example, when two pixels used in deriving the difference value d4 belong to a restored sub-block in the current block in FIG. 20, it may be possible to refer to the difference value d4 as shown in FIG. 20.

Meanwhile, when the current pixel 20-1 is predicted based on a block, intra prediction may be performed by referring to a restored pixel 20-3 adjacent to the current block, rather than a restored pixel 20-2 adjacent to the current pixel 20-1. In this case, in a similar manner as the method described above, a difference value d1 or d3 between two pixels at positions corresponding to positions of the current pixel 20-1 and the restored pixel 20-3 adjacent to the current block with respect to an intra prediction mode direction (in the case of a vertical mode) is added to the restored pixel 20-3 adjacent to the current block, thereby generating a prediction value of the current pixel 20-1. In this case, whether to use the difference value d1 or the difference value d3 may be determined according to how close a prediction result obtained using the difference value is to the current pixel 20-1, and a weight may be applied to the difference value d1 or d3.

In this case, the difference values d1 to d4 each may be represented as a slope between two pixels hereinafter.

In one example, a relation between the difference value d4, the current pixel 20-1, and the restored pixel 20-2 adjacent to the current pixel may be expressed as Equation 10 below.

[Equation 10]

$$s[x][y] = \begin{cases} q[x][-1] + w0 \times (q[-1][0] - q[-1][-1]) \\ \qquad (x=0, y=0) \\ p'[x][y-1] + w1 \times (q[-1][y] - q[-1][y-1]) \\ \qquad (x=0, 0 < y < 2N) \\ q[x][-1] + w2 \times (p'[x-1][y] - q[x-1][-1]) \\ \qquad (0 < x < 2M, y=0) \\ p'[x][y-1] + w3 \times (p'[x-1][y] - p'[x-1][y-1]) \\ \qquad (0 < x < 2M, 0 < y < 2N) \end{cases}$$

Here, w0, w1, w2, and w3 may represent weights, and the weights may be equal to each other, or may be smaller than 1.

In another example, a relation among the difference value d1, the current pixel 20-1, and the restored pixel 20-3 adjacent to the current block may be expressed as Equation 11 below.

[Equation 11]

$$s[x][y] = \begin{cases} q[x][-1], (k \leq x < 2M, 0 \leq y < 2N) \\ q[x][-1] + w0 \times (q[-1][y] - q[-1][-1]) \ (0 \leq x < k, 0 \leq y < 2N) \end{cases}$$

In Equation 11, k denotes a value for setting an area to which the difference value d1 is applied and may be applied for the purpose of using the difference value only for pixels having a certain range of x coordinates according to the setting and not used for other pixels. In addition, w0 denotes a weight applied to the difference value d1 and may be smaller than 1, and there may be an additional weight to control the impact of w0. Moreover, a weight to be applied to the difference value may be set differently according to the value of k. Further, the weight may be determined based on a distance between the current pixel 20-1 to be predicted and a main reference pixel.

Hereinafter, a method of prediction using the restored pixel 20-2 adjacent to the current pixel 20-1 as a main reference pixel or using the restored pixel 20-3 adjacent to the current block as a main reference pixel in order to generate an intra prediction value of the current pixel belonging to the current block will be described, and furthermore, an example of a method of using at least one of difference values d1 to d4 will be described.

Figure 21:
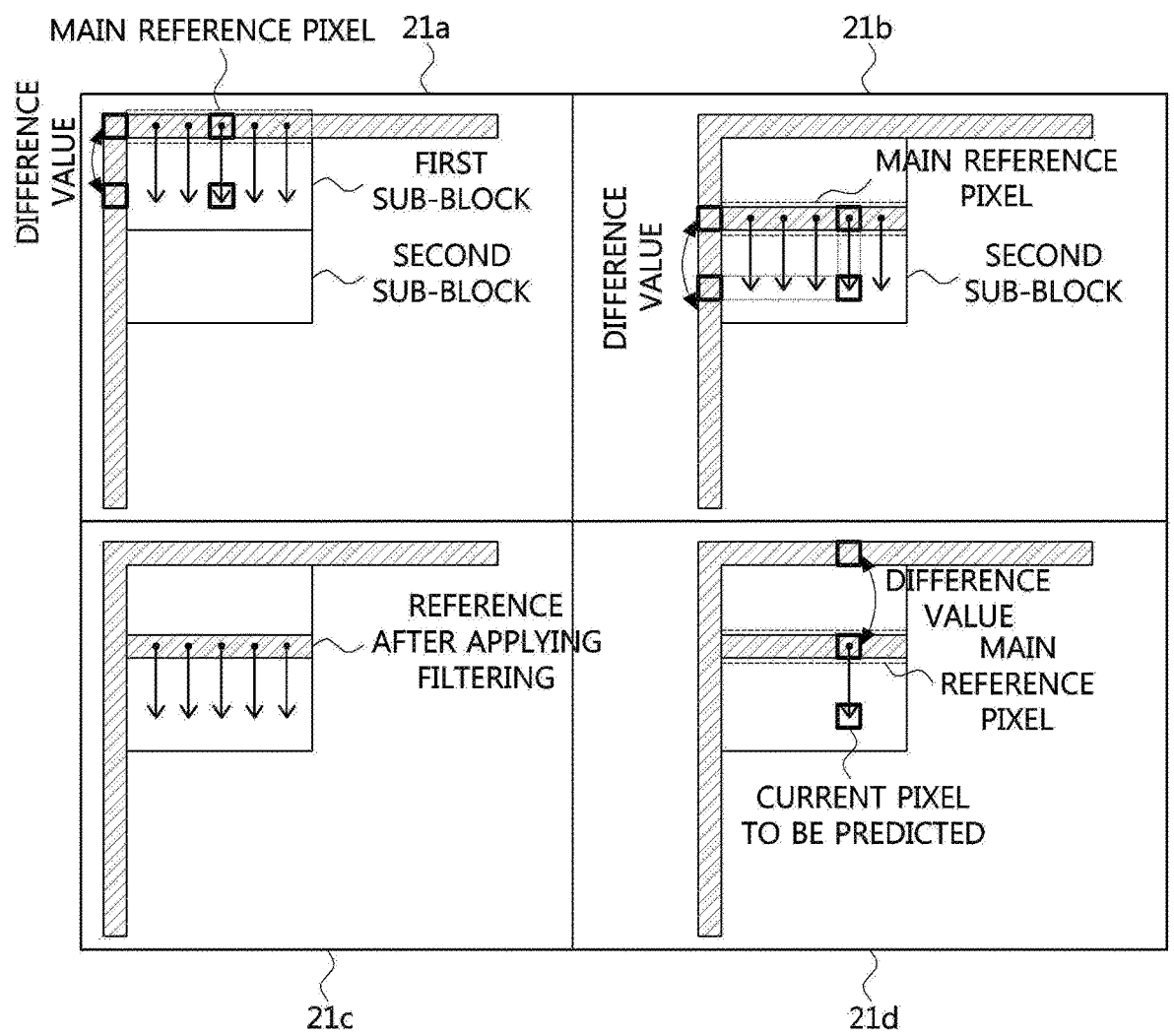
FIG. 21 is an exemplary diagram for describing a method of predicting a horizontally split sub-block in vertical mode intra prediction according to one embodiment of the present invention.

FIG. 21 is an exemplary diagram for describing a method of predicting a horizontally split sub-block in vertical mode intra prediction according to one embodiment of the present invention.

Referring to FIG. 21, a process of generating a prediction block in each sub-block when a vertical mode is performed as an intra prediction mode will be described. Each sub-block is a unit in which intra prediction is performed and may be related to a case in which the current block differs from a unit in which prediction is performed. When a current block is defined as 2M×2N, the sub-block may be defined as 2M×N. In addition, each sub-block may refer to a transform block in HEVC.

First, in 21a, a first sub-block may be encoded prior to the current block and prediction may be performed by referring to a pixel belonging to a restored neighbor block and adjacent to the current block. More specifically, a pixel value of the pixel belonging to a block adjacent to the current block is padded in a vertical direction to generate a prediction block for the first sub-block. However, in this case, additionally, a prediction value of the current pixel may be generated by correcting a reference pixel using a difference value between two pixels at positions corresponding to positions of the current pixel to be predicted and a reference pixel adjacent to the current block with respect to an intra prediction mode direction (in the case of a vertical mode). Specifically, the prediction block of the first sub-block may be generated using the sum of the reference value and the difference value as the prediction value for a pixel in the first sub-block.

Then, referring to 21b, prediction of a second sub-block may be performed with a pixel adjacent to the second sub-block in the encoded and restored first sub-block as the main reference pixel. In this case, similarly to 21b, a prediction value of the current pixel may be generated by correcting a main reference pixel with a difference value between two pixels at positions corresponding to positions of the current pixel and the main reference pixel adjacent to the current block with respect to an intra prediction mode direction (in the case of a vertical mode). Specifically, a prediction block of the second sub-block may be generated using the sum of the main reference pixel and the difference value as a prediction value for a pixel in the second sub-block.

Referring to 21c in comparison with 21b, pixels located in the same direction as the intra prediction direction with respect to the main reference pixel in 21b may be filtered to remove a quantization error and the like, and then may be used as reference pixels. In this case, it is possible to use the filtered main reference pixel as it is or to use the main reference pixel after correcting it with the difference value as in 21b. This may be an example in which adaptive reference pixel filtering is applied according to an intra prediction mode and position of the sub-block in the current block. Specifically, this may be an example applied to a case where an area which belongs to the same prediction block (in the present example, prediction is performed in units of a transform block, but the prediction block may indicate a block obtained in a block constructor and sub-blocks in a corresponding block have the same prediction mode) and is referred to by the sub-block is an encoded sub-block in the current block. Alternatively, this may be an example applied to a case in which the prediction mode of a reference block is the same as the prediction mode of the current block when an area referred to by the sub-block is a block adjacent to the current block.

Referring to 21d, in predicting a current pixel with the above-described main reference pixel, a difference value, which is different from that of 21b, may be used. Specifically, the main reference pixel is corrected using a difference value between a pixel belonging to a block adjacent to the current block and the main reference pixel, so that a prediction value for the current pixel may be generated. That is, the main reference pixel is corrected using slope information of previous pixels arranged in the intra prediction mode direction and the main reference pixel, rather than using slope information of pixels at corresponding positions with respect to the intra prediction mode direction, so that the prediction value may be generated. The slope information may be corrected based on a distance between the current pixel and the main reference pixel.

Figure 22:
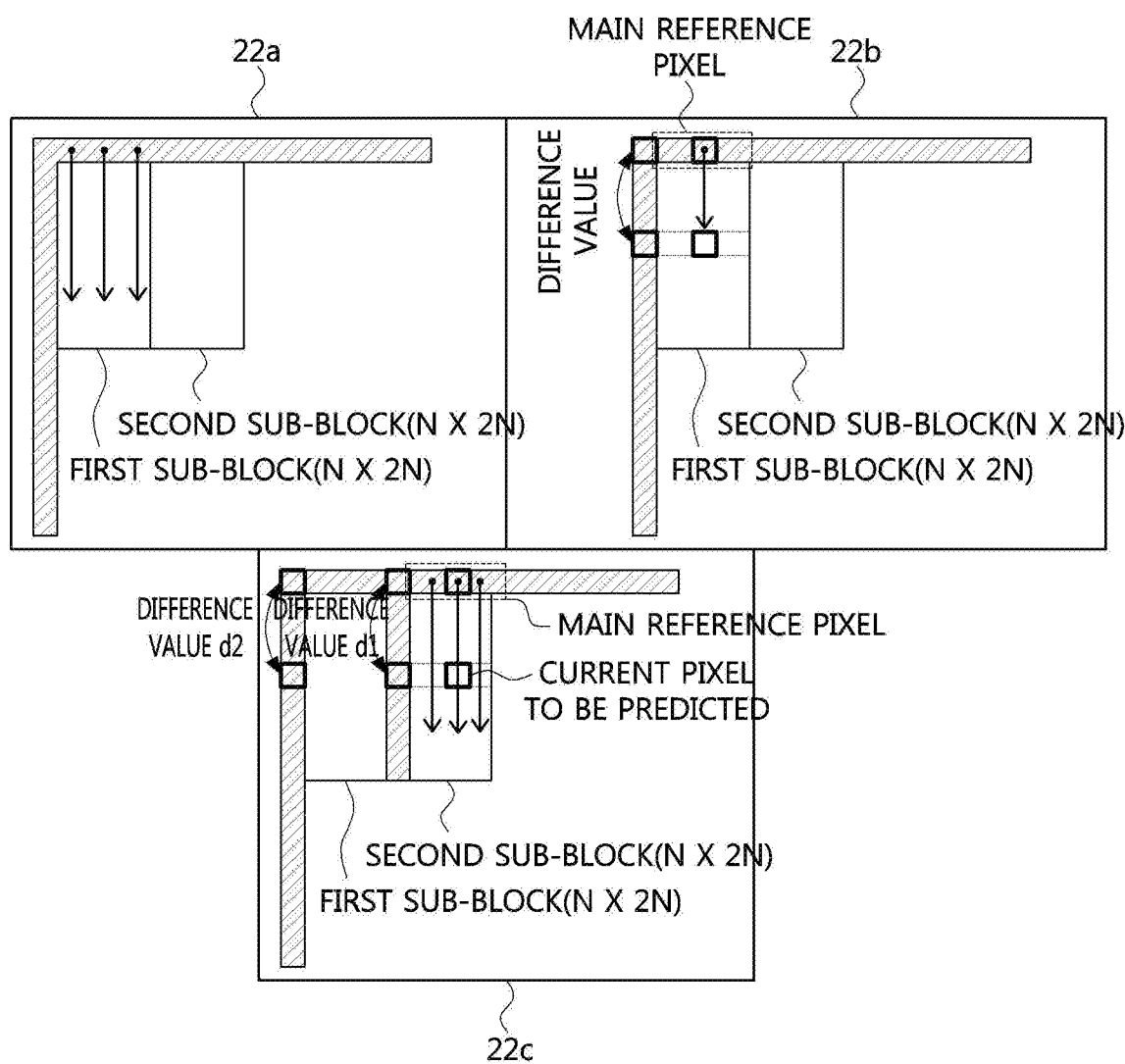
FIG. 22 is an exemplary diagram for describing a method of predicting a vertically split sub-block in vertical mode intra prediction according to one embodiment of the present invention.

FIG. 22 is an exemplary diagram for describing a method of predicting a vertically split sub-block in vertical mode intra prediction according to one embodiment of the present invention.

Referring to 22a, prediction on a first sub-block may be performed using a pixel belonging to a block adjacent to a current block as a main reference pixel. Here, a prediction value of the current pixel belonging to the first sub-block may be used by padding the main reference pixel.

However, referring to 22b, a main reference pixel is corrected with a difference between two pixels at positions corresponding to positions of a current pixel to be predicted and the main reference pixel adjacent to a current block with respect to the intra-prediction mode direction (in the case of a vertical mode) so that a prediction value of the current pixel may be generated. Specifically, a prediction block of the first sub-block may be generated using the sum of the main reference pixel and the difference value as a prediction value of a pixel in the first sub-block.

Referring to 22c, since a pixel belonging to a block adjacent to the current block is positioned on the intra prediction direction, the pixel becomes a main reference pixel, and in this case, similarly to 22b, the main reference pixel is corrected with a difference value between two pixels at positions corresponding to positions of the current pixel to be predicted and the main reference pixel with respect to the intra prediction mode direction (in the case of a vertical mode) so that a prediction value of the current pixel may be generated. However, since the first sub-block has been already encoded and restored, there may be two or more specified pixels that are located at positions corresponding to the positions of the current pixel and the main reference pixel with respect to the intra prediction mode direction. That is, the difference value in 21c may be regarded as d1 and d2. Here, the main reference pixel may be corrected with d1 or with d2, or the main reference pixel may be corrected using both d1 and d2. In addition, the main reference pixel may be corrected with values obtained by weighting d1 and d2.

Figure 23:
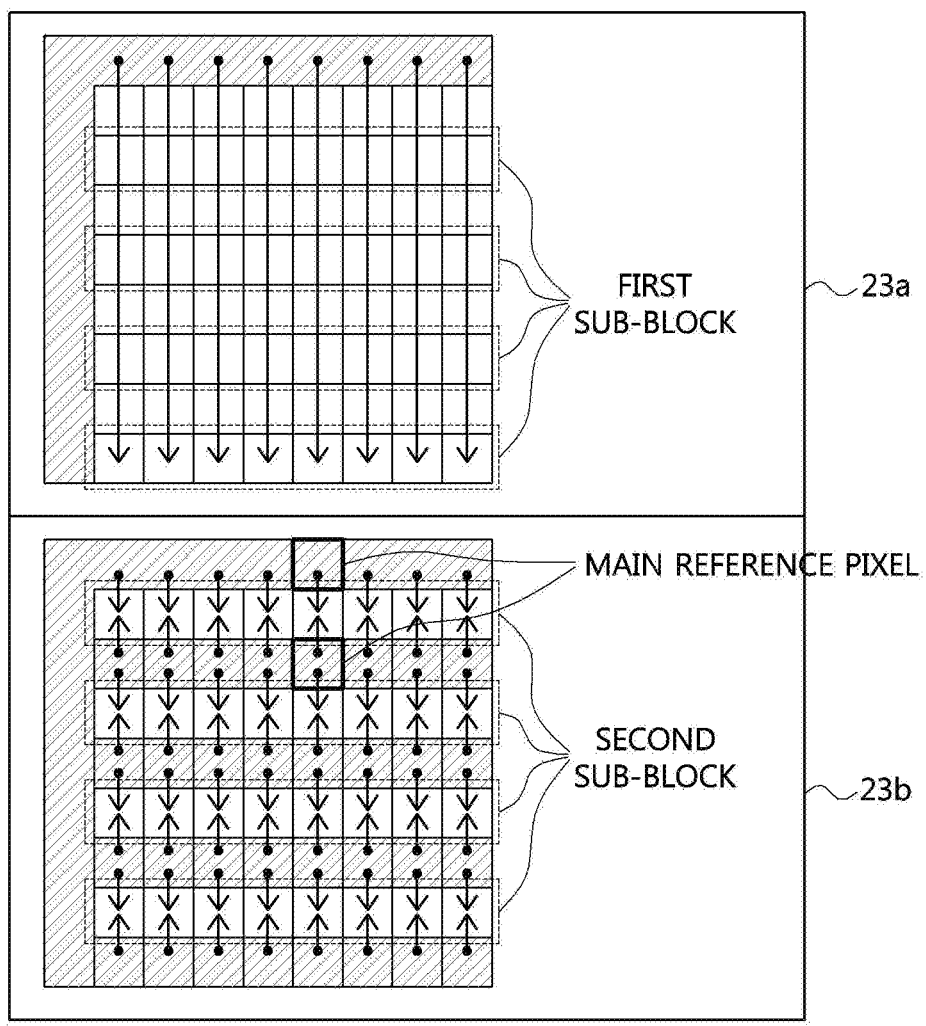
FIG. 23 is a first exemplary diagram for describing a method of predicting a sub-block split by a pixel line in vertical mode intra prediction according to one embodiment of the present invention.

FIG. 23 is a first exemplary diagram for describing a method of predicting a sub-block split by a pixel line in vertical mode intra prediction according to one embodiment of the present invention.

First, referring to 23a, a first sub-block of a current block to be encoded may be set by pixel lines arranged horizontally at even-numbered positions with respect to a current block. Here, in the process of generating a prediction block for the first sub-block, a pixel belonging to a block adjacent to the current block may be set as a main reference pixel and a prediction value of each pixel in the first sub-block may be generated. More specifically, the prediction block for the first sub-block may be generated by padding a pixel value of the main reference pixel in the intra prediction direction.

Referring to 23b, prediction on a second sub-block may be performed after prediction and restoration of the first sub-block are completed. Here, the second sub-block may be set by pixel lines arranged horizontally at odd-numbered positions with respect to the current block. In the process of generating a prediction block for the second sub-block, since not only a pixel belonging to a block adjacent to the current block, but also the pixels of the encoded and restored first sub-block are arranged in the intra prediction direction, such pixels may be all referred to in prediction of the second sub-block.

Specifically, prediction on the second sub-block may be performed by referring to the current pixel to be predicted and two pixels that are arranged in the intra prediction direction and are adjacent to the current pixel. In this case, referring to 23b, since the prediction mode is a vertical mode, the pixels adjacent to the current pixel are located above and below the current pixel, and thus a prediction block for the second sub-block may be generated using the two pixels each located above and below the current pixel. For example, the prediction block may be generated using the sum of values obtained by applying a weight to each of the two pixels located above and below the current pixel as a prediction value.

Figure 24:
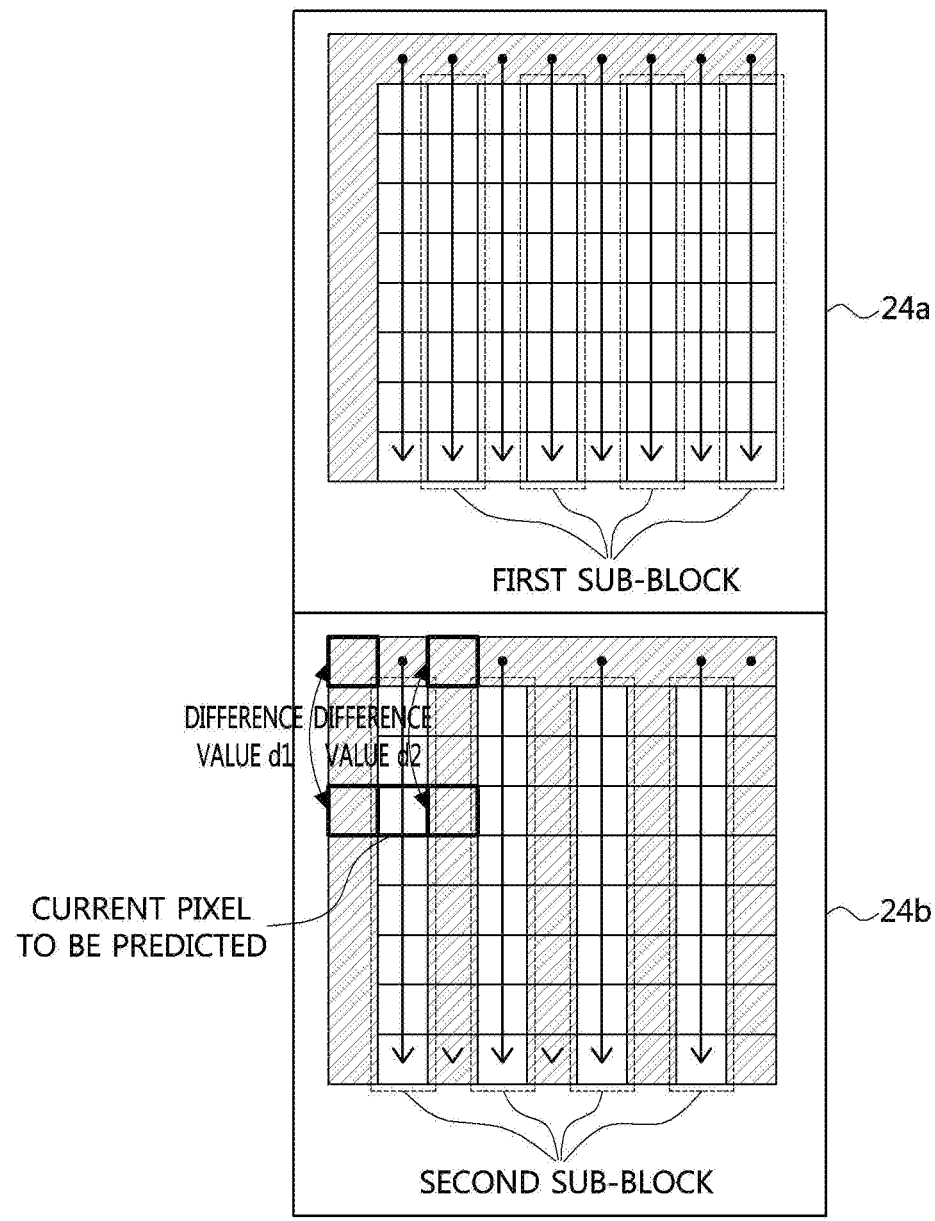
FIG. 24 is a second exemplary diagram for describing a method of predicting a sub-block split by a pixel line in vertical mode intra prediction according to one embodiment of the present invention.

FIG. 24 is a second exemplary diagram for describing a method of predicting a sub-block split by pixel lines in vertical mode intra prediction according to one embodiment of the present invention.

Referring to 24a, a first sub-block of a current block to be encoded may be set to be an area formed by pixel lines arranged vertically at even-numbered positions with respect to the current block. Here, in the process of generating a prediction block for the first sub-block, a prediction value of each pixel in the first sub-block may be generated using a pixel belonging to a block adjacent to the current block and arranged in the intra prediction direction as a main reference pixel. More specifically, a prediction block for the first sub-block may be generated by padding a pixel value of the main reference pixel in the intra prediction direction.

Referring to 24b, prediction on a second sub-block may be performed after prediction and restoration of the first sub-block are completed. Here, the second sub-block may be set to an area formed by pixel lines arranged vertically at odd-numbered positions with respect to the current block. In the process of generating a prediction block for the second sub-block, a pixel belonging to a block adjacent to the current block may be used as a main reference pixel. In addition, pixels of the first sub-block that are not arranged in the intra prediction direction may be used to correct the main reference pixel.

For example, the main reference pixel may be corrected with a difference value between two pixels at positions corresponding to positions of the current pixel and the main reference pixel with respect to the intra prediction mode direction (in the case of a vertical mode), wherein the two pixels may consist of a pixel belonging to the first sub-block and pixels belonging to a block adjacent to the current block, as shown in 24b.

Referring to 24b, the difference value used to correct the main reference pixel may be derived as d1 and d2. Only d1 or only d2 may be used, or values obtained by weighting d1 and d2 may be used.

Figure 25:
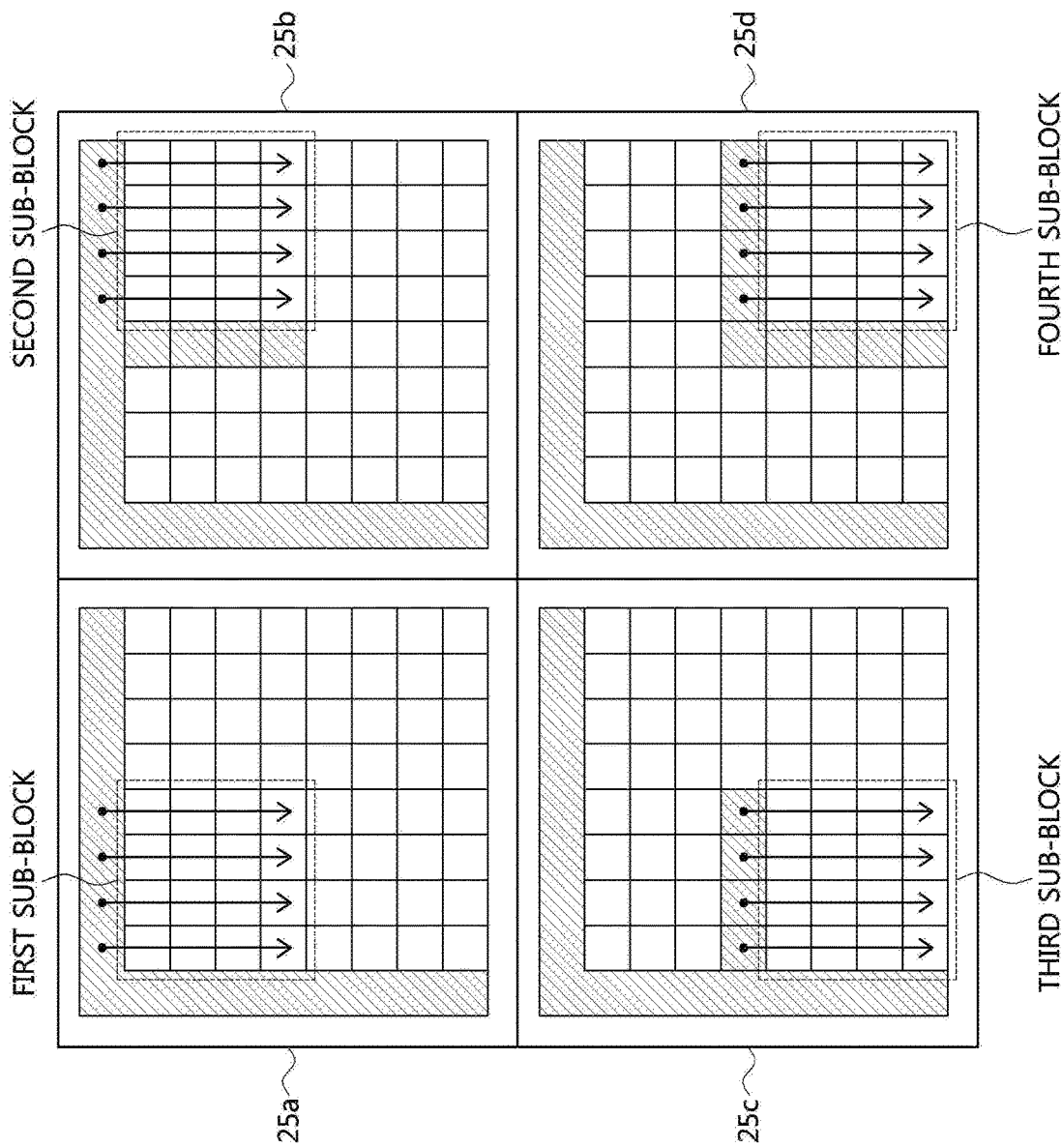
FIG. 25 is a first exemplary diagram for describing a method of predicting a sub-block split in a quadtree manner in vertical mode intra prediction according to one embodiment of the present invention.

FIG. 25 is a first exemplary diagram for describing a method of predicting a sub-block split in a quadtree manner in vertical mode intra prediction according to one embodiment of the present invention.

A process of encoding a first sub-block to a fourth sub-block which are split with respect to a current block to be encoded in a quadtree manner will be described with reference to 25a, 25b, 25c, and 25d in FIG. 25.

Specifically, referring to 25a, prediction on the first sub-block may be performed by setting a pixel belonging to a block adjacent to a current block and located in intra prediction direction as a main reference pixel.

Then, as shown in 25b, prediction on the second sub-block may be performed by setting a pixel belonging to a block adjacent to the current block and located in intra prediction direction as a main reference pixel.

Referring to 25c, since encoding and restoration of the first sub-block are completed, a pixel belonging to the first sub-block and adjacent to the third sub-block is located in the intra prediction direction, and thus prediction on the third sub-block may be performed by using such pixels as main reference pixels.

Referring to 25d, when encoding and restoration of the second sub-block are completed, prediction on the fourth sub-block may be performed by setting a pixel belonging to the second sub-block and adjacent to the fourth sub-block as a main reference pixel.

Figure 26:
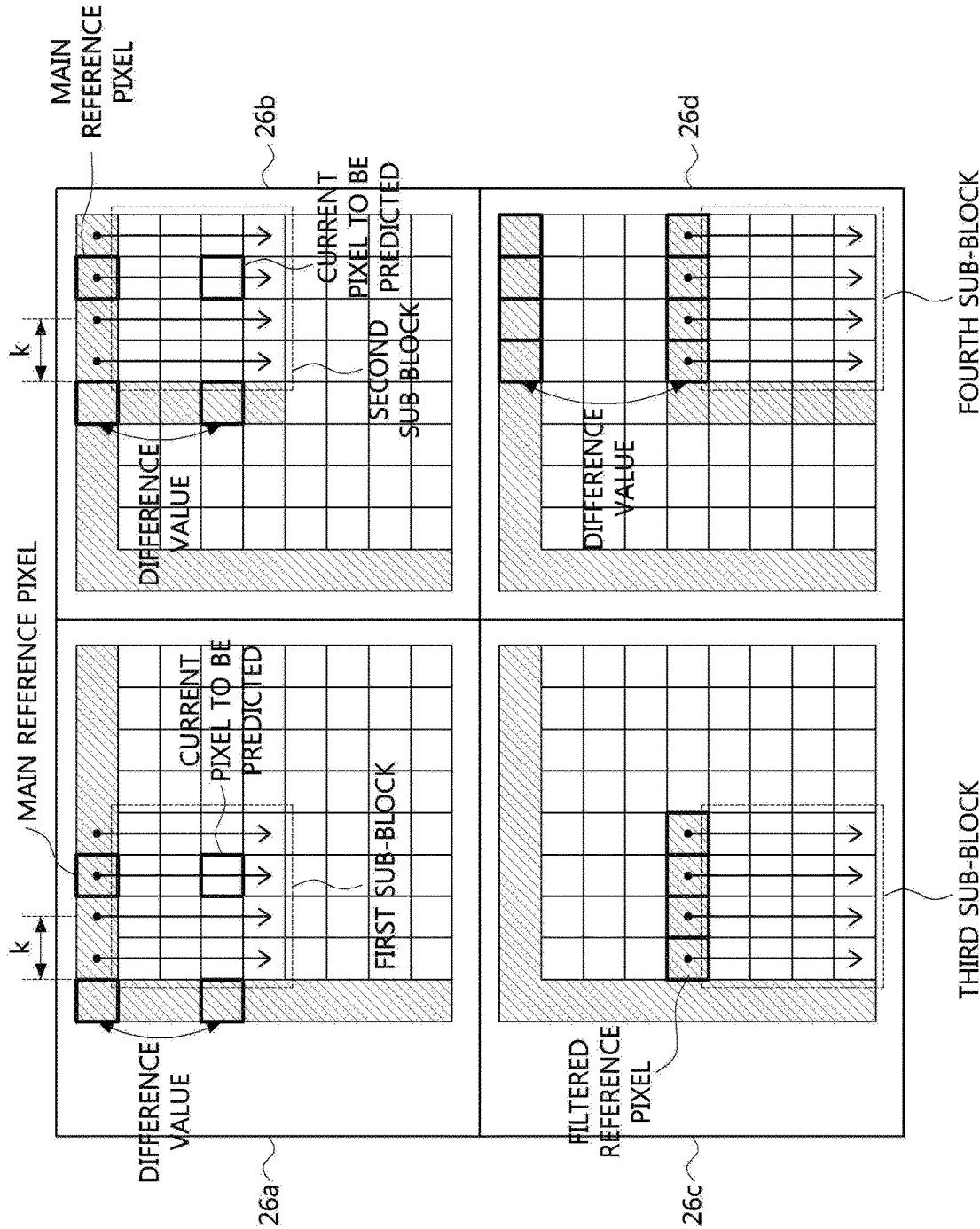
FIG. 26 is a second exemplary diagram for describing a method of predicting a sub-block split in a quadtree manner in vertical mode intra prediction according to one embodiment of the present invention.

FIG. 26 is a second exemplary diagram for describing a method of predicting a sub-block split in a quadtree manner in vertical mode intra prediction according to one embodiment of the present invention.

Referring to FIG. 26, encoding of a current block which is split into a first sub-block to a fourth sub-block as shown in FIG. 25 is performed, wherein a main reference pixel may be corrected using a difference value or filtering on the main reference pixel may be further applied.

First, referring to 26a, in the process of generating a predicting block for the first sub-block, a pixel belonging to a block adjacent to the current block may be set as a main reference pixel, and the main reference pixel may be corrected using a difference value between two pixels at positions corresponding to positions of a current pixel to be predicted and the main reference pixel with reference to the intra prediction direction. In addition, the correction of the main reference pixel by use of the difference value may be performed only on a pixel within a predetermined distance, such as k range of 26a.

Referring to 26b, in the process of generating a prediction block for a second sub-block, a pixel belonging to a block adjacent to a current block is set as a main reference pixel, and the main reference pixel may be corrected using a difference value between two pixels at positions corresponding to a current pixel to be predicted and the main reference pixel with respect to the intra prediction direction. Here, the two pixels may be located in the first sub-block that has been encoded and restored.

Referring to 26c, prediction on the third sub-block may be performed by setting pixels located in the encoding-completed first sub-block and adjacent to the third sub-block as main reference pixels. In this case, filtering may be further performed on pixels arranged in the same direction as the intra prediction direction with respect to the main reference pixels.

Referring to 26d, in the process of generating a prediction block for the fourth sub-block, prediction may be performed by setting a pixel belonging to the second sub block that has been encoded and restored and adjacent to the fourth sub-block as a main reference pixel. Here, additional correction is performed on the main reference pixel using a difference value shown in 26d, and the prediction may be performed using the corrected main reference pixel. In addition, a weight may be applied to the difference value, and the weight may be set on the basis of a distance between the main reference pixel and a current pixel to be predicted.

Figure 27:
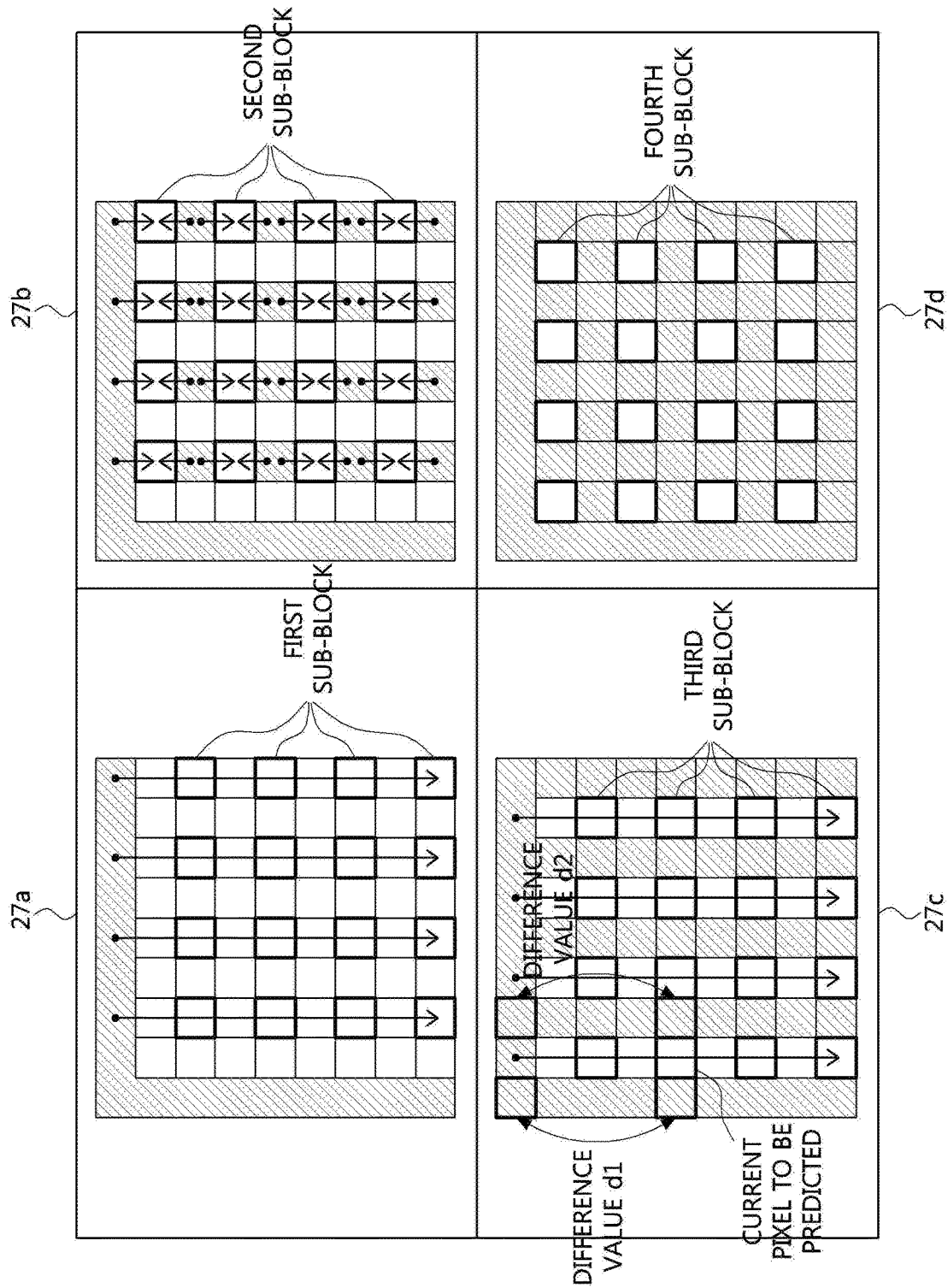
FIG. 27 is a second exemplary diagram for describing a method of predicting a sub-block split according to odd or even coordinates in vertical mode intra prediction according to one embodiment of the present invention.

FIG. 27 is a second exemplary diagram for describing a method of predicting a sub-block split according to an odd or even coordinate in vertical mode intra prediction according to one embodiment of the present invention.

Referring to 27a, a first sub-block may consist of pixels each having an odd x-coordinate and an odd y-coordinate of a current block to be encoded. In the process of generating a prediction block for the first sub-block, a prediction block may be generated by setting a pixel belonging to a block adjacent to the current block as a main reference pixel, and more specifically, the prediction block may be generated by padding the main reference pixel to the first sub-block in the intra prediction direction (vertical direction).

Referring to 27b, a second sub-block may consist of pixels each having an odd x-coordinate and an even y-coordinate of the current block. In the process of generating a prediction block for the second sub-block, a main reference pixel may belong to a block adjacent to the current block. In addition, since the first sub-block that has been encoded and restored is located in the intra prediction direction, the main reference pixel may further include a pixel in the first sub-block.

Here, prediction on each pixel of the second sub-block to be predicted may be performed by setting restored pixels above and below the pertinent pixel as main reference pixels, and more specifically, a weight is applied to each of the main reference pixels located above and below the pertinent pixel and a resultant value may be used as a prediction value.

Referring to 27c, a third sub-block may consist of pixels each having an even x-coordinate and an odd y-coordinate of the current block. In the process of generating a prediction block for the third sub-block, since a restored sub-block does not exist in the intra prediction direction, the main reference pixel may be a pixel belonging to a block adjacent to the current block.

In this case, the main reference pixel may be corrected using a difference value between two pixels at positions corresponding to positions of a current pixel of the third sub-block to be predicted and the main reference pixel with respect to the intra prediction direction. In 27c, since the two pixels at corresponding positions with respect to the intra prediction direction may be located on both the left and right of the current pixel to be predicted, difference values d1 and d3 may be used in prediction.

Referring to 27d, a fourth sub-block may consist of pixels each having an even x-coordinate and an even y-coordinate of the current block. Here, since pixels arranged in the intra-picture perdition direction are located on a side above and a side below the fourth sub-block, a prediction value for each pixel of the fourth sub-block may be obtained using two pixels located above and below each pixel of the fourth sub-block as main reference pixel, or a value obtained by applying a weight to two pixels above and below the current pixel may be used as a prediction value.

In addition, in 27d, since 8 pixels around each pixel of the fourth sub-block are all restored, a prediction block for the fourth sub-block may be generated using all of the 8 restored pixels as main reference pixels, or values obtained by applying a weight to each of 8 pixels around a current pixel to be predicted may be used as prediction values.

Figure 28:
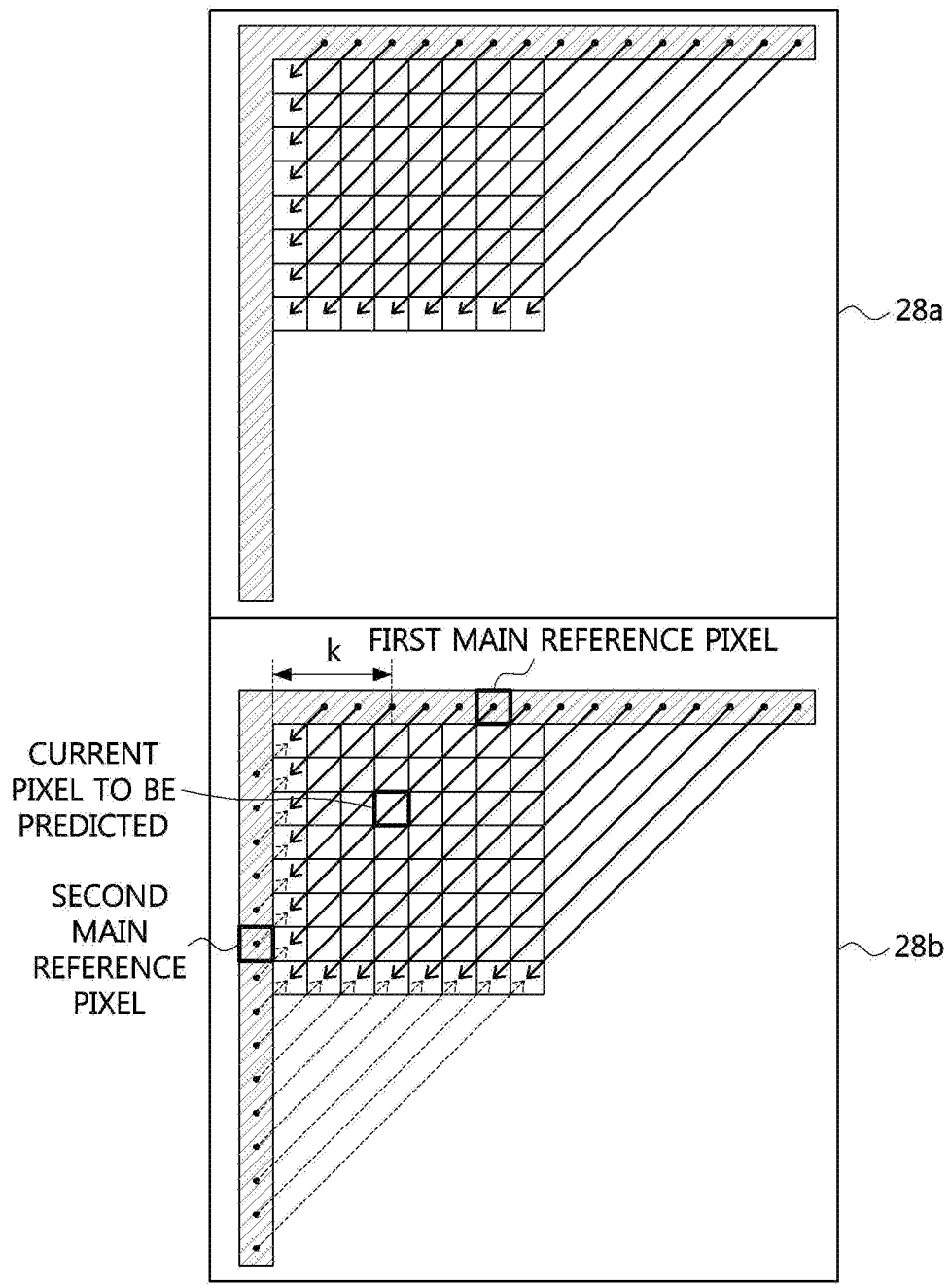
FIG. 28 is an exemplary diagram for describing a method of performing predicting further using a slope or difference value of reference pixels in diagonal mode intra prediction according to one embodiment of the present invention.

FIG. 28 is an exemplary diagram for describing a method of performing predicting further using a slope or difference value of reference pixels in diagonal mode intra prediction according to one embodiment of the present invention.

In 28a and 28b of FIG. 28, pixels indicated by oblique lines are pixels belonging to a block adjacent to a current block and may indicate pixels for which encoding and restoration have been completed.

Referring to 28a, as general diagonal mode prediction, prediction may be performed by setting a pixel located in an intra prediction direction (diagonal direction) and belonging to a block adjacent to a current block as a main reference pixel. More specifically, a prediction value for each pixel of the current block may be generated by padding a pixel value of the main reference pixel to the current block in the intra prediction direction.

Referring to 28b, prediction may be performed by setting a pixel located in the intra prediction direction, among pixels belonging to a block adjacent to the current block, as a main reference pixel. In this case, in 28b, since pixels indicated by oblique lines are all arranged in the prediction direction, except for q[−1][−1], these pixels may serve as main reference pixels. More specifically, since two pixels indicated by oblique lines exist with respect to the intra prediction direction, an average value of the two pixels may be used as a prediction value or the sum of the two pixels each of which a weight is applied may be used as a prediction value.

Here, prediction values of pixels located outside of an area indicated by k may be generated using only a first main reference pixel at a start point in the prediction direction, among two pixels set as the main reference pixels, and prediction values of pixels located in the area indicated by k in 28b may be generated using the first main reference pixel and a second main reference pixel.

Hereinafter, an intra prediction method according to one embodiment of the present invention will be described on the basis of a diagonal mode, rather than a vertical mode. Here, it is apparent that the method described with reference to the vertical mode can be equally applied by changing the prediction direction, and thus a redundant description may be omitted and some sub-block forms may be omitted.

Unlike the above-described example, in one or more modes, a prediction value may be generated using only a first main reference pixel. For example, in a diagonal down left mode (in the present example, assuming a mode in which a starting point is in the left top corner and padding is performed in the right downward direction), a second main reference pixel which can be referred to may not exist. The first main reference pixel may be set as a basic reference pixel, and an additional reference pixel (in the present example, the second main reference pixel) may be used in generating a prediction value. In all modes in which the first main reference pixel and the second main reference pixel can be used, a prediction value may be generated using the first main reference pixel and the additional main reference pixel, or may be applied to some modes. Such application may be determined according to a size and form of a block, a prediction mode, and the like.

Figure 29:
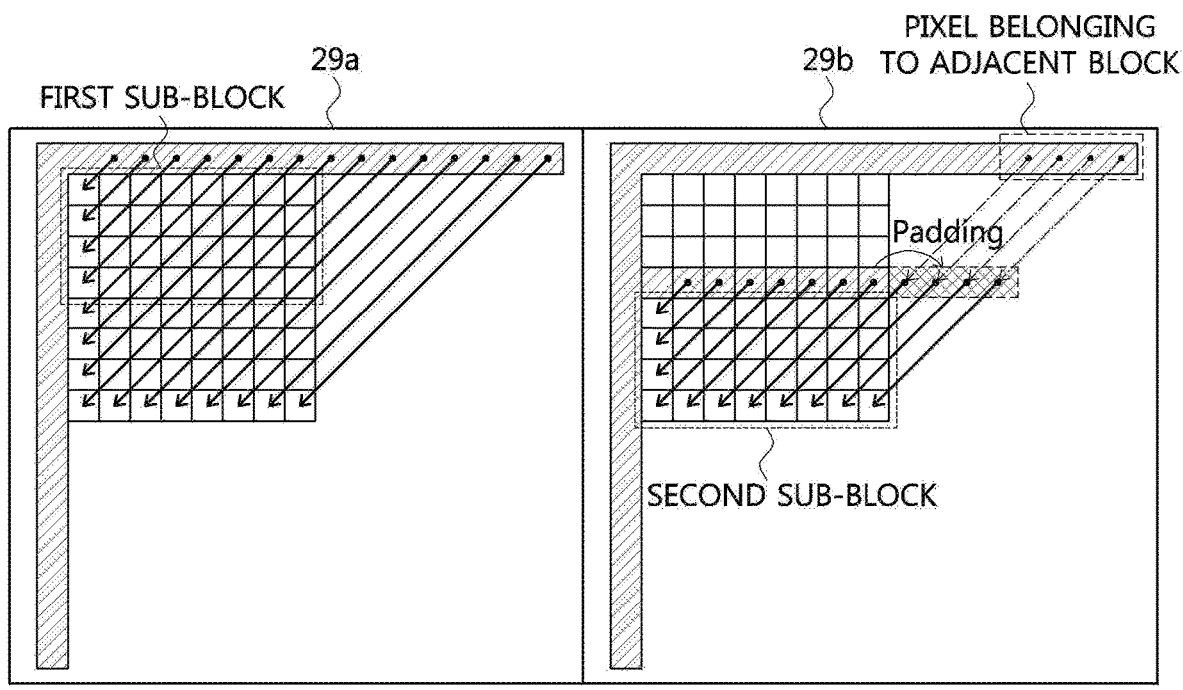
FIG. 29 is a first exemplary diagram for describing a method of performing prediction on a sub-block horizontally split in a binary mode in diagonal mode intra prediction according to one embodiment of the present invention.

FIG. 29 is a first exemplary diagram for describing a method of performing prediction on a sub-block horizontally split in a binary mode in diagonal mode intra prediction according to one embodiment of the present invention.

In 29a and 29b, a first sub-block 2M×N and a second sub-block 2M×N may be obtained by horizontally splitting a current block 2M×2N.

Referring to 29a, a pixel located in an intra prediction direction (diagonal direction) among pixels of a block adjacent to the current block is set as a main reference pixel and prediction on the first sub-block may be performed using the main reference pixel. More specifically, a prediction value for the first sub-block may be generated by setting a pixel located at a start point in the intra prediction direction and belonging to the block adjacent to the current block as a main reference pixel. For example, a prediction value may be generated by padding the main reference pixel in the prediction direction.

Referring to 29b, a prediction value may be generated by setting a pixel located at a start point in the intra prediction direction and belonging to a second sub-block as a main reference pixel. In this case, pixels of the first sub-block may not exist in the intra prediction direction. In this case, a pixel belonging to the block adjacent to the current block may be set as a main reference pixel, or a pixel of the first sub-block may be padded in the prediction direction so as to be used as a main reference pixel.

Figure 30:
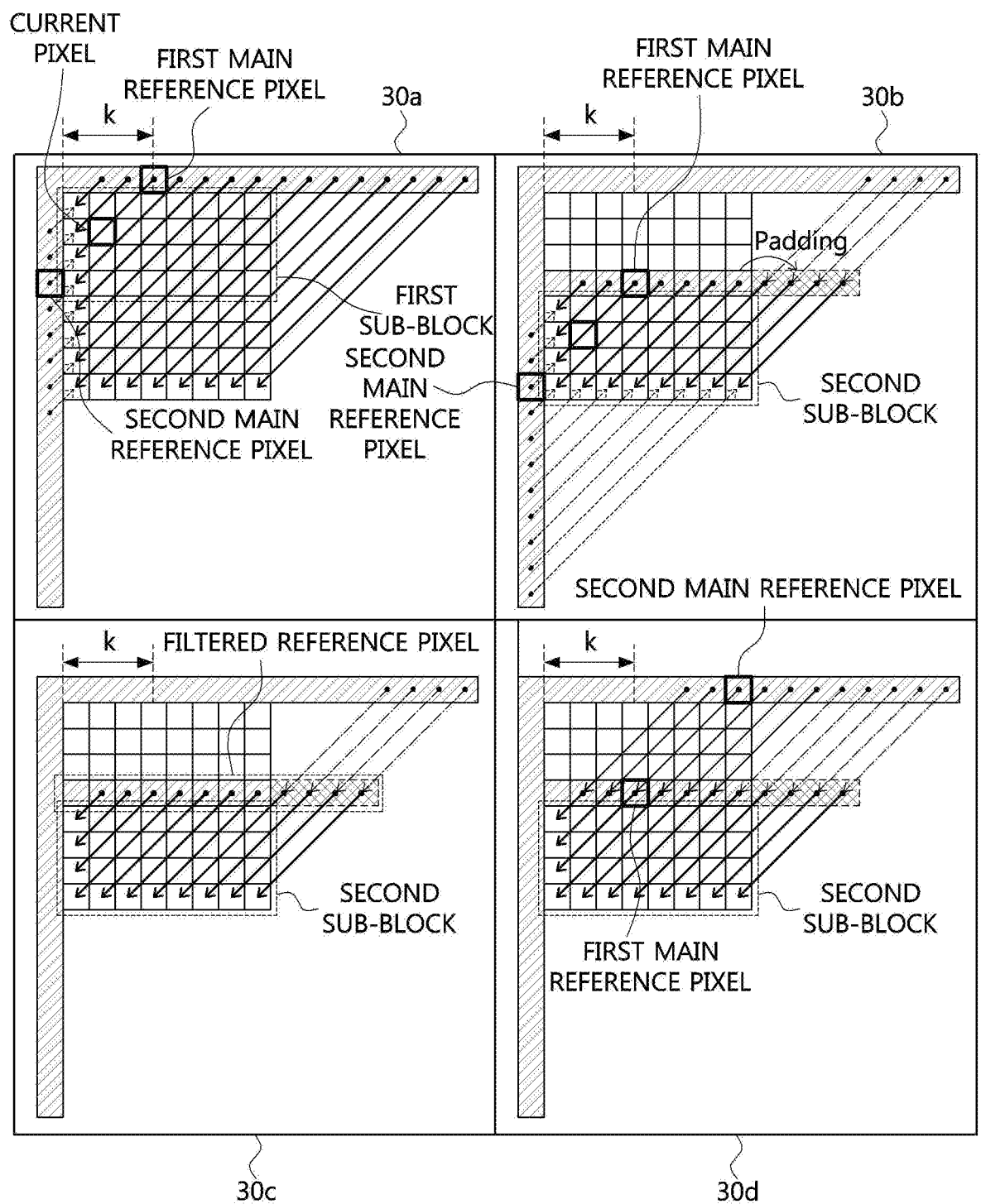
FIG. 30 is a first exemplary diagram for describing a method of performing prediction on a sub-block horizontally split in a binary mode in diagonal mode intra prediction according to one embodiment of the present invention.

FIG. 30 is a first exemplary diagram for describing a method of performing prediction on a sub-block horizontally split in a binary mode in diagonal mode intra prediction according to one embodiment of the present invention.

Referring to 30a, since there are two pixels belonging to a block adjacent to a current block in an intra prediction direction (diagonal direction), two pixels (a first main reference pixel and a second main reference pixel) are determined as main reference pixels, and a prediction value for a first sub-block may be generated using the main reference pixels. Here, the first main reference pixel may be located at a start point in the prediction direction and the second main reference pixel may be located at an end point in the prediction direction. In addition, prediction values for pixels located in an area indicated by k may be generated using both the first main reference pixel and the second main reference pixel, and prediction values for the pixels located out of the area indicated by k may be generated using only the first main reference pixel. Specifically, a value padded from the first main reference pixel may be used as a prediction value for the first sub-block, or an average value of the first and second main reference pixels or a value obtained by applying a weight to each of the first and second main reference pixels may be used as a prediction value for the first sub-block.

A process of generating a prediction block for a second sub-block after prediction and restoration for the first sub-block are completed may be described with reference to 30b. Here, a pixel belonging to the restored first sub-block is located at a start point in the intra prediction direction and a pixel adjacent to the current block is located at an end point, and thus prediction on the second sub-block may be performed by setting the two pixels as main reference pixels. In this case, pixels within a range set to k may be predicted using only the pixels belonging to the first sub-block as main reference pixels, and the pixels outside of the range set to k may be predicted by further setting a pixel located at an end point in the prediction direction as a main reference pixel. In addition, a pixel belonging to the first sub-block located at a start point in the prediction direction may not exist in a part in the prediction direction. In this case, as in 29b, a pixel belonging to the first sub-block may be padded in the prediction direction, or prediction may be performed using a pixel belonging to a block adjacent to the current block.

Another process of generating a prediction block for the second sub-block may be described with reference to 30c. As in 30b, a pixel located in the prediction direction and belonging to the first sub-block may be used as a main reference pixel, or filtering is performed on a pixel belonging to the first sub-block and the filtered pixel value may be used as a main reference pixel. In this case, a direction in which filtering is performed may be the same as or similar to the prediction direction, and filtering may performed on pixels arranged in the corresponding direction.

Still another process of generating a prediction block for the second sub-block may be described with reference to 30d. Specifically, prediction may be performed by setting a pixel belonging to the first sub-block and located at a start point in the intra prediction direction as a first main reference pixel and setting a pixel belonging to a block adjacent to the current block and located at a start point in an extended intra prediction direction as a second main reference pixel. For example, a value obtained by correcting the first main reference pixel with a difference value between the first main reference pixel and the second main reference pixel may be determined as a prediction value of the second sub-block. Alternatively, the sum of the first main reference pixel and the difference value between the first and second main reference pixels or the sum of the first main reference pixel and a value obtained by applying a weight to the difference value may be determined as a prediction value of the second sub-block. Specifically, slope information of previous pixels (in the present example, including the second main reference pixel) arranged in the intra prediction direction, including the first main reference pixel, may be used to correct the first main reference pixel and the slope information may be corrected on the basis of a distance between a current pixel and the first main reference pixel.

Figure 31:
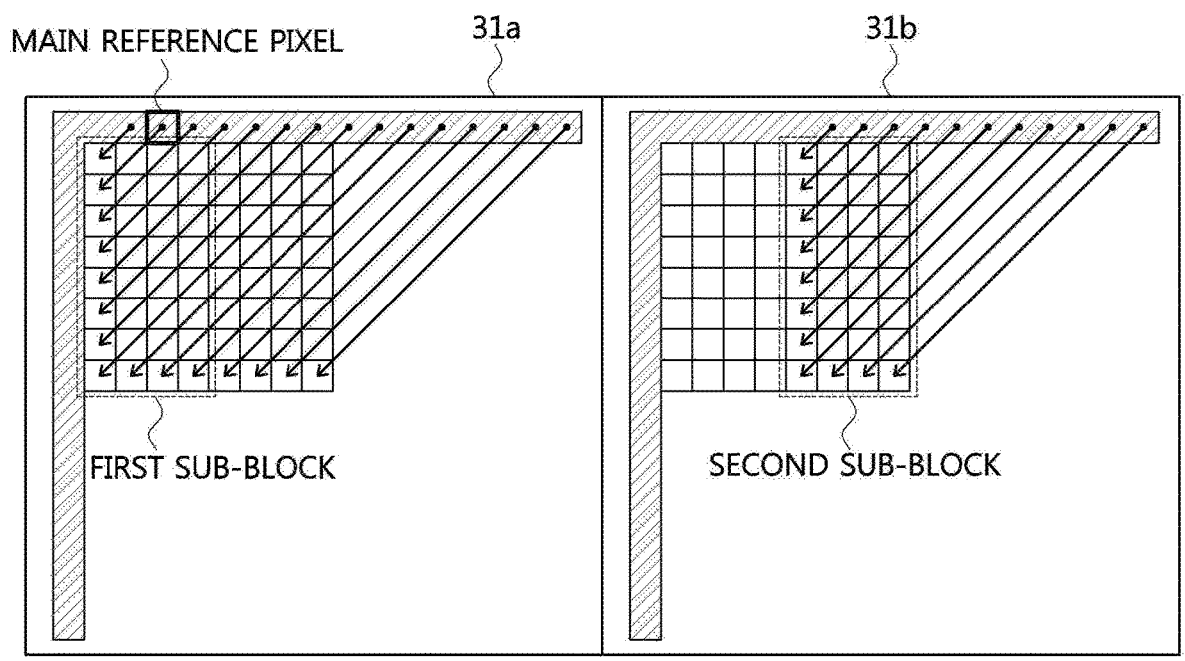
FIG. 31 is a first exemplary diagram for describing a method of performing prediction on a sub-block vertically split in a binary mode in diagonal mode intra prediction according to one embodiment of the present invention.

FIG. 31 is a first exemplary diagram for describing a method of performing prediction on a sub-block vertically split in a binary mode in diagonal mode intra prediction according to one embodiment of the present invention.

In 31a and 31b, a first sub-block and a second sub-block each have a size of M×2N on the basis of a current block of 2M×2N.

Referring to 31a, prediction on a first sub-block may be performed by setting a pixel belonging to a block adjacent to a current block and located in an intra prediction direction as a main reference pixel. More specifically, prediction may be performed by setting a pixel located at a start point in the intra prediction direction as a main reference pixel.

Referring to 31b, as in the first sub-block in 31a, prediction on a second sub-block may be performed by setting a pixel belonging to a block adjacent to the current block and located at a start point in the intra prediction direction as a main reference pixel.

Figure 32:
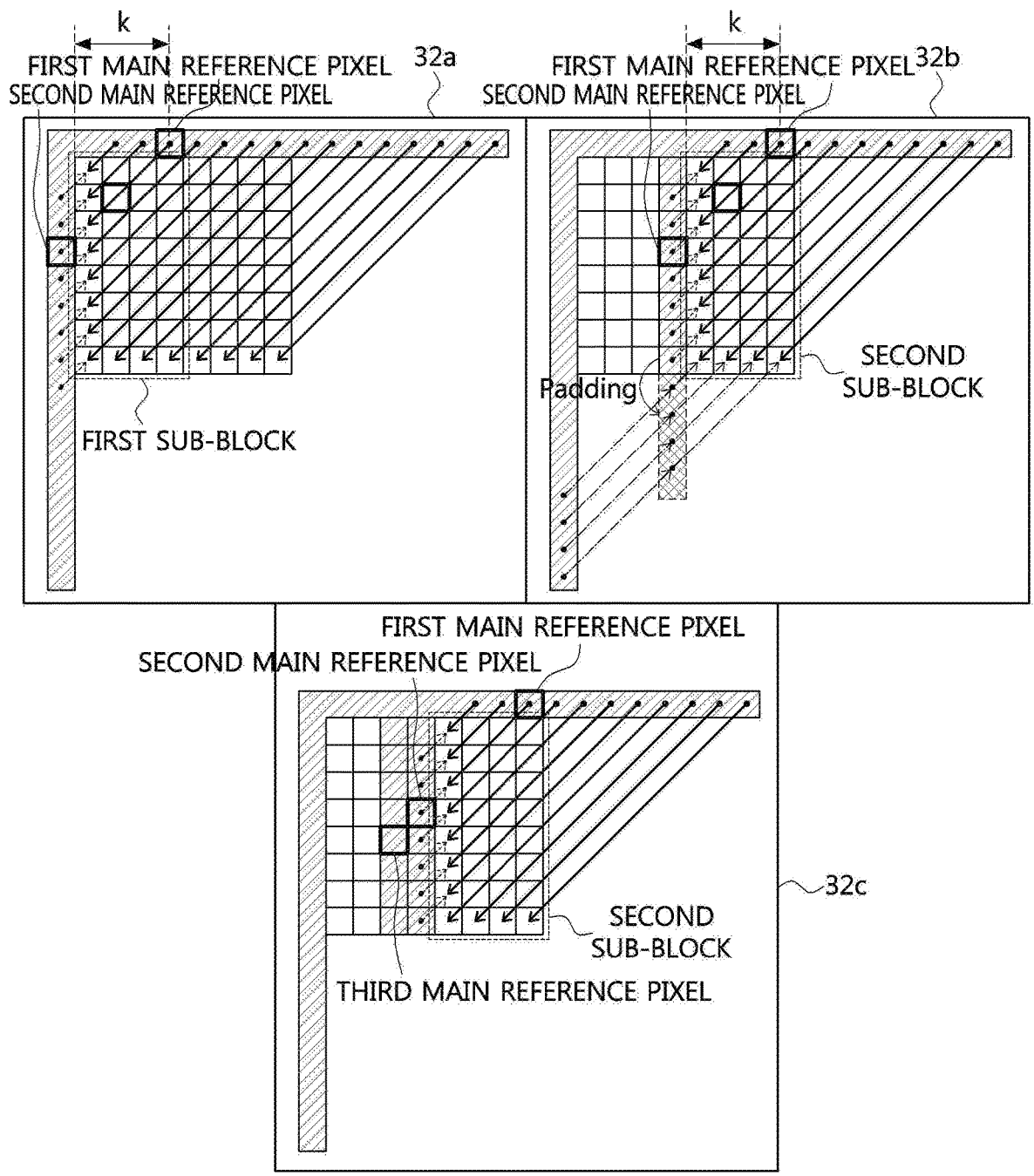
FIG. 32 is a second exemplary diagram for describing a method of performing prediction on a sub-block vertically split in a binary mode in diagonal mode intra prediction according to one embodiment of the present invention.

FIG. 32 is a second exemplary diagram for describing a method of performing prediction on a sub-block vertically split in a binary mode in diagonal mode intra prediction according to one embodiment of the present invention.

Referring to 32a, there are two pixels located onside above and the left side of a current block in an intra prediction direction among pixels belonging to a block adjacent to the current block. Therefore, prediction on a first sub-block may be performed by setting a pixel located at a start point in the intra prediction direction at the top of the current block as a first main reference pixel and setting a pixel located at an end point in the intra prediction direction on the left side of the current block as a second main reference pixel. In this case, for a pixel located within an area set to k, both the first main reference pixel and the second main reference pixel may be used, and for a pixel outside of the area set to k, only the first main reference pixel may be used. In the case in which both the first and second main reference pixels are used, an average value of the two main reference pixels or the sum of values obtained by applying a weight to each of the two main reference pixels may be determined as a prediction value for a current pixel in the first sub-block.

Referring to 32b, as in 32b, a first main reference pixel belonging to a block adjacent to a current block may be used. However, since a pixel in the first sub-block for which encoding and restoration are completed is located in the intra prediction direction, a pixel in the first sub-block may be set as a second main reference pixel for use. A method of using the first main reference pixel and the second main reference pixel is the same as the method in 32a, and thus a redundant description thereof will be omitted.

Referring to 32c, as in 32b, a first main reference pixel may be used, or a pixel in the first sub-block for which encoding and restoration are completed may be further used.

In this case, in addition to a second main reference pixel, a third main reference pixel adjacent to the second main reference pixel in the intra prediction direction and located in the first sub-block may be further used to predict a second sub-block. For example, the sum of values obtained by applying a weight to each of the first main reference pixel, the second main reference pixel, and the third main reference pixel may be determined as a prediction value for a current pixel of the second sub-block, or an average value of the first to third main reference pixels may be determined as a prediction value for a current pixel of the second sub-block.

Figure 33:
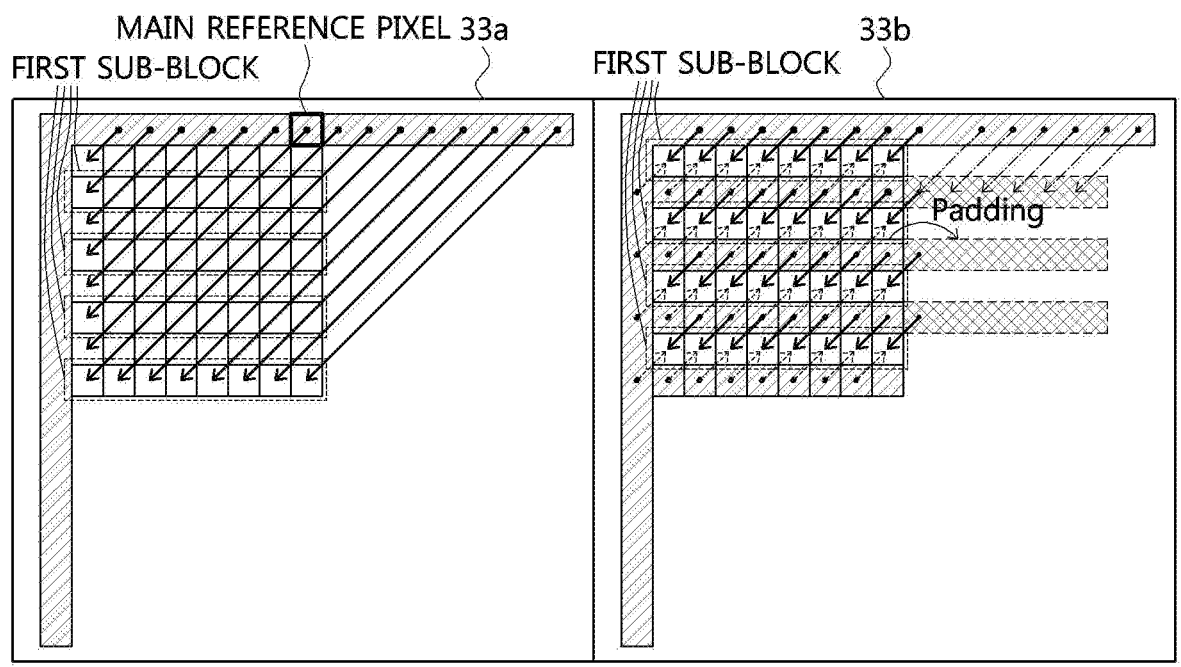
FIG. 33 is a first exemplary diagram for describing a method of predicting a sub-block split by a pixel line in diagonal mode intra prediction according to one embodiment of the present invention.

FIG. 33 is a first exemplary diagram for describing a method of predicting a sub-block split by a pixel line in diagonal mode intra prediction according to one embodiment of the present invention.

Referring to 33a, a first sub-block of a current block to be encoded may consist of pixel lines located horizontally at even-numbered positions with respect to the current block. In this case, a pixel belonging to a block located on a side above or a right side above the current block may be set as a main reference pixel so that prediction value for each pixel of the first sub block may be generated by padding the main reference pixel value in the prediction direction.

Referring to 33b, a second sub-block of a current block to be encoded may consist of pixel lines located vertically at odd-numbered positions with respect to the current block. In this case, a pixel belonging to the first sub-block which has been already restored, or a pixel belonging to a block adjacent to the current block exists ahead of and behind of a current pixel to be predicted in a prediction direction, and thus two pixels located ahead of and behind in the prediction direction are set as main reference pixels so that prediction on the second sub-block may be performed. Specifically, an average of the two pixels located ahead of and behind of the prediction direction of the current pixel or the sum of values obtained by applying a weight to each of the two pixels may be determined as a prediction value of the current pixel.

In 33a or 33b, when a main reference pixel located in an intra prediction direction does not exist, the main reference pixel may be padded in the prediction direction and be referred to, as described above.

Figure 34:
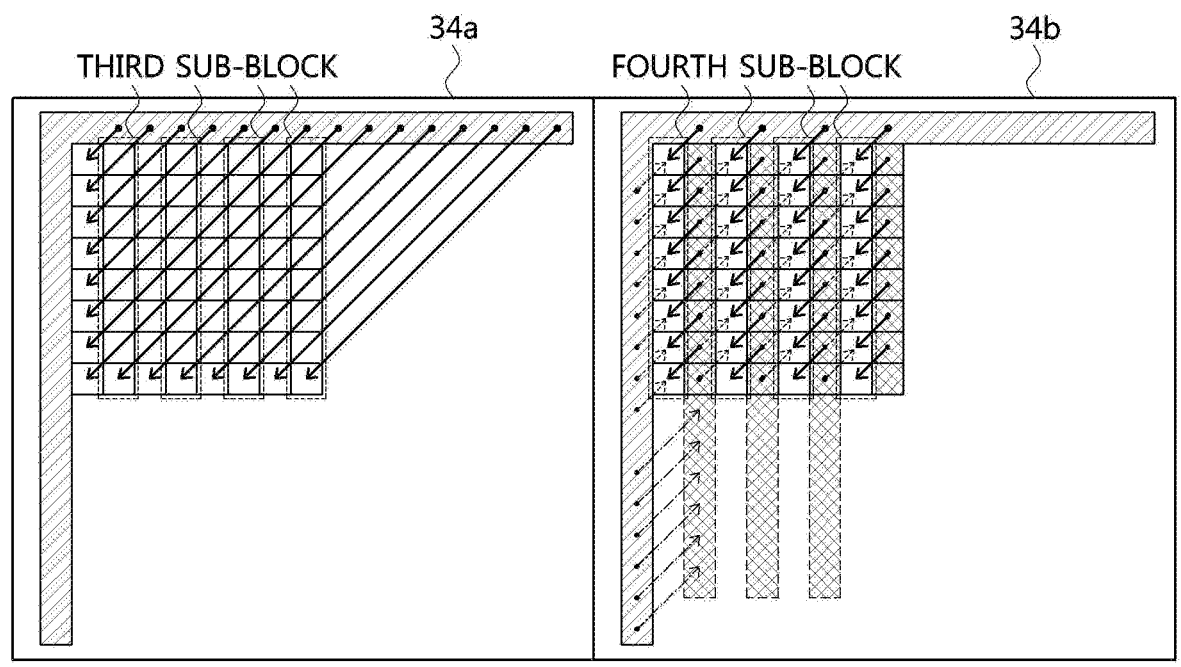
FIG. 34 is a second exemplary embodiment for describing a method of predicting a sub-block split by a pixel line in diagonal mode intra prediction according to one embodiment of the present invention.

FIG. 34 is a second exemplary embodiment for describing a method of predicting a sub-block split by a pixel line in diagonal mode intra prediction according to one embodiment of the present invention.

Referring to 34a, a first sub-block of a current block to be encoded may consist of pixel lines located vertically at even-numbered positions with respect to the current block. In this case, a pixel belonging to a block located on a side above or a right side above the current block may be set as a main reference pixel and a main reference pixel value may be padded in a prediction direction so that a prediction value for each pixel of the first sub-block may be generated.

Referring to 34b, a second sub-block of a current block to be encoded may consist of pixel lines located vertically at odd-numbered positions with respect to the current block. In this case, a pixel belonging to a first sub-block which has been already restored, or a pixel belonging to a block adjacent to the current block exists ahead of and behind of a current pixel to be predicted in a prediction direction, and thus two pixels located ahead of and behind in the prediction direction are set as main reference pixels so that prediction on the second sub-block may be performed. Specifically, an average of the two pixels located ahead of and behind of the prediction direction of the current pixel or the sum of values obtained by applying a weight to each of the two pixels may be determined as a prediction value of the current pixel.

In 34a or 34b, when a main reference pixel located in an intra prediction direction does not exist, the main reference pixel may be padded in the prediction direction and be referred to, as described above.

The above embodiments include a case in which prediction is performed using a pixel in integer units as the reference pixel in the prediction mode in a diagonal direction. In some modes, the embodiments may include a case in which prediction may be performed by interpolating reference pixels in decimal units, as well as reference pixels in integer units according to a prediction mode. In the above example, the first main reference pixel is a pixel in integer units located at a start point in a prediction direction and the second main reference pixel is a pixel in decimal units located at an end point in the prediction direction. However, according to some prediction modes, the first main reference pixel may indicate a pixel in integer units or in decimal unit located at the start point in the prediction direction and the second main reference pixel may indicate a pixel in integer units or in decimal unit located at the end point in the prediction direction. Alternatively, the first main reference pixel may indicate one pixel in integer units or in decimal unit located at the start point in the prediction direction and the second main reference pixel may indicate two or more pixels in integer units located at the end point in the prediction direction. In this case, two or more pixels in integer units may be pixels adjacent to the end point in the prediction direction.

In the above embodiments, when encoding is performed by partitioning into two or more sub-blocks, a transform may be performed using the same or different transform schemes on a sub-block-by-sub-block basis. For example, when settings related to a transform (in the present example, whether to perform a transform, a transform type, and the like) are completed on a coding block unit, the same transform scheme determined on the unit is applicable to a sub-block. In another example, when settings related to a transform are completed on a transform block unit, an independent transform scheme may be applied to a sub-block.

Figures 35, 36:
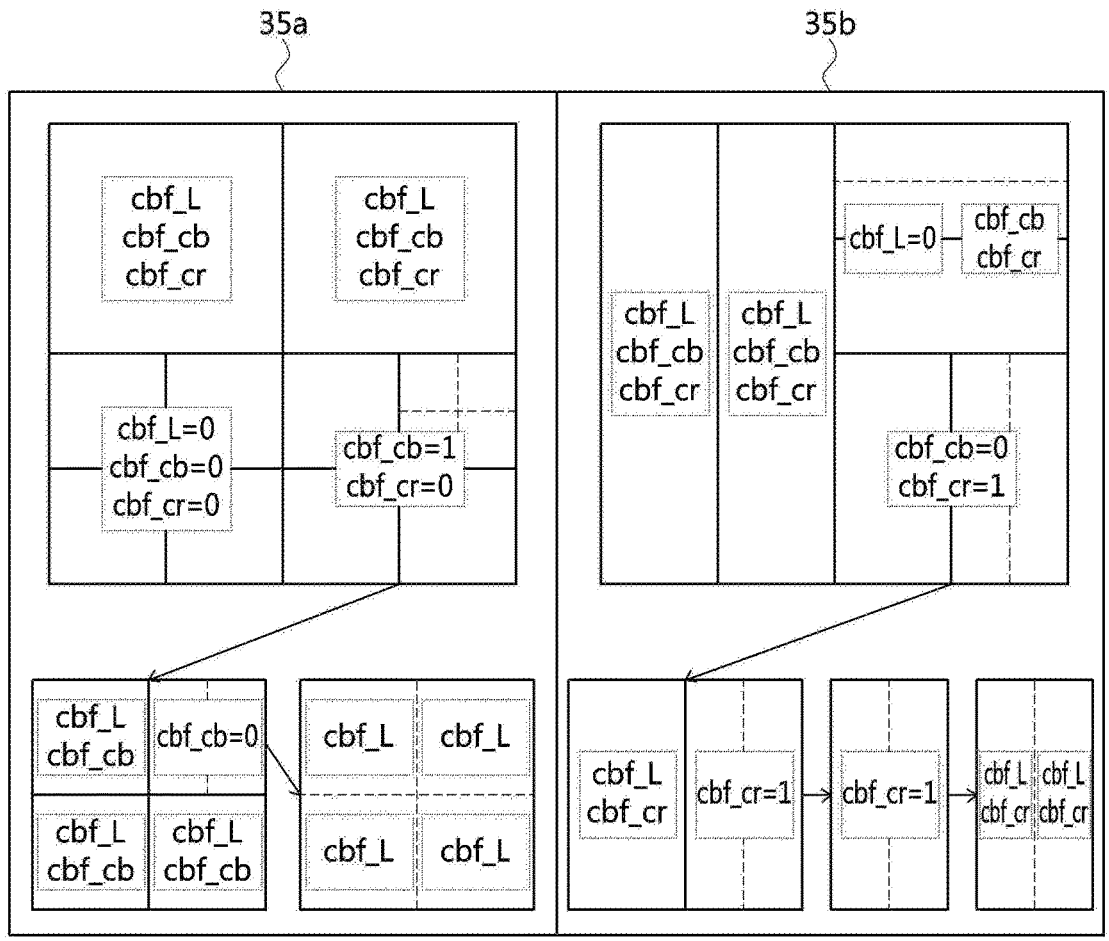
FIG. 35 is an exemplary diagram for describing a flag indicating, on a transform block unit basis, whether a coding coefficient is present or absent.
FIG. 36 is a diagram illustrating examples of syntax with respect to a residual block in HEVC.

FIG. 35 is an exemplary diagram for describing a flag indicating, on a transform block unit basis, whether a coding coefficient is present or absent.

In 35a and 35b of FIG. 35, a bold solid line represents a coding block partitioning line, a thin solid line represents a transform block partitioning line at a coding block reference depth of 0, and a dotted line represents a transform block partitioning line at a depth of 1.

35a is an example of setting of a coding coefficient presence/absence flag (in the present example, cbf (coded block flag)) when a coding block is partitioned using a quadtree scheme or the coding block is a square block and when a transform block is transformed using a quadtree scheme or the transform block is a square block. In 35a (when the largest block is a 2N×2N block), an upper left block (N×N) and an upper right block (N×N) may be examples of blocks in which partitioning of the transform block is not supported and a size and shape of the transform block are determined as a coding block is determined. That is, in such blocks, a coding block may not support information about a size and shape of a transform block.

Since the upper left block (N×N) and the upper right block (N×N) are blocks in which a transform block is determined without partitioning the transform block, cbf for each color component is supported and additional cbf information is not generated.

In the case of a lower left block (N×N), a transform block is split into smaller blocks (N/2×N/2) and information on whether a coding coefficient of a split block is present or absent may be required. In this case, whether additional cbf information is generated for transform blocks split into lower units may be determined according to cbf information. In the present example, since cbf information for each color component is 0, a coding coefficient of each component does not occur in the split transform blocks and thus cbf information is not additionally generated.

In the case of a lower right block (N×N), a transform block is split (N/2×N/2) and information on whether a coding coefficient of a split block is present or absent may be required. In this case, part of cbf information may be omitted. In the case of some color components (luma), a setting may be established (transmitted intact in the lower left block) on the assumption that, when the transform block is split, a coding coefficient occurs in at least one block among lower transform blocks. Hence, in the case of the lower right block, only information of cbf_cb and cbf_cr may be generated. In the present example, under the setting (cbf_L=1) in which a coding coefficient exists in the case of luma, relevant information is omitted, and since cbf_cb is 1, cbf_cb for lower transform blocks may be additionally generated.

In the case of blocks (upper left, lower left, and lower right blocks <N/2×N/2>) in the lower right block (N×N), in each of which a transform block is not further split, cbf_cr is set to 0 in an upper unit and hence is not generated, information of cbf_L and cbf_cb may be generated, and additional cbf information is not generated.

In the case of an upper right block (N/2N/2), a transform block is split (N/4×N/4) and the transform block is split as in the upper unit so that information of cbf_L is not generated (cbf_L=1) and only information on cbf_cb may be generated. In the present example, cf_cb is set to 0, and thus additional information on cbf_cb is not generated on a lower unit.

When further partitioning of a transform block does not occur, cbf information remaining until a current stage may be generated in the lower blocks (N/4×N/4). In the present example, cbf_L is the resultant cbf information.

35b indicates an example of setting of a coding coefficient presence/absence flag when a coding block is partitioned using a binary tree scheme or the coding block is a rectangular block and when a transform block is partitioned using a binary tree scheme or the transform block is a rectangular block. In 35b (when the largest block is a 2N×2N block), the leftmost block (N/2×2N) and the second left block (N/2×2N) may be examples of blocks in which partitioning of the transform block is not supported and a size and shape of the transform block are determined as a coding block is determined. That is, in such blocks, a coding block may not support information about a size and shape of a transform block.

In the case of an upper right block (N×N), a transform block is split (N×N/2) and information on whether a coding coefficient of the split block is present or absent may be required. In this case, whether additional cbf information for the transform blocks split into lower units is generated may be determined according to cbf information. In the present example, since cbf_L information for each color component is 0, a coding coefficient of each component does not occur in the split transform blocks and thus cbf_L information is not additionally generated. As described in the block partitioning process above, a dependent setting may be possible in which coding, prediction, and transform blocks follow a split form of luma after being resized in Cb and Cr according to a color format. Also, independent settings for split forms of Luma, Cb and Cr may be possible. In this case, cbf_cr and cbf_cb may be processed independently of cbf_L. In the present example, luma has a form further split as indicated by a dotted line. However, since cbf_L is 0, additional cbf_L information is not generated on lower units, and in the case of cb and cr, a split form is N×N (the same size and shape of the coding block), and thus cbf_cb and cbf_cr may not be additionally generated. The settings for the above information may determine whether to support independent partitioning or dependent partitioning according to conditions, such as a slice type, a size and shape of a block, and the like.

In the case of a lower right block (N×N) (a setting in which cb and cr follow luma), a transform block is split (N/2×N) and information on whether a coding coefficient of the split block is present or absent may be required. It is assumed that cbf of some color component (luma) is omitted on the assumption that a transform block in a lower unit is present (cbf_L=1). In the present example, since cf_cb is 0, cbf_cb information in a lower unit is no longer generated, and since cbf_cr is 1, additional cbf_cr information may be generated in a transform block in a lower unit. A left block (N/2×N) among the split transform blocks is not further split, and thus cbf_L and cbf_cr may be generated. The right block (N/2×N) among the split transform blocks is subject to transform block split (dotted line), and thus cbf_L may be omitted and cbf_cr may be generated. The further split transform block (N/4×N) is not further split, and information on each of cbf_L and cbf_cr may be generated.

Accordingly, in the case of the lower right block, it is possible to generate information of only cbf_cb and cbf_cr. In the present example, under the setting (cbf_L=1) in which a coding coefficient exists in luma, relevant information is omitted, and since cbf_cb is 1, cbf_cb for lower transform blocks may be additionally generated.

Through the above processes, it is possible to check the information on whether a coding coefficient is present or absent on a transform block-by-transform block basis. An encoding process for a coding coefficient may be performed only when the cbf_is 1.

FIG. 36 is a diagram illustrating an example of syntax with respect to a residual block in HEVC.

A large amount of coding coefficients (in the case of lossy compression) tend to occur near a direct current (DC) component and a low frequency component due to transform and quantization processes. Therefore, it may be inefficient to encode a coefficient component at every position of a transform block (M×N). It may be efficient if information (x, y) as to which position a coding coefficient last occurred is transmitted. The information may be represented by transmitting information on lengths of width and height with respect to specific coordinates of a block (one of upper left, upper right, lower left, and lower right blocks, which may be determined according to an encoding setting (e.g., QP) or may be determined from two or more sets of candidates). Referring to FIG. 36, syntax for the information as to which position the coding coefficient last occurred is last_sig_coeff_x_prefix~last_sig_coeff_y_suffix.

In HEVC, a coding coefficient is processed by splitting a transform block into sub-blocks in units of 4×4. Similarly to cbf of FIG. 35, syntax for handling the details on whether a non-zero coding coefficient is present or absent in sub-blocks in units of 4×4 is coded_sub_block_flag, and a coding coefficient of a corresponding block is encoded only when a value of the syntax is 1. As described above, a sub-block unit (for encoding a coding coefficient) having a fixed size and shape regardless of a size and shape of a transform block may be supported, or a sub-block unit having an adaptive size and shape in accordance with a size and shape of a transform block may be supported. For example, the sub-block unit including 4×4 may support an additional size and shape (e.g., 8×8), and in this case, a unit in which coded_sub_block_flag is supported may be 4×4 or other units with an additional size and shape. In addition, the setting for the syntax may vary according to a size and shape of a sub-block unit. Also, the setting for the syntax may vary according to a coding mode. For example, when up to a coeff_abs_level_greater1_flags (flags indicating whether an absolute value of a coding coefficient is greater than 1) and up to b coeff_abs_level_greater2_flags (flags indicating whether an absolute value of a coding coefficient is greater than 2) are supported in a first sub-block, up to c coeff_abs_level_greater1_flags and up to d coeff_abs_level_greater2_flags may be supported in a second sub-block, wherein a may be greater than or equal to c, b may be greater than or equal to d, and a size of the first sub-block may be greater than a size of the second sub-block. In another example, when, in the case where a coding mode is intra mode, up to a coeff_abs_level_greater1_flags and up to b coeff_abs_level_greater2_flags are supported, up to c coeff_abs_level_greater1_flags and up to d coeff_abs_level_greater2_flags may be supported in inter mode, wherein a and c may be equal to or different from each other and b and may be equal to or different from each other.

A description is given on the assumption that a current transform block is a 4×4 block, which consists of one 4×4 sub-block, and therefore coded_sub_block_flag is not generated, cbf information (supported on a transform-block-by-transform-block basis) is generated, and an order in which a 4×4 block scans coding coefficients follows a diagonal scan (from the top right to a lower left) order.

Figures 37, 38:
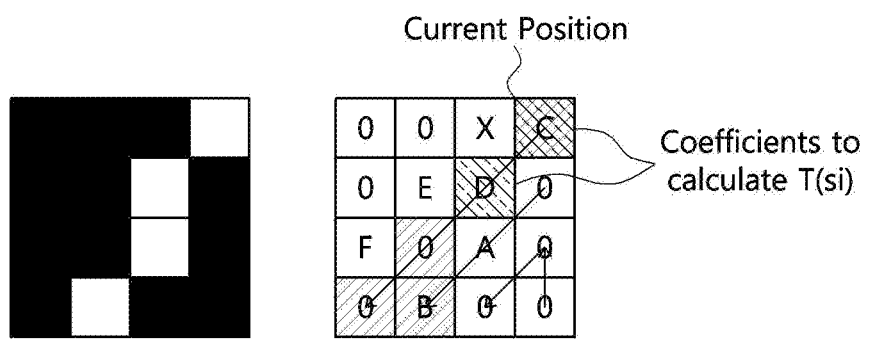
FIG. 37 is an exemplary diagram for describing encoding of a coding coefficient according to one embodiment of the present invention.
FIG. 38 is an exemplary diagram for describing coding coefficients before a current coding coefficient and a coefficient for determining a value of Equation 15.

FIG. 37 is an exemplary diagram for describing encoding of a coding coefficient according to one embodiment of the present invention.

Reference numeral 37a denotes coding coefficients and reference numeral 37b denotes a scanning order of coding coefficients. For each coding coefficient, sig_coeff_flag is generated, which may be syntax for indicating whether the coding coefficient is 0. When a value of sig_coeff_flag is 0, additional syntax does not occur in a corresponding coefficient, and when a value of sig_coeff_flag is 1, additional syntax information for the coding coefficient may be generated. coeff_sign_flag contains information as to which sign a corresponding coefficient has, wherein when a value thereof is 0, it may indicate a positive number and when a value thereof is 1, it may indicate a negative number. In addition, syntax (coeff_abs_level_greater1_flag) for indicating whether an absolute value of a corresponding coefficient is greater than 1 is checked, wherein when the absolute value is 0, additional syntax does not occur, and when the absolute value is 1, syntax (coeff_abs_level_greater2_flag) for indicating whether the absolute value of the corresponding coefficient is greater than 2 is checked. When a value of the syntax (coeff_abs_level_greater2_flag) is 0, additional syntax does not occur, and when the value is 1, syntax for remaining values of the corresponding coefficient may be supported.

Here, coeff_abs_level_remaining may be syntax that is supported when processing cannot be performed using pieces of syntax for the respective coefficients supported on a sub-unit-by-sub-unit basis.

TABLE 1

| Scanning order | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| coefficient | 1 | 0 | 0 | 1 | 0 | 0 | 0 | −1 | −1 | 2 | 3 | 5 | −5 | 6 | −7 | 8 |
| sig_coeff_flag | 1 | 0 | 0 | 1 | 0 | 0 | 0 | 1 | 1 | 1 | 1 | 1 | 1 | 1 | 1 | 1 |
| coeff_abs_level_greater1_flag | 0 | | | 0 | | | | 0 | 0 | 1 | 1 | 1 | 1 | | | |
| coeff_abs_level_greater2_flag | | | | | | | | | | 0 | | | | | | |
| coeff_sign_flag | 0 | | | 0 | | | | 1 | 1 | 0 | 0 | 0 | 1 | 0 | 1 | 0 |
| coeff_abs_level_remaining | | | | | | | | | | | 1 | 3 | 3 | 5 | 6 | 7 |

The above Table 1 shows coding coefficients and related syntax according to the coding coefficients of 37a and the scanning order of 37b in a case where up to 8 coeff_abs_level_greater1_flags and up to 1 coeff_abs_level_greater2_flag are supported. Settings may be established as shown above on the assumption that pieces of the above syntax are supported starting from the first non-zero coding coefficient in the scanning order and when the maximum number of pieces of syntax occur, coefficients occurring after that are sufficiently large coefficients. Such settings may vary according to a size and shape of a sub-block and the like.

In the case of coeff_abs_level_remaining, coefficient values remaining in consideration of sig_coeff_flag, coeff_abs_level_greater1_flag, and coeff_abs_level_greater2_flag in the coding coefficients may be calculated by Equation 12 below.

[Equation 12]

$$\text{coeff\_abs\_level\_remaining} = |\text{coefficient}| - \text{sig\_coeff\_flag} - \text{coeff\_abs\_level\_greater1\_flag} - \text{coeff\_abs\_level\_greater2\_flag}$$

Equation 12 may be calculated according to syntax generated for each coefficient, and when syntax coeff_abs_level_remaining is not generated, a value of the syntax may be set to 0. In addition to syntax mentioned below, additional syntax factors used to reach coeff_abs_level_remaining may be considered.

Basic settings of pieces of the above syntax are established according to lossy encoding. Typical lossy encoding includes a precondition that a large amount of residual coefficients in a frequency domain occurs near a DC component at the upper left of a transform block. However, depending on some image features and a quantization parameter setting, a situation that violates the precondition may occur. For example, in preparation for a situation where the transform coefficient distribution is not concentrated on general DC components, a transform or quantization may be omitted and a definition for the operation of the syntax may be changed.

Binarization of coeff_abs_level_remaining may be supported by a conditional expression below.

[Equation 13]

$$p = \left\lfloor \frac{v}{2^k} \right\rfloor \text{ where } s = v - p \cdot 2^k$$

In Equation 13, prefix (p) is composed of truncated unary binarization, suffix(s) is composed of binary representation, and a binarization table as shown in Table 2 is given.

TABLE 2

| v | Codeword | | | | |
|---|---|---|---|---|---|
| | k = 0 | k = 1 | k = 2 | k = 3 | k = 4 |
| 0 | 0 | 0.0 | 0.00 | 0.000 | 0.0000 |
| 1 | 10 | 0.1 | 0.01 | 0.001 | 0.0001 |
| 2 | 110 | 10.0 | 0.10 | 0.010 | 0.0010 |
| 3 | 1110 | 10.1 | 0.11 | 0.011 | 0.0011 |
| 4 | 11110 | 110.0 | 10.00 | 0.100 | 0.0100 |
| 5 | 111110 | 110.1 | 10.01 | 0.101 | 0.0101 |
| 6 | 1111110 | 1110.0 | 10.10 | 0.110 | 0.0110 |
| 7 | 11111110 | 1110.1 | 10.11 | 0.111 | 0.0111 |
| 8 | 111111110 | 11110.0 | 110.00 | 10.000 | 0.1000 |
| 9 | 1111111110 | 11110.1 | 110.01 | 10.001 | 0.1001 |
| 10 | 11111111110 | 111110.0 | 110.10 | 10.010 | 0.1010 |
| 11 | 111111111110 | 111110.1 | 110.11 | 10.011 | 0.1011 |
| 12 | 1111111111110 | 1111110.0 | 1110.00 | 10.100 | 0.1100 |
| 13 | 11111111111110 | 1111110.1 | 1110.01 | 10.101 | 0.1101 |

In Table 2, k is a variable for the binarization table, and a codeword to be assigned to v may be adjusted according to k. A different codeword is characteristically assigned according to k. For example, in a situation where a large number of small values are generated, a smaller value of k causes averagely a shorter codeword to occur in v, and in a situation where a numerous number of large values are generated, a larger value of k causes averagely a shorter codeword to occur in v. Hence, k may be a variable that is adjusted to keep an average codeword short. Various methods including the above-described method may be used for binarization used in generating a codeword, such as the prefix, the suffix, and the like, and classification of prefix and suffix, and the above-described method may be one example of a method of generating an averagely short codeword by adjusting a codeword assigned to each value (in the present example, a coding coefficient) according to a specific parameter variable, and other modification including such a concept may be possible.

[Equation 14]

If $|x| > 3 \cdot 2^k$, then $k' = \min(k+1, 4)$

Equation 14 is an expression for a condition for updating k parameter. When the condition of Equation 14 is satisfied, k may be updated to k', and a maximum value that k can reach is 4. K may be set according to conditions, such as bit_depth, a quantization parameter, and the like.

When the coding coefficients may be encoded according to the scanning order in the sub-block, k may be initially set to 0. After a codeword according to a value v of the coeff_abs_level_remaining is assigned, a condition for updating a k value is checked by comparing it with the above expression condition. When the above condition is satisfied, the k value is updated to k' and may be used as k at the time of encoding a value of the next coeff_abs_level_remaining. The k value can be increased by up to 1 in each update process and increased up to the maximum value of 4 as set above, so that the k value can be involved in codeword assignment of coeff_abs_level_remaining. In addition, k may not change or may increase, by nature, in the update process. Since in a general encoding environment (lossy), quantization is performed after transformation into frequency domain, as a direction of scanning order progresses, more number of coefficients having large absolute values are generated in a DC component (upper left of the residual block) and as coefficients are located in the lower right side (high frequency domain), coefficients having small absolute values are generated, and such characteristics are considered. The updating condition for the k value may have different settings on a transform-block-by-transform-block basis. In addition, different settings may be established according to encoding settings (in the present example, a quantization parameter, intra prediction method <block-based prediction/pixel-based prediction>). For example, in the process of prediction and encoding, a different updating condition for the k value may be applied in the case of a predicted and encoded block by additionally referring to pixels within a block already restored in the current block, as well as pixels belonging to a block, which is predicted and encoded using a reference pixel belonging to a block adjacent to a current block. In the latter case, characteristics of coding coefficients (a quantized transform coefficient sequence or a difference pixel sequence after prediction) after the transform and quantization process due to generation of an accurate prediction block may be different. This may be connected to an example in which an updating condition varies according to an intra prediction scheme, because characteristics of coding coefficients may differ according to a block-based prediction method and a pixel-based prediction method. As another example, in the case of lossless compression, a different updating condition may be applied since different coding coefficient characteristics are shown in the case of lossy compression.

The update settings for k parameter as described above may affect the assignment of unsuitable codeword due to insufficient consideration of characteristics of an image. In addition, characteristics according to other encoding settings may not be considered.

Efficient encoding may be performed by setting two or more sets of candidates for a characteristic of a k value (conventionally, a k value does not decrease but increases and is incremented by 1 each time). In one example of characteristics of a k value, the k value may increase or decrease by nature. In one example, the k value may increase (or decrease) by 1 or greater. In one example, a range of k may be set from 0 to t, and t may have one or more sets of candidates. One or more settings for k may be established by combining the above-described various settings. Such settings may be determined on a unit-by-unit basis, such as a sequence, a picture, a slice, or the like.

If the above-described additional characteristics of a k value are defined, the equation for determining quantization of existing coeff_abs_level_remaining needs to be modified.

[Equation 15]

$$T(S_i) = \frac{1}{N} \sum_{i=0}^{N} S_i$$

In Equation 15, $S_i$ represents each (non-zero) coding coefficient and T( ) represents a boundary value condition for determining which k value will be taken from the binarization table according to the above-described k. N represents the number of (non-zero) coding coefficients before the position of a current coding coefficient used to obtain T( ). $T(S_i)$ may be obtained using an average of consecutive coding coefficients before the current coding coefficient.

| | Codeword | | | | |
|---|---|---|---|---|---|
| v | k = 0 | k = 1 | k = 2 | k = 3 | k = 4 |
| 0 | 0 | 0.0 | 0.00 | 0.000 | 0.0000 |
| 1 | 10 | 0.1 | 0.01 | 0.001 | 0.0001 |
| 2 | 110 | 10.0 | 0.10 | 0.010 | 0.0010 |
| 3 | 1110 | 10.1 | 0.11 | 0.011 | 0.0011 |
| 4 | 11110 | 110.0 | 10.00 | 0.100 | 0.0100 |
| 5 | 111110 | 110.1 | 10.01 | 0.101 | 0.0101 |
| 6 | 1111110 | 1110.0 | 10.10 | 0.110 | 0.0110 |
| 7 | 11111110 | 1110.1 | 10.11 | 0.111 | 0.0111 |
| 8 | 111111110 | 11110.0 | 110.00 | 10.000 | 0.1000 |
| 9 | 1111111110 | 11110.1 | 110.01 | 10.001 | 0.1001 |
| 10 | 11111111110 | 111110.0 | 110.10 | 10.010 | 0.1010 |
| 11 | 111111111110 | 111110.1 | 110.11 | 10.011 | 0.1011 |
| 12 | 1111111111110 | 1111110.0 | 1110.00 | 10.100 | 0.1100 |
| 13 | 11111111111111 | 1111110.1 | 1110.01 | 10.101 | 0.1101 |

38 is an exemplary diagram for describing coding coefficients before a current coding coefficient and a coefficient for determining a value of Equation 15.

Reference numeral 38a depicts coding coefficients (grey colored blocks represent non-zero coefficients) before a current coding coefficient, and some coding coefficients are used to calculate $T(S_i)$. A range of the coefficient by which the k value is updated to k' through Equation 14 may be summarized as shown in Table 3 below.

TABLE 3

| v | k | Codeword |
|---|---|---|
| 0 | 0 | 0 |
| 1 | 0 | 10 |
| 2 | 0 | 110 |
| 3 | 1 | 10.1 |
| 4 | 1 | 110.0 |
| 5 | 1 | 110.1 |
| 6 | 2 | 10.10 |
| 7 | 2 | 10.11 |
| 8 | 2 | 110.00 |
| 9 | 2 | 110.01 |
| 10 | 2 | 110.10 |
| 11 | 2 | 110.11 |
| 12 | 3 | 10.100 |
| 13 | 3 | 10.101 |

From Table 3, a codeword of k=0 may be assigned to T(si) from 0 to 2, and a codeword of k=1 may be assigned to T(si) from 3 to 5. That is, a codeword of k updated through T(si) is assigned, which may be summarized as shown in Table 3. Minimum codeword that each coefficient can have according to the k parameter may be organized into one table. For example, if k is updated to 1 through the above-described updating process for a current coefficient (assumed as 3), a codeword 101 for 3 may be assigned when k is 1.

The additional k updating settings as described above are provided, so that an adaptive codeword can be assigned. For example, according to a quantization parameter, the above method may be used in a lossless compression environment, and the existing method may be used in a lossy compression environment. It is possible to improve encoding efficiency by changing not only a setting for operation of syntax but also a setting for scanning in the entropy encoding process, as described above.

TABLE 4

| Intra | N × N TU | | | |
|---|---|---|---|---|
| Prediction Mode | N = 4 | N = 8 | N = 16 | N = 32 |
| HOR − 4 to HOR + 4 | Diag | Ver → Hor | Hor → Ver | Diag |
| VER − 4 to VER + 4 | Diag | Hor → Ver | Ver → Hor | Diag |
| Remaining modes | Diag | Diag | Diag | Diag |

In Table 4, a scanning method in intra prediction is defined. In HEVC, different scanning methods are applied according to intra prediction mode. However, according to image characteristics, a quantization parameter, or the like, the existing scanning direction may not be applicable. In the above table, three scanning patterns diag, ver, and hor are provided according to a block size and a prediction mode. For example, a scanning pattern in the case of a non-zero quantization parameter and a scanning pattern in the case of a zero (i.e. lossless) quantization parameter may be changed (in the arrow direction). That is, conventionally, a scanning method is changed according to a block size and a prediction mode, whereas in the present example, another scanning method is applied according to the quantization parameter. In the above case, there are three types of scanning patterns and the existing scanning patterns are used according to a quantization parameter condition. Also, it is possible to apply additional patterns, other than the existing scanning patterns, according to the quantization parameter condition. A shape of a block, a block partitioning method (in the present example, a transform block) and the like may be taken into consideration as additional factors affecting the setting of the scanning patterns.

Figure 39:
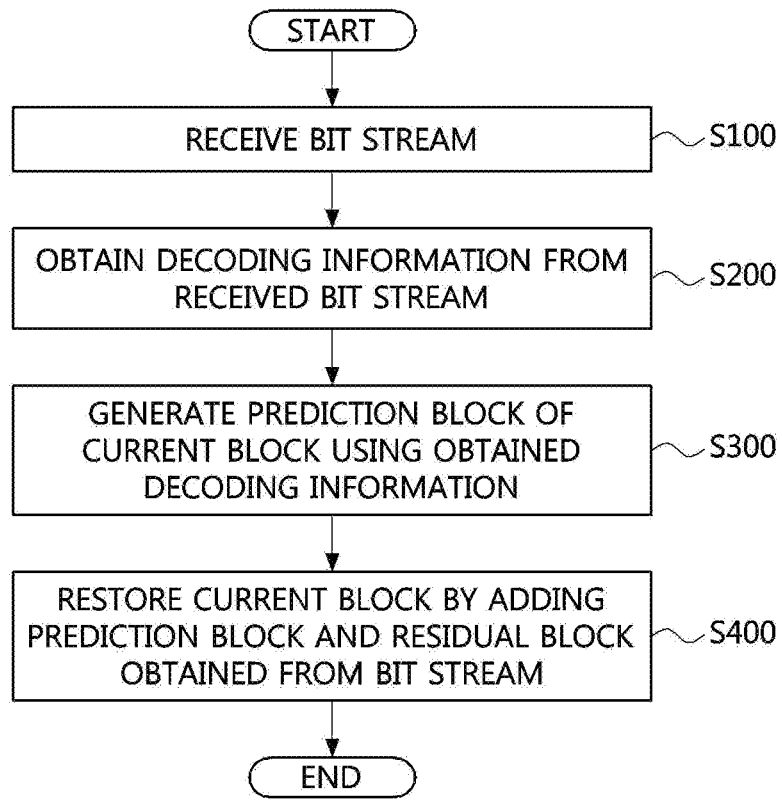
FIG. 39 is a flowchart illustrating a decoding method using intra prediction according to one embodiment of the present invention.

FIG. 39 is a flowchart illustrating a decoding method using intra prediction according to one embodiment of the present invention.

Referring to FIG. 39, the decoding method using intra prediction, which is performed in a decoding apparatus, may include receiving a bit stream (100), obtaining decoding information from the received bit stream (200), generating a prediction block for a current block to be decoded using the obtained decoding information (300), and restoring the current block by adding a residual block obtained from the bit stream and the prediction block (400).

Here, in the generating of the prediction block (300), the prediction block for the current block may be generated by generating a prediction value for each pixel of the current block using at least one main reference block selected from restored pixels belonging to a block adjacent to the current block or belonging to at least one sub-block of the current block.

Here, the main reference pixel may be a pixel located in an intra prediction direction among the restored pixels.

Here, the generating of the prediction block (300) may include, when two or more main reference pixels located in the intra prediction direction, generating the prediction block for the current block using two main reference pixels nearest to a current pixel, which are located ahead of and behind in the intra prediction direction with respect to the current pixel to be predicted in the current block.

Here, in the generating of the prediction block for the current block using the two main reference pixels nearest to the current pixel, the prediction block may be generated by using an average of the two main reference pixels or the sum of values obtained by applying a weight to each of the two main reference pixels as a prediction value of the current pixel.

Here, the at least one sub-block may be obtained by partitioning the current block using one of a quadtree scheme and a binary tree scheme, or may be obtained by partitioning the current block using the quadtree scheme and the binary tree scheme together.

Here, the at least one sub-block may consist of pixel lines located horizontally at even-numbered or odd-numbered positions in the current block.

Here, the at least one sub-block may consist of pixel lines located vertically at even-numbered or odd-numbered positions in the current block.

Here, in the at least one sub-block, coordinates (x, y) of each pixel in the current block may consist of an even x-coordinate and an even y-coordinate, consist of an x-coordinate and a y-coordinate, either one being an even coordinate and the other being an odd coordinate, or consist of an odd x-coordinate and an odd y-coordinate.

Here, the generating of the prediction block (300) may include the steps of: correcting the main reference pixel using a difference between two pixels at positions corresponding to positions of the main reference pixel among the restored pixels and the current pixel to be predicted in the current block with respect to the intra prediction direction; and generating the prediction block using the corrected main reference pixel.

Here, in the correcting of the main reference pixel, the main reference pixel may be corrected by adding the difference value and the main reference pixel or adding a value obtained by applying a weight to the difference value and the main reference pixel.

Here, in the correcting of the main reference pixel, the main reference pixel may be corrected only when a pixel within a predetermined range among current pixels is predicted.

Here, in the correcting of the main reference pixel, when two or more difference values are derived, the main reference pixel may be corrected using an average of the two or more difference values or values derived by applying a weight to each of the two or more difference values.

Figure 40:
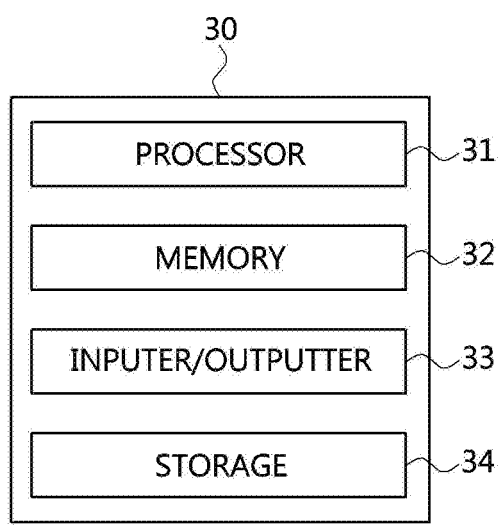
FIG. 40 is a block diagram illustrating a decoding apparatus using intra prediction according to one embodiment of the present invention.

FIG. 40 is a block diagram illustrating a decoding apparatus using intra prediction according to one embodiment of the present invention.

Referring to FIG. 40, the decoding apparatus 30 using intra prediction may include at least one processor 31 and a memory 32 in which commands for instructing the at least one processor to perform at least one operation are stored.

Here, the at least one operation may include the steps of: receiving a bit stream, obtaining decoding information from the received bit stream, generating a prediction block for a current block to be decoded using the obtained decoding information, and restoring the current block by adding a residual block obtained from the bit stream and the prediction block.

Here, in the generating of the prediction block, the prediction block for the current block may be generated by generating a prediction value for each pixel of the current block using at least one main reference block selected from restored pixels belonging to a block adjacent to the current block or belonging to at least one sub-block of the current block.

Here, the main reference pixel may be a pixel located in an intra prediction direction among the restored pixels.

Here, the generating of the prediction block may include, when two or more main reference pixels located in the intra prediction direction, generating the prediction block for the current block using two main reference pixels nearest to a current pixel, which are located ahead of and behind in the intra prediction direction with respect to the current pixel to be predicted in the current block.

Here, in the generating of the prediction block for the current block using the two main reference pixels nearest to the current pixel, the prediction block may be generated by using an average of the two main reference pixels or the sum of values obtained by applying a weight to each of the two main reference pixels as a prediction value of the current pixel.

Here, the at least one sub-block may be obtained by partitioning the current block using one of a quadtree scheme and a binary tree scheme, or may be obtained by partitioning the current block using the quadtree scheme and the binary tree scheme together.

Here, the generating of the prediction block may include the steps of: correcting the main reference pixel using a difference between two pixels at positions corresponding to positions of the main reference pixel among the restored pixels and the current pixel to be predicted in the current block with respect to the intra prediction direction; and generating the prediction block using the corrected main reference pixel.

Here, in the correcting of the main reference pixel, the main reference pixel may be corrected by adding the difference value and the main reference pixel or adding a value obtained by applying a weight to the difference value and the main reference pixel.

Here, in the correcting of the main reference pixel, the main reference pixel may be corrected only when a pixel within a predetermined range among current pixels is predicted.

Additionally, the decoding apparatus 30 according to one embodiment of the present invention may be configured to perform a method identical to or corresponding to the decoding method with reference to 39, and redundant descriptions are omitted.

In addition, the decoding apparatus 30 may be, for example, a desktop computer capable of communication, a laptop computer, a notebook computer, a smartphone, a tablet personal computer (PC), a mobile phone, a smar watch, smart glasses, an e-book reader, a portable multimedia player (PMP), a portable game console, a navigation device, a digital camera, a digital multimedia broadcasting (DMB) player, a digital video recorder, a digital video player, a personal digital assistant (PDA), and the like.

In addition, the decoding apparatus 30 may further include an inputter/outputter configured to receive a user's input and display a decoded image, and the inputter/outputter 33 may include, for example, a keyboard, a mouse, a touch screen, a display device, and the like.

In addition, the decoding apparatus 30 may further include a storage 34 in which images processed before and after decoding process, frames, and blocks are stored. The storage 34 may include, for example, hard disk drive (HDD), solid state disk (SSD), and the like.

The methods according to the present invention may be realized in a program command format that may be executed by using diverse computing means, so as to be recorded in a computer-readable medium. Herein, the computer-readable medium may independently include a program command, a data file, a data structure, and so on, or may include a combination of the same. The program command being recorded in the medium may correspond to a program command that is specifically designed and configured for the embodiments of the present invention, or the program command may correspond to a program command that is disclosed and available to anyone skilled in or related to computer software.

Examples of the computer-readable recording medium may include magnetic media, such as hard discs, floppy discs, and magnetic tapes, optical media, such as CD-ROMs, DVDs, and so on, magneto-optical media, such as floptical discs, and hardware devices specially configured (or designed) for storing and executing program commands, such as ROMs, RAMs, flash memories, and so on. Examples of a program command may not only include machine language codes, which are created by a compiler, but may also include high-level language codes, which may be executed by a computer by using an interpreter, and so on. The above-mentioned hardware equipment may be configured to be operated as one or more software modules for executing the operations of the exemplary embodiment of the present invention, and vice versa.

In addition, a part or whole of the configurations or functions of the above-described method or apparatus may be implemented in a combined manner or separately.

The invention claimed is:

1. A decoding method which uses intra prediction performed in a decoding apparatus, the decoding method comprising the steps of:
   receiving a bitstream;
   obtaining decoding information from the received bitstream;
   generating a prediction block for a current block to be decoded, by using the obtained decoding information; and
   restoring the current block by adding a residual block obtained from the bitstream to the prediction block,
   wherein generating the prediction block comprises:
   predicting a pixel of a first region belonging to the current block, by using at least one restored pixel of a neighboring block adjacent to the current block; and
   predicting a pixel of a second region belonging to the current block, by using the predicted pixel of the first region and the restored pixel of the neighboring block, and
   wherein the first region includes only at least one pixel of even-numbered pixel lines within the current block, and the second region includes at least one pixel of odd-numbered pixel lines within the current block.

2. The decoding method of claim 1, wherein both of an x-coordinate and a y-coordinate of the pixel in the first region are odd, and
   wherein an x-coordinate of the pixel in the second region is odd and a y-coordinate of the pixel in the second region is even.

3. The decoding method of claim 1, wherein the pixel of the even-numbered pixel lines within the current block is predicted before the pixel of the odd-numbered pixel lines within the current block.

4. The decoding method of claim 3, wherein the predicted pixel of the first region and the restored pixel of the neighboring block are located at a same vertical line as the pixel of the second region.

5. The decoding method of claim 4, wherein the pixel of the second region is predicted by applying a predetermined weight to each of the predicted pixel of the first region and the restored pixel of the neighboring block.

6. A decoding apparatus using intra prediction, comprising:
   at least one processor; and
   a memory in which commands for instructing the at least one processor to perform at least one operation are stored,
   wherein the at least one operation includes:
   receiving a bitstream;
   obtaining decoding information from the received bitstream;
   generating a prediction block for a current block to be decoded using the obtained decoding information; and
   restoring the current block by adding a residual block obtained from the bitstream to the prediction block,
   wherein generating the prediction block comprising:
   predicting a pixel of a first region belonging to the current block, by using at least one restored pixel of a neighboring block adjacent to the current block; and
   predicting a pixel of a second region belonging to the current block, by using the predicted pixel of the first region and the restored pixel of the neighboring block; and
   wherein the first region includes only at least one pixel of even-numbered pixel lines within the current block, and the second region includes at least one pixel of odd-numbered pixel lines within the current block.

7. The decoding apparatus of claim 6, wherein both of a x-coordinate and a y-coordinate of the pixel in the first region are odd, and
   wherein an x-coordinate of the pixel in the second region is odd and a y-coordinate of the pixel in the second region is even.

8. The decoding apparatus of claim 6, wherein the pixel of the even-numbered pixel lines within the current block is predicted before the pixel of the odd-numbered pixel lines within the current block.

9. The decoding apparatus of claim 8, wherein the predicted pixel of the first region and the restored pixel of the neighboring block are located at a same vertical line as the pixel of the second region.

10. The decoding apparatus of claim 9, wherein the pixel of the second region is predicted by applying a predetermined weight to each of the predicted pixel of the first region and the restored pixel of the neighboring block.

* * * * *